(12) United States Patent
Okisu et al.

(10) Patent No.: US 6,449,004 B1
(45) Date of Patent: Sep. 10, 2002

(54) ELECTRONIC CAMERA WITH OBLIQUE VIEW CORRECTION

(75) Inventors: Noriyuki Okisu, Osakasayama; Toshihiko Karasaki, Kawachinagano; Shoichi Minato, Sakai; Shinichi Fujii, Amagasaki, all of (JP)

(73) Assignee: Minolta Co., Ltd., Osaka (JP)

( * ) Notice: Subject to any disclaimer, the term of this patent is extended or adjusted under 35 U.S.C. 154(b) by 0 days.

(21) Appl. No.: 08/844,906

(22) Filed: Apr. 22, 1997

(30) Foreign Application Priority Data

| Apr. 23, 1996 | (JP) | ............................................. 8-101268 |
| Apr. 23, 1996 | (JP) | ............................................. 8-101269 |
| Apr. 23, 1996 | (JP) | ............................................. 8-101270 |
| Apr. 23, 1996 | (JP) | ............................................. 8-101271 |
| Jun. 25, 1996 | (JP) | ............................................. 8-164722 |

(51) Int. Cl.⁷ ............................................. H04N 15/00
(52) U.S. Cl. ............................. 348/44; 348/42; 348/50; 348/239
(58) Field of Search ............................. 348/42, 43, 46, 348/49, 50, 239, 240, 358, 362, 363, 208; 382/275, 293, 277

(56) References Cited

U.S. PATENT DOCUMENTS

| 4,984,088 | A | * | 1/1991 | Tani et al. ................... 348/364 |
| 5,084,611 | A | | 1/1992 | Okisu et al. |
| 5,101,268 | A | * | 3/1992 | Ohba ........................... 348/43 |
| 5,231,514 | A | * | 7/1993 | Nakamura ................... 358/444 |
| 5,392,128 | A | | 2/1995 | Sato |
| 5,500,516 | A | * | 3/1996 | Durbin ........................ 235/472 |
| 5,534,684 | A | * | 7/1996 | Danielson .................... 235/472 |
| 5,606,420 | A | * | 2/1997 | Maeda et al. ................ 358/296 |
| 5,805,273 | A | * | 9/1998 | Unno ........................... 355/30 |
| 5,959,669 | A | * | 9/1999 | Mizoguchi et al. .......... 348/362 |
| 6,256,452 | B1 | * | 7/2001 | Yamamoto .................. 365/117 |

FOREIGN PATENT DOCUMENTS

| JP | 3-94383 | 4/1991 |
| JP | 57-129080 | 8/1992 |
| JP | 5-101221 | 4/1993 |

* cited by examiner

*Primary Examiner*—Wendy R. Garber
*Assistant Examiner*—Mitchell White
(74) *Attorney, Agent, or Firm*—Burns, Doane, Swecker & Mathis, LLP

(57) ABSTRACT

An electronic camera is provided with an image pickup device for photoelectrically picking up a light image of an object to generate image data, an oblique angle information provider for providing information on an oblique angle between a sensing surface of the image pickup device and a surface of the object, a distance detector for detecting a distance to the object, and a corrector for correcting, based on the provided oblique angle information and the detected distance, the generated image data so as to produce a pseudo object image whose surface resides on a plane parallel with the sensing surface of the image pickup device.

47 Claims, 31 Drawing Sheets

$k_i (i=1,2,\cdots n): n=6, m=9$
$L_x$: PIXEL PITCH IN X $k_i (i=1,2,\cdots n): n=6, m=5$
$L_x$: PIXEL PITCH IN X

ELECTRONIC CAMERA WITH OBLIQUE VIEW CORRECTION

BACKGROUND OF THE INVENTION

This invention relates to an electronic camera, particularly to an electronic camera which can correct an obliquely viewed object image into a photographic image viewed from front.

Electronic cameras have, as compared with conventional cameras which record images on a silver-salt film, an advantage of picking up images of satisfactory quality by suitably applying an image quality processing to the picked up images according to photographing purposes and types of objects since the quality of the photographed image can freely be processed. Thus, the electronic cameras are used as apparatus not only for usual picture taking, but also for photographing an information such as characters and graphics drawn on a white board at, e.g., a conference hall.

At the conference hall, the seats of participants are normally arranged with respect to the white board. Accordingly, if figures, characters or the like drawn on the white board are photographed without moving the seats, the photographed images are oblique images. Since the entire information such as characters drawn on the white board cannot be focused when photographing is performed obliquely with respect to the white board, a perspective geometric distortion is found in the photographed image, making it difficult to read such photographed information.

In order to avoid the problem of oblique images, the photographing position may be moved to a front position with respect to the white board. However, since it is difficult to move the photographing position during the conference, it is remarkably advantageous that the camera be provided with a function of photographing an image while correcting the geometric distortion thereof (i.e., a function of photographing while correcting an oblique image into a pseudo front image).

A variety of techniques for correcting the geometric distortion of a photographed image resulting from oblique photographing have been proposed.

For example, Japanese Unexamined Patent Publication No. 57(SHO)-129080 discloses a method for detecting or designating a specified position of an image, obtaining a normalized coefficient of this position with respect to a position on a sensing surface which this position is supposed to be located, and correcting an image distortion by applying a coordinate transformation to the input image in accordance with the obtained coefficient.

Further, Japanese Unexamined Patent Publication No. 3(HEI)-94383 discloses a method for supposing a known fixed geometry, arranging an input image within this fixed geometry, obtaining a transformation coefficient based on a deformed state of this fixed geometry, and correcting an obliquely photographed image by applying a transformation to the input image in accordance with the obtained coefficient.

Furthermore, Japanese Unexamined Patent Publication No. 5(HEI)-101221 discloses a method for superimposing an orthogonal lattice on an object surface, obtaining space coordinates of orthogonal lattice points, projecting a light while applying an orthogonal transformation to coordinate systems defined on a sensing surface, and correcting an obliquely photographed image by performing an offset calculation such that the luminance at a projection point is the luminance at the corresponding lattice points on the sensing surface.

However, according to the methods disclosed in the above publications, when the obliquely photographed image is to be corrected, a specified information needs to be input. Thus, it is difficult to perform photographing while the obliquely photographed image is corrected into a pseudo front photographed image by a simple operation.

More specifically, according to the method of the first publication, for the correction of the obliquely photographed image, a plurality of positions of the input image need to be designated to calculate a coordinate transformation coefficient. According to the method of the second publication, an image to be photographed needs to be arranged within an image of known fixed geometry. According to the method of the third publication, the two dimensional coordinates of the lattice points need to be input by superimposing the orthogonal lattice on the object surface and projecting the respective lattice points. It is extremely difficult to perform the above operations during picture taking.

Further, according to the above methods, since the obliquely photographed image is corrected into a pseudo front photographed image by coordinate transformation, the correction is complicated and it is difficult to rapidly perform it.

On the other hand, in an oblique photographic scene, the sensing surface and the object surface are normally parallel to each other along the vertical direction, but inclined to each other in a horizontal plane. Accordingly, assuming that $\theta$, S and m denote an angle of inclination, an object image and a photographing magnification, an oblique image projected on the sensing surface of the camera is $m \cdot S \cos(\theta)$. Thus, if the angle of inclination $\theta$ and the photographing magnification m are known, the oblique image can be corrected into a front image based thereon by a simple operation.

In view of the above, an electronic camera has been proposed which can calculate a distribution of photographing magnification m within the obliquely photographed image based on the angle of inclination $\theta$ and a distance to the object and correcting the obliquely photographed image into a front image using the angle of inclination $\theta$ and the distribution of photographing magnification m.

A variety of methods may be adopted to correct the distortion of an obliquely photographed image based on the angle of inclination $\theta$ and the distribution of photographic magnification m. For example, the obliquely photographed image may be corrected into a pseudo front image by applying image compression to a portion of the obliquely photographed image closer than a focus position (normally, center position of the photographed image), while applying image enlargement to a portion thereof more distant that the focus position. Further, the obliquely photographed image may be corrected into a pseudo front image by using one end of the obliquely photographed image as a reference and applying image enlargement to the entire image at the other end. In such cases, the enlarged image may bulge out of the field, and a portion of the obliquely photographed image may be missing due to the correction. If a missing portion becomes larger, a necessary image cannot be photographed, with the result that the function of correcting the distortion of the obliquely photographed image may end up causing problems.

It is extremely difficult for a camera operator to predict the missing portion after correction based on the angle of inclination and an object obliquely viewed through a viewfinder. Normally, the presence or absence of the missing portion of the image and the range thereof cannot be confirmed unless the photographed image is printed out. Accordingly, an ability to confirm a range where the distortion of the obliquely photographed image is correctable before photographing is desirable for the above mentioned image distortion correcting method.

Further, according the above image distortion correcting method, unless the angle of inclination θ is accurately input, the distortion of the obliquely photographed image is improperly corrected, resulting in an unnatural photographed image. Accordingly, an angle of inclination setting member of the camera needs to relatively accurately set the angle of inclination θ. On the other hand, if the camera requires a complicated operation to set the angle of inclination, the operability for photographing is reduced and the image distortion correcting function cannot effectively be utilized. Therefore, the setting member should be able to easily and rapidly set the angle of inclination θ.

For example, in the case that the camera operator sets the angle of inclination between the sensing surface and the object surface, there can be considered a method according to which the camera operator sensuously measures an approximate angle between the object surface and the sensing surface of the camera and such a measured value is input. However, it is extremely difficult for the camera operator to sensuously suppose a specific value of the angle of inclination in a state where there is no measurement reference. Further, even if the photographing position of the camera is at a short distance from the object, a relatively accurate angle of inclination cannot easily and rapidly be set.

Further, since the correction is performed based on the picked image data according to the above image distortion correcting method, a main object (e.g., white board) located obliquely from the camera needs to be photographed while being focused as a whole.

In the case that focal lengths of a plurality of objects within a field differ from each other, such as a case that a plurality of objects are to be photographed in an oblique direction, a method for deepening a depth of field by making an aperture of a diaphragm smaller is generally known as a photographing technique for attaining focusing conditions for all objects. In cameras provided with an automatic exposure control function (AE function), an exposure control value during photographing is automatically set according to the brightness of the object in accordance with a preset AE program. It is known that some of the cameras provided with the AE function are also provided, besides a standard AE program, with an aperture priority AE program for setting the exposure control value while prioritizing the aperture value. There have also been proposed cameras provided with multiple-spot metering function in which an aperture value is set such that a portion of an object within a field falls within a depth of field.

Even with the standard AE program, the aperture priority exposure control can be performed if a wide-angle lens is used since an exposure control is so performed as to make the aperture value as small as possible.

As a focus adjusting method in photographing an object which requires the above image distortion correction, a conventional method for making the depth of field as deep as possible may be adopted. However, with this method, influence of camera shake may occur and flash light may be required due to a low shutter speed, which limits a degree of freedom of the exposure control.

In the image distortion correction of the obliquely photographed image, it is sufficient to attain a focusing condition only for the entire main object within the field whose image is subjected to image distortion correction. It is not always necessary to attain a focusing condition for the entire field. Accordingly, if the depth of field is deepened more than necessary, the degree of freedom of the exposure control is considerably limited, making the photographing difficult.

In consideration of the above, the aperture value may be so adjusted as to attain the focusing condition for the entire main object which is subjected to the image distortion correction. However, with the existing cameras, even those provided with the aperture priority AE program, since the aperture value needs to be set by the camera operator, it is difficult to make such an aperture value adjustment.

On the other hand, the existing cameras capable of adjusting the depth of field to a portion of the object within the field do not enable the camera operator to accurately adjust the depth of field to an intended specific object within the field. Accordingly, it is difficult to perform a proper aperture control in conformity with the image distortion correction of the obliquely photographed image.

Further, in the electronic camera provided with the above image distortion correcting function, in consideration of the operability of photographing using the image distortion correcting function, it is desirable to confirm the correction result, preferably by monitoring an image after the correction before photographing.

SUMMARY OF THE INVENTION

It is an object of the present invention to provide an electronic camera which have overcome the problems residing in the prior art.

According to an aspect of the present invention, an electronic camera is provided with an image pickup device for photoelectrically picking up a light image of an object to generate image data, the image pickup device having a sensing surface residing on a first plane; an information provider for providing information on an oblique angle between the first plane and a second plane on which a surface of the object resides; a detector for detecting a distance to the object; and a corrector for correcting, based on the provided oblique angle information and the detected distance, the generated image data so as to produce a pseudo object image identical to an image which is obtained when the first plane is in parallel with the second plane.

According to another aspect of the present invention, an electronic camera comprises: an image pickup device for photoelectrically picking up a light image of an object to generate image data, the image pickup device having a sensing surface residing on a first plane; an information provider for providing information on an oblique angle between the first plane and a second plane on which a surface of the object resides; and a corrector for correcting, based on the provided oblique angle information, the generated image data so as to produce a pseudo object image identical to an image which is obtained when the first plane is in parallel with the second plane.

According to another aspect of the present invention, an electronic camera comprises: an image pickup device for photoelectrically picking up a light image of an object to generate image data, the image pickup device having a sensing surface residing on a first plane; a corrector for correcting the generated image data so as to produce a pseudo object image identical to an image which is obtained when a surface of the object is in parallel with the first plane when the surface of the object is on a second plane intersecting the first plane; and an aperture value setter for setting an aperture value in accordance with an angle between the first plane and the second plane.

According to another aspect of the present invention, an electronic camera comprises: an image pickup device for photoelectrically picking up a light image of an object to generate image data, the image pickup device having a sensing surface residing on a first plane; a corrector for correcting the generated image data so as to produce a pseudo object image identical to an image which is obtained when a surface of the object is in parallel with the first plane when the surface of the object is on a second plane intersecting the first plane; a size setter for setting a size of the light image on the sensing surface of the image pickup device; and an aperture value setter for setting, based on the set light image size, an aperture value to hold the surface of the object in a depth of field of the image pickup device.

According to another aspect of the present invention, an electronic camera comprises: an image pickup device for photoelectrically picking up a light image of an object to generate image data, the image pickup device having a sensing surface residing on a first plane; a corrector for correcting the generated image data so as to produce a pseudo object image identical to an image which is obtained when a surface of the object is in parallel with the first plane when the surface of the object is on a second plane intersecting the first plane; a calculator for calculating a correction permissible area of the light image; and a display unit for displaying the calculated correction permissible area.

According to another aspect of the present invention, an electronic camera comprises: an image pickup device for photoelectrically picking up a light image of an object to generate image data, the image pickup device having a sensing surface residing on a first plane; a corrector for correcting the generated image data so as to produce a pseudo object image identical to an image which is obtained when a surface of the object is in parallel with the first plane when the surface of the object is on a second plane intersecting the first plane; an image display unit for selectively displaying an actually picked up image in accordance with the generated image data and a pseudo image in accordance with the corrected image data; and a selector for providing a camera user with a selection of the actually picked up image display or the pseudo image display on the image display unit.

According to another aspect of the present invention, an image corrector comprises: an image data inputting portion for inputting image data which is generated by photoelectrically picking up a light image of an object with an image pickup device having a sensing surface; an oblique angle information providing portion for providing information on an oblique angle between the sensing surface of the image pickup device and a surface of the object; a distance information providing portion for providing information on a distance to the object; and a data correcting portion for correcting the inputted image data based on the provided oblique angle information and distance information so as to produce a pseudo object image identical to an image which is obtained when the surface of the object is in parallel with the sensing surface of the image pickup device.

According to another aspect of the present invention, a method for producing image data representing a pseudo object image whose surface resides on a plane parallel with an image picking up plane, the method comprises: picking up photoelectrically a light image of an object with an image pickup device having a sensing surface residing on a first plane; providing information on an oblique angle between the first plane and a second plane on which a surface of the object resides; detecting a distance to the object; and correcting, based on the provided oblique angle information and the detected distance, the generated image data so as to produce a pseudo object image identical to an image which is obtained when the first plane is in parallel with the second plane.

According to another aspect of the present invention, a method for producing image data representing a pseudo object image whose surface resides on a plane parallel with an image picking up plane, the method comprises: picking up photoelectrically a light image of an object with an image pickup device having a sensing surface residing on a first plane; providing information on an oblique angle between the first plane and a second plane on which a surface of the object resides; and correcting, based on the provided oblique angle information, the generated image data so as to produce a pseudo object image identical to an image which is obtained when the first plane is in parallel with the second plane.

According to another aspect of the present invention, a method for producing image data representing a pseudo object image whose surface resides on a plane parallel with an image picking up plane, the method comprises: setting an aperture value in accordance with an oblique angle between a first plane on which a sensing surface of an image pickup device resides and a second plane on which a surface of an object resides; picking up photoelectrically a light image of the object with the image pickup device at the set aperture value to generate image data; and correcting the generated image data so as to produce a pseudo object image identical to an image which is obtained when the first plane is in parallel with the second plane.

According to another aspect of the present invention, a method for producing image data representing a pseudo object image whose surface resides on a plane parallel with an image picking up plane, the method comprises: setting a size of a light image of an object on a sensing surface of an image pickup device, the sensing surface residing on a first plane, a surface of the object residing on a second plane intersecting the first plane; setting, based on the set light image size, an aperture value to hold the surface of the object in a depth of field of the image pickup device; picking up photoelectrically a light image of the object with the image pickup device at the set aperture value to generate image data; and correcting the generated image data so as to produce a pseudo object image identical to an image which is obtained when the first plane is in parallel with the second plane.

According to another aspect of the present invention, a method for producing image data representing a pseudo object image whose surface resides on a plane parallel with an image picking up plane, the method comprises: picking up photoelectrically a light image of an object with an image pickup device having a sensing surface residing on a first plane, a surface of the object residing on a second plane intersecting the first plane; calculating a correction permissible area of the light image; displaying the calculated correction permissible area; and correcting the generated image data so as to produce a pseudo object image identical to an image which is obtained when the first plane is in parallel with the second plane.

According to another aspect of the present invention, a method for producing image data representing a pseudo object image whose surface resides on a plane parallel with an image picking up plane, the method comprises: picking up photoelectrically a light image of an object with an image pickup device having a sensing surface residing on a first plane, a surface of the object residing on a second plane intersecting the first plane; correcting the generated image data so as to produce a pseudo object image identical to an image which is obtained when the first plane is in parallel with the second plane; and displaying selectively an actually picked up image in accordance with the generated image data and a pseudo object image in accordance with the corrected image data.

These and other objects, features, aspects and advantages of the present invention will become more apparent from the following detailed description of the present invention when taken in conjunction with the accompanying drawings.

BRIEF DESCRIPTION OF THE DRAWINGS

FIGS. 4A and 4B are diagrams showing an oblique photographing correction, wherein FIG. 4A shows an obliquely photographed image and FIG. 4B shows an image after the oblique photographing correction;

FIGS. 12A and 12B are diagrams showing the oblique photographing correction, wherein FIG. 12A shows an obliquely photographed image and FIG. 12B shows an image after the oblique photographing correction;

FIGS. 21A and 21B are diagrams showing a correction of an obliquely photographed image including an area of $(\beta i+\theta)>90°$, wherein FIG. 21A shows the image before the correction and FIG. 21B shows the image after the correction;

FIGS. 24A and 24B are diagrams showing another oblique photographing correction method, wherein FIG. 24A shows an oblique image and FIG. 24B shows the image after the oblique photographing correction;

FIGS. 25A and 25B are diagrams showing an interpolation of pixel data in the oblique photographing correction, wherein FIG. 25A shows an interpolation along a vertical direction and FIG. 25B shows an interpolation along a horizontal direction;

DETAILED DESCRIPTION OF THE PREFERRED EMBODIMENTS OF THE INVENTION

Figure 1:
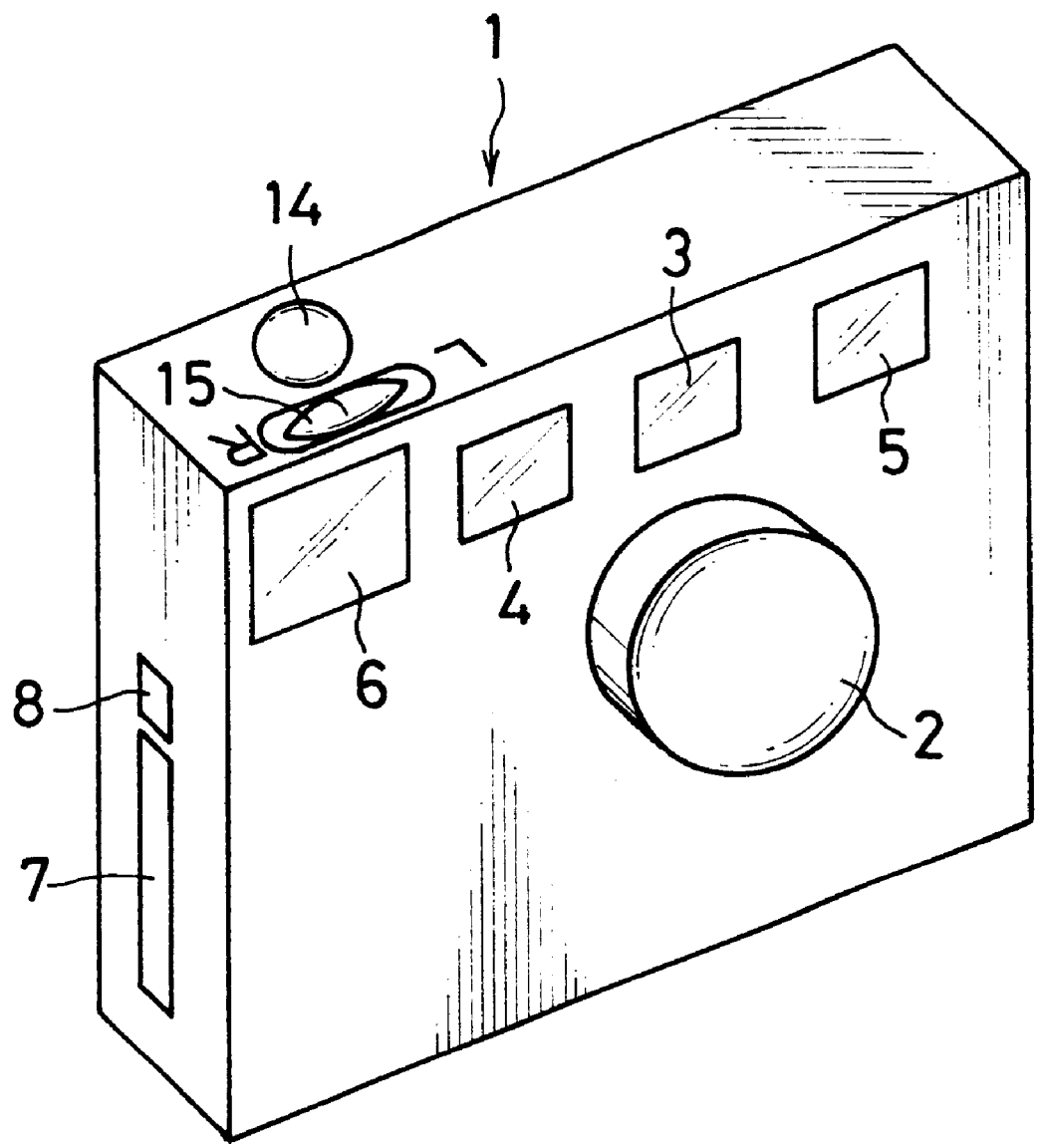
FIG. 1 is a perspective view showing an external configuration of a first electronic camera according to the present invention.

FIG. 1 is a perspective view showing an external configuration of a first electronic camera according to the present invention.

An electronic camera 1 of FIG. 1 includes a CCD area sensor as an image pickup device. However, according to the invention, it should be noted that a CCD line sensor may be used as an image pickup device.

An image data sensed by this CCD area sensor is recorded in an unillustrated hard disk card of PCMCIA standards. The camera 1 is provided with a function of correcting an image of an object whose surface is not in a plane parallel with the sensing surface or plane of the CCD area sensor (hereinafter, "oblique image") into an image of an object whose surface is in a plane parallel with the sensing surface of the CCD area sensor (hereinafter, "front image"). Hereinafter, the above correction is referred to as an oblique photographing correction.

Figure 3:
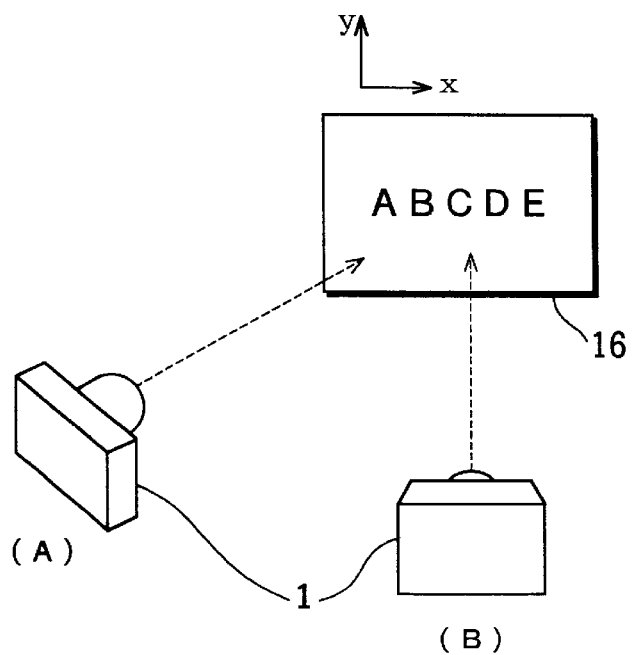
FIG. 3 is a diagram showing oblique photographing for an object.
Figure 4A:
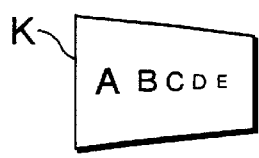
Figure 4B:
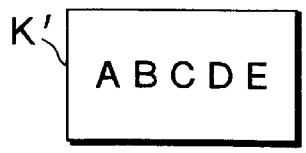

More specifically, in the case that characters, figures and the like drawn on a white board 16 are photographed in a normal photographing mode in a position (A) obliquely forward of the white board 16 to the left as shown in FIG. 3, the photographed image is an oblique image K in which a dimension at the right end is smaller than that at the left end as shown in FIG. 4A resulting from a different object distance distribution within a field. In the case that such an object is photographed in an oblique photographing correction mode to be described later, the oblique image K is corrected into a front image K' as shown in FIG. 4B which could be obtained by photographing the object in a position (B) substantially in front of the white board 16.

Here, the principle of oblique photographing correction is briefly described. It should be noted that description be made on a linear image in order to simplify the description.

Figure 5:
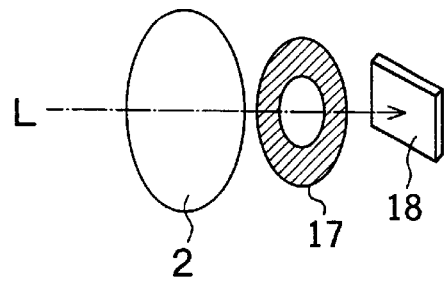
FIG. 5 is a schematic construction diagram of an optical system of the first electronic camera.

FIG. 5 is a schematic construction diagram of an optical system of the camera 1. This optical system is such that a laterally long rectangular shaped CCD area sensor 18 (hereinafter, "CCD 18") is arranged in a focus position of a taking lens 2 and a diaphragm 17 is arranged between the taking lens 2 and the CCD 18. A light image representing figures or the like drawn on the white board 16 is focused on the sensing surface of the CCD 18 after having passed through the taking lens 2 and the diaphragm 17.

Figure 6:
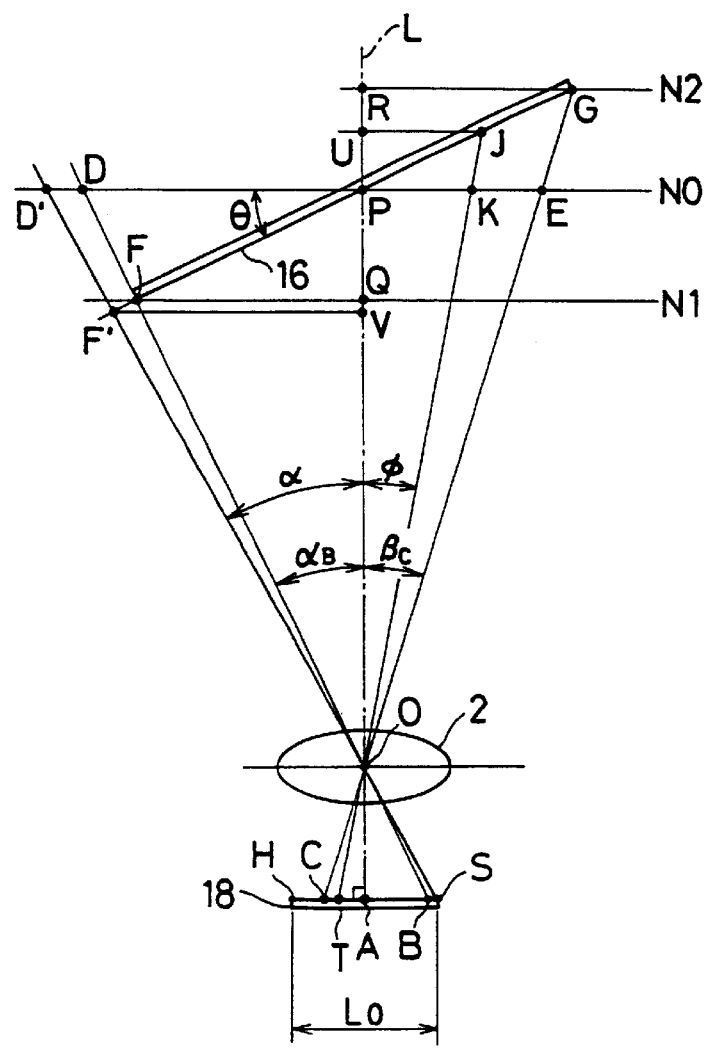
FIG. 6 is a diagram of an image pickup system viewed from right above during oblique photographing.

FIG. 6 is a diagram of an image pickup system viewed from right above during oblique photographing, wherein the display surface of the white board 16 (hereinafter, "object surface") is inclined by an angle θ (hereinafter, angle of inclination θ) with respect to the sensing surface of the CCD 18.

In FIG. 6, identified by L is an optic axis of the taking lens 2, and by N0, N1, N2 are line segments parallel to the sensing surface of the CCD 18 which pass points P, F, G on the white board 16, respectively. Points O, Q, R, D and E are an intersection of a lens surface of the taking lens 2 and the optic axis L; an intersection of the line segment N1 and the optic axis L; an intersection of the line segment N2 and the optic axis L; an intersection of the line segment N0 and the extension of a line segment BF; and an intersection of the line segment N0 and a line segment GC.

A light image of line segment FG on the white board 16 is formed between points B and C of the sensing surface of the CCD 18. However, since the sensing surface and the object surface are inclined to each other by angle of inclination θ, the light image BC formed on the sensing surface of the CCD 18 is equivalent to projection of an image between points D and E on the sensing surface of the CCD 18. Assuming that, at the respective points A, B, C on the sensing surface of the CCD 18, photographing magnifications are $m_A$, $m_B$, $m_C$ and object distances are $D_A(=OP)$, $D_B(=OQ)$, $D_C(=OR)$, $m_B = m_A \cdot OP/OQ = m_A \cdot D_A/D_B$, $m_C = m_A \cdot OP/OR = m_A \cdot D_A/D_C$. Accordingly, $m_B > m_A > m_C$. The light image formed on the sensing surface is an oblique image K as shown in FIG. 4A, and only point A (intersection of the optic axis L and the sensing surface) is perfectly in focus among the light image BC.

The oblique photographing correction is performed by obtaining a photographing magnification mi (i=3, 4, ... n) of the respective points between points A and C on the sensing surface of the CCD 18 and a photographing magnification mi' (i'=3, 4, ... n) of the respective points between points B and A on the sensing surface of the CCD 18, enlarging the picked image of the light image AC based on the photographing magnification mi, and reducing the picked image of the light image BA based on the photographing magnification mi'.

If Di' is an object distance at an arbitrary point between points B and A on the sensing surface of the CCD 18 and α i is an angle of view at that point (an angle between a line segment passing that point and the point O and the optic axis L), $D_A/Di' = 1 + \tan(\alpha i) \cdot \tan(\theta)$. Accordingly, the photographing magnification mi' at this arbitrary point can be calculated based on the angle of inclination θ, the photographing magnification mA and the angle of view α i in accordance with Equation (1):

$$mi' = m_A \cdot D_A / Di' \quad (1)$$
$$= m_A \cdot [1 + \tan(\alpha i) \cdot \tan(\theta)]$$

In accordance with Equation (1), the photographing magnification $m_A$ can be calculated as: $m_A = a \cdot f/D_A$ (where a: proportion coefficient, f: focal length). Further, the equation: $D_A/Di' = 1 + \tan(\alpha i) \cdot \tan(\theta)$ can be understood as follows, using the object distance $D_B$ and the angle of view $\alpha_B$ with respect to point B in FIG. 6:

$OQ=OP-PQ=OP-OQ\cdot\tan(\alpha_B)\cdot\tan(\theta)$ $(\because PQ=FQ\cdot\tan(\theta), FP=OQ\cdot\tan(\alpha_B))$ $\therefore OP=OQ\cdot(1+\tan(\alpha_B)\cdot\tan(\theta))$ $\therefore D_A/D_B=1+\tan(\alpha_B)\cdot\tan(\theta)$      (1)

Hence, in a position of the arbitrary angle of view $\alpha i$:

$D_A/D_i{'}=1+\tan(\alpha i)\cdot\tan(\theta)$.

If Di is an object distance at an arbitrary point between points A and C on the sensing surface of the CCD 18 and βi is an angle of view at that point, $D_A/Di=1-\tan(\beta i)\cdot\tan(\theta)$ Accordingly, the photographing magnification mi at this arbitrary point can be calculated based on the angle of inclination θ, the photographing magnification $m_A$ and the angle of view β i in accordance with Equation (2):

$$mi = m_A \cdot D_A/Di \qquad (2)$$
$$= m_A \cdot [1+\tan(\beta i)\cdot\tan(\theta)]$$

The equation: $D_A/Di=1-\tan(\beta i)\cdot\tan(\theta)$ can be understood as follows, using the object distance $D_C$ and the angle of view $\beta_C$ with respect to point C in FIG. 6:

$OR=OP+PR=OP+OR\cdot\tan(\beta_C)\cdot\tan(\theta)$ $(\because PR=GR\cdot\tan(\theta), GR=OR\cdot\tan(\beta_C))$ $\therefore OP=OR\cdot(1-\tan(\beta_C)\cdot\tan(\theta))$ $\therefore D_A/D_C=1-\tan(\beta_C)\cdot\tan(\theta)$      (2)

Hence, in a position of the arbitrary angle of view βi:

$D_A/D_i=1-\tan(\beta i)\cdot\tan(\theta)$.

Referring back to FIG. 1, the camera 1 is provided with the taking lens 2 provided substantially in the center of its front surface, a light projecting window 4 and a light receiving window 5 provided above the taking lens 2 for the measurement of an object distance by an active metering method, and a light meter window 3 provided between the windows 4 and 5 for the measurement of the brightness of an object. On the left side of the light projecting window 4 is provided an objective window 6 of a viewfinder. Infrared rays are projected on the object through the light projecting window 4, and the infrared rays reflected by the object are received through the light receiving window 5. Although the active metering method is adopted as a metering method in this embodiment, a passive metering method may be adopted.

In one side surface of the camera 1, there are provided a card insertion slot 7 through which a hard disk card is mounted and ejected, and a card ejection button 8 above the card insertion slot 7 for ejecting the mounted hard disk card. When the photographed contents are to be printed out, the hard disk card is taken out of the camera 1 by pressing the card ejection button 8, and is mounted in a printer capable of loading this hard disk card to print the photographed contents out.

The camera 1 may be provided with an interface of an SCSI cable. Then, the camera 1 and the printer can directly be connected via the SCSI cable, and image data are transferred from the camera 1 to the printer to print the photographed images out.

Although a hard disk card of PCMCIA standards is adopted as a storage medium for the image data in this embodiment, a card memory, a mini-disk (MD) or any other storage medium may be used provided that it is capable of storing the photographed contents as image data.

Figure 2:
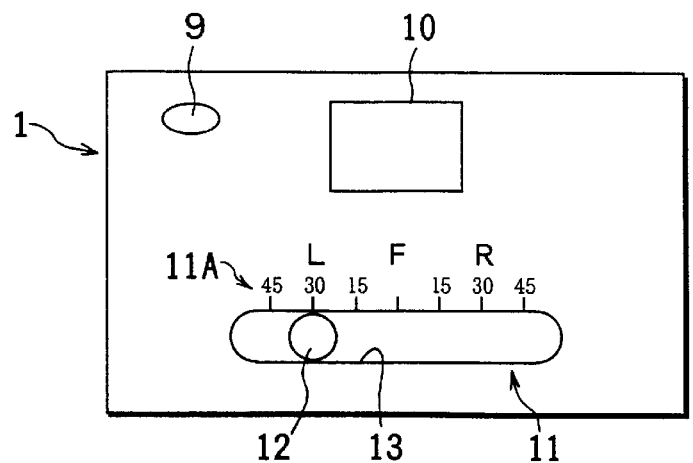
FIG. 2 is a rear view of the first electronic camera.

As shown in FIG. 2, in the back surface of the camera 1, a main switch 9 and an eyepiece window 10 of the viewfinder are provided at a left end portion and a substantially middle portion of its upper side, and a mode setting switch 11 is provided below the eyepiece window 10.

The mode setting switch 11 has a function of switchingly setting a normal photographing mode and an oblique photographing correction mode in which oblique photographing correction is applied to an oblique image and setting an angle of inclination θ (see FIG. 6).

The mode setting switch 11 includes a transversely long guide groove 13 having an angle scale 11A on its upper portion, and an operation button 12 movable along the guide groove 13. The angle of inclination θ can be set by setting the operation button 12 in a specified angle position of the angle scale 11A.

In the angle scale 11A, 0° is arranged in the middle, and 15°, 30° and 45° are arranged on each of the opposite sides of 0° so that three different angles of inclination θ can be set on the left and right sides. Here, the angles on the left side are angles of inclinations in the case that an object is photographed from the left side (hereinafter, "left side oblique photographing"), whereas the angles on the right side are angles of inclinations in the case that an object is photographed from the right side (hereinafter, "right side oblique photographing"). If the operation button 12 is set in the middle position, the angle of inclination is 0° Accordingly, the normal photographing mode is set in which the oblique photographing correction is not applied to the photographed image.

Although the angle of inclination θ the camera operator measured by the eye can discretely be set in this embodiment, it may continuously be set according to a slide amount of the operation button 12.

At a right end portion of the upper surface of the camera 1, there are provided a release button 14 and an object width setting switch 15. The release button 14 turns on a switch for photographing preparation including a focal length adjustment and the setting of an exposure control value when being pressed halfway, while turning on a switch for an exposure operation when being fully pressed.

The object width setting switch 15 is operated to input a horizontal dimension d (dimension corresponding to a distance between points B and C in FIG. 6) of an object image to be subjected to the oblique photographing correction on the sensing surface of the CCD 18. The switch 15 has a stop position in the middle and is slidable along a transverse direction.

The information on the horizontal dimension d is input to set a depth of field where the entire object image to be subjected to the oblique photographing correction (white board 16 in the example of FIG. 3) within the field can be focused. In a photographic scene which requires the oblique photographing correction, it is also possible to make the aperture of the diaphragm 17 smaller so as to focus the entire image within the field. This slows the shutter speed in the case that the object has a low brightness, thereby limiting a degree of freedom of the photographing. In view of this, according to this embodiment, the aperture value of the diaphragm 17 is not made any larger than the value of depth of field capable of covering the object image to be subjected to the oblique photographing correction within the field, thereby reducing the problems as much as possible.

Figure 7:
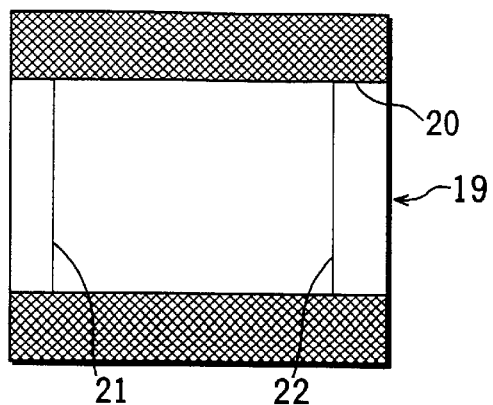
FIG. 7 is a diagram showing display contents of a liquid crystal display portion within a viewfinder in a normal photographing mode.
Figure 8:
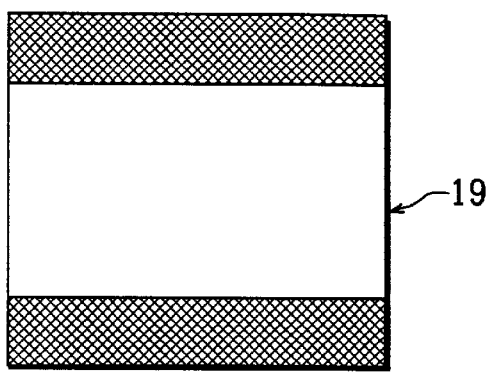
FIG. 8 is a diagram showing the liquid crystal display portion within the viewfinder.

In the viewfinder, a liquid crystal display portion 19 including an LCD (Liquid Crystal Display) as shown in FIG. 7. In the liquid crystal display portion 19, a field frame 20, markers and indicator lines for allowing the visual confirmation of an operated amount of the object width setting switch 15, markers and indicator lines for allowing the visual confirmation of a range (hereinafter, "correction permissible range") which will not expand beyond the field by the oblique photographing correction (enlargement processing). While the release button 14 is not pressed, nothing is displayed in the liquid crystal display portion 19 (state of FIG. 8). When the release button 14 is pressed halfway during the photographing in the oblique photographing correction mode, vertical indicator lines 21, 22, and two pairs of triangular markers 23, 23': 24, 24' are displayed on the opposite ends of the inside of the field frame 20 and at the upper and lower margins of the field frame 20, respectively as shown in FIGS. 9 and 10.

Figure 9:
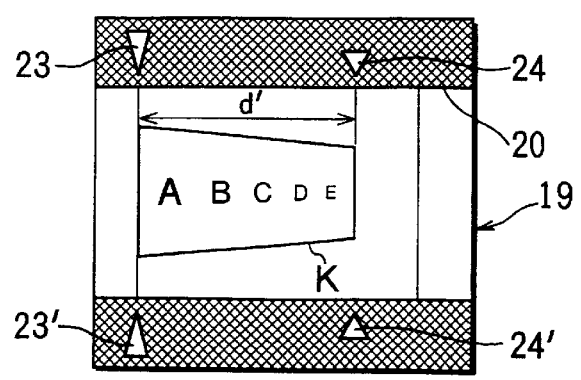
FIG. 9 is a diagram showing display contents of the liquid crystal display portion within the field during left side oblique photographing in an oblique photographing correction mode.
Figure 10:
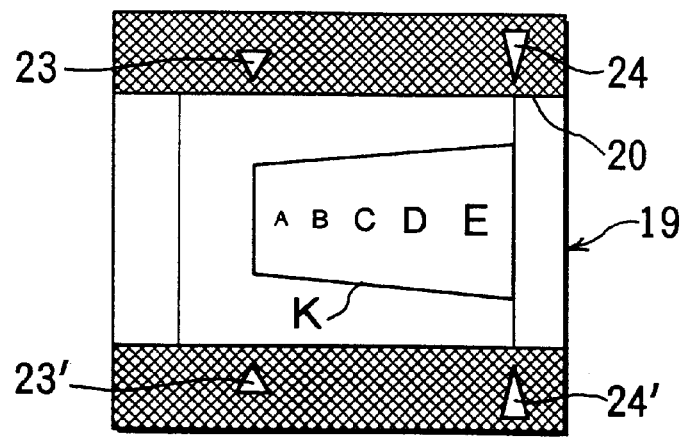
FIG. 10 is a diagram showing display contents of the liquid crystal display portion within the field during right side oblique photographing in an oblique photographing correction mode.

In FIG. 9, the markers 23, 23' allow the visual confirmation of the operated amount of the object width setting switch 15 during the right side oblique photographing, whereas the markers 24, 24' allow the visual confirmation of the operated amount of the object width setting switch 15 during the left side oblique photographing.

The indicator line 21 is a reference line indicating a reference position of a width d' of an image K to be subjected to the oblique photographing correction (hereinafter, "correction image") which is input by the markers 24, 24' during the left oblique photographing, whereas the indicator line 22 is a reference line indicating a reference position of a width d' of an correction image K which is input by the markers 24, 24' during the right oblique photographing. The indicator lines 21, 22 also act as reference lines for matching the vertical direction of the correction image K and the vertical direction of the field.

The horizontal dimension d of the correction image K on the sensing surface of the CCD 18 is input by converting the width d' set between the markers 23, 23' and the markers 24, 24' within the field frame 20 into the horizontal dimension d since the positional relationship of the field frame 20 and the CCD 18 is known.

For simplification of description, in the following embodiments, only the case will be described that the sensing surface of the CCD 18 and the object surface are in parallel with each other in a vertical plane passing them and the sensing surface and the object surface are inclined at the angle of inclination θ only in a horizontal plane passing them. Accordingly, the oblique photographing correction is performed by rotating the oblique image in the horizontal plane. In this case, to properly perform the oblique photographing correction, the camera operator needs to set the camera 1 so that the sensing surface of the CCD 18 and the object surface do not intersect each other in the vertical plane passing them. In other words, the field of the camera 1 needs to be set such that the vertical lines of the sensing surface of the CCD 18 are parallel to the vertical lines of the object surface.

However, it should be noted that the present invention is applicable not only for a case that the sensing surface of the CCD 18 and the object surface intersects each other in a vertical plane passing them but are in parallel with each other in a horizontal plane passing them, but also for a case that the sensing surface of the CCD 18 and the object surface intersects each other in both a vertical plane and a horizontal plane passing them.

Thus, in the oblique photographing correction mode, a displacement of the field with respect to the object surface along the vertical direction of the field during the field setting by the camera operator is reduced by displaying the indicator lines 21, 22 in the liquid crystal display portion 19 and matching the vertical direction of the correction image K with the indicator line 21 (or 22).

Accordingly, particularly in the case that the object to be subjected to the oblique photographing correction has a rectangular shape such as the white board 16, the positioning of the correction image K with respect to the field and the input of the horizontal dimension thereof can easily be performed by displaying the indicator lines 21, 22 and the markers 23, 23', 24, 24' in the liquid crystal display portion 19.

The positioning of the correction image K with respect to the field and the input of the horizontal dimension thereof are performed as follows. In the case that the angle of inclination θ for the left side oblique photographing is set by the mode setting switch 11, a display as shown in FIG. 9 is made in the liquid crystal display portion 19 to allow the visual confirmation of the operated amount of the object width setting switch 15. The markers 23, 23' are fixed on the indicator line 21, while the display positions of the markers 24, 24' move along the transverse direction according to the operated amount of the object width setting switch 15 to the left and right. The fixed markers 23, 23' have triangular shape vertically longer than the shape of the movable markers 24, 24' so as to make them distinguishable.

When the camera operator aligns the left side of the correction image K with the indicator line 21 and matches the display positions of the markers 24, 24' with the right side of the correction image K by operating the object width setting switch 15, the photographing position of the correction image K with respect to the field can be set, and the horizontal dimension d of the correction image K on the sensing surface of the CCD 18 can be input based on a position information of the markers 23, 24 (or 23', 24') (i.e., width d' of the correction image K).

Figure 11:
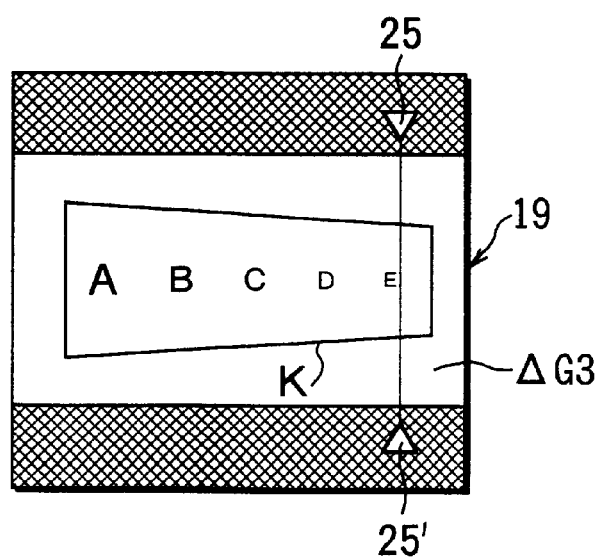
FIG. 11 is a diagram showing a marker indicating an oblique photographing correction permissible range in the liquid crystal display portion.

Further, in the case that the angle of inclination θ for the right side oblique photographing is set by the mode setting switch 11, a display as shown in FIG. 11 is made in the liquid crystal display portion 19 to allow the visual confirmation of the operated amount of the object width setting switch 15. The markers 24, 24' are fixed on the indicator line 22, while the display positions of the markers 23, 23' move along the transverse direction according to the operated amount of the object width setting switch 15 to the left and right. When, contrary to the left side oblique photographing, the camera operator aligns the right side of the correction image K with the indicator line 22 and matches the display positions of the markers 23, 23' with the left side of the correction image K by operating the object width setting switch 15, the photographing position of the correction image K with respect to the field can be set, and the horizontal dimension d of the correction image K on the sensing surface of the CCD 18 can be input.

Further, when the horizontal dimension d of the correction image K is input, a pair of markers 25, 25' indicating the correction permissible range are displayed at the upper and lower sides of the liquid crystal display portion 19 as shown in FIG. 11.

Figure 12B:
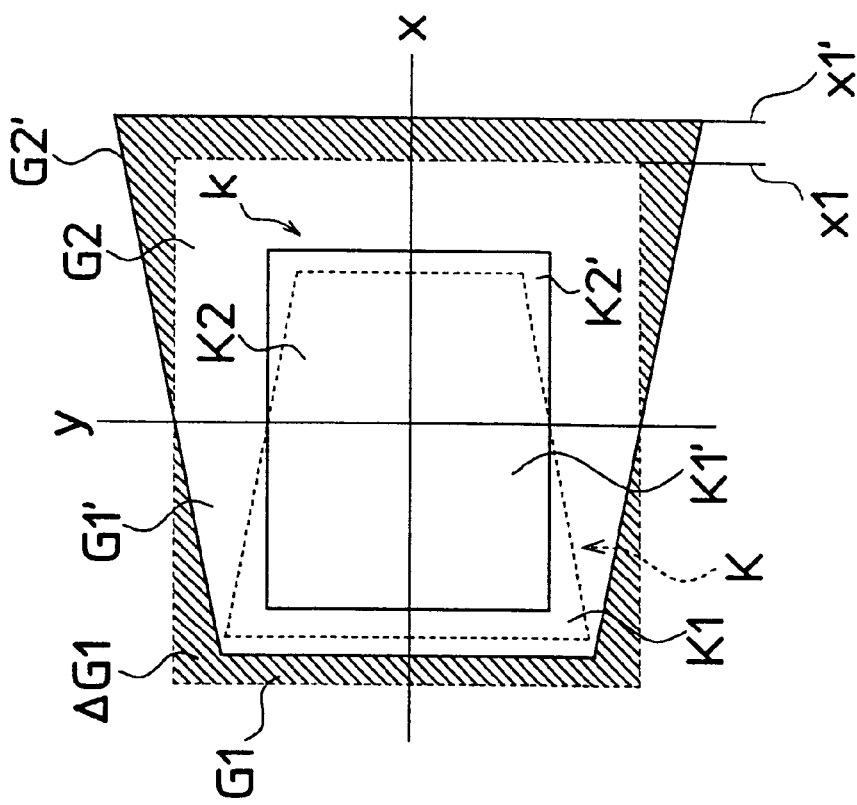
Figure 12A:
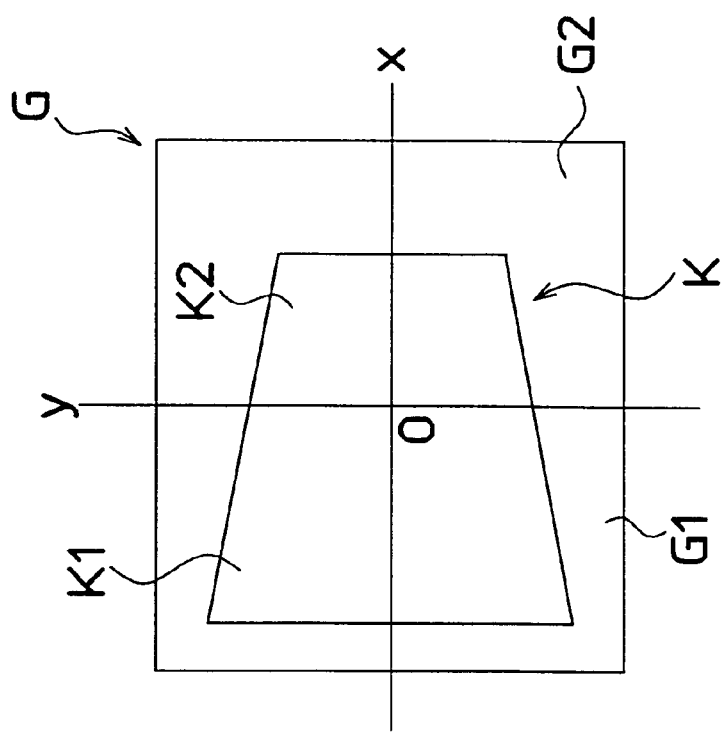

The markers 25, 25' indicate that an area ΔG3 on the right side thereof bulges out of the field frame 20 when the oblique photographing correction is performed. FIGS. 12A and 12B are diagrams showing an image processing method for correcting the photographed oblique image into a pseudo front image, wherein FIG. 12A shows an image before the correction and FIG. 12B shows the image after the correction. As shown in FIG. 12B, a right end x1' of an image G2' obtained by expanding or enlarging an image G2 in the right half is located outside a right end x1 of the image G2. Accordingly, an image between x1 and x1' is going to be lost after the correction. The markers 25, 25' indicate a position corresponding to the position x1 of the image, in the image before the correction, beyond which the image is going to be lost. Thus, in the example of FIG. 11, a portion of the correction image K on the right side of the markers 25, 25' is missing in the image after the oblique photographing correction.

FIG. 11 shows an exemplary image obtained by the left side oblique photographing. In the case of an image obtained by the right side oblique photographing, the markers 25, 25' are displayed in the left half of the field frame 20 and a portion of the image on the left side of the markers 25, 25' bulges out of the field frame 20 after the correction.

The calculation of the display positions of the markers 25, 25' is described below, taking the image obtained by the left side oblique photographing as an example.

In FIG. 6, if Lo denotes a dimension of the picked image along x-axis of the CCD 18 (distance between the opposite end points S and H); F', D' denote intersections of a line segment passing points S and O with the extension of a line segment PF and the line segment N0, respectively; K, J denote intersections of a line segment passing points S and O with a line segment PG and the line segment N0, respectively; V denotes an intersection of a line normal to the optic axis L and passing point F' with the optic axis L; and a portion of the picked image corresponding to an image between points F and J of the white board 16 is to fall within the field frame 20 after the oblique photographing correction, $JF'=PJ+PF'=\kappa \cdot L_0$.

Since the angle of view $\alpha$ is a maximum value (known value) of $\alpha i$ and PF' is a constant value, by calculating an angle of view $\phi$ for PJ in accordance with the equation: $PJ=\kappa \cdot L_0-PF'$, point T corresponding to the display position of the markers 25, 25' can be obtained. In other words, PJ is expressed in following Equation (3):

$$PJ=PK/[(1-\tan(\phi)\cdot\tan(\theta))\cdot\cos(\theta)]$$

$$PK=OP\cdot\tan(\phi)$$

$$\therefore PJ=OP\cdot\tan(\phi)/[(1-\tan(\phi)\cdot\tan(\theta))\cdot\cos(\theta)] \quad (3)$$

If this equation is substituted into $PJ=\kappa \cdot L_0-PF'$, $\tan(\phi)$ is expressed in Equation (4) through the relational expressions:

$$(1-\tan(\phi)\cdot\tan(\theta))\cdot\cos(\theta)/\tan(\phi)=OP/(\kappa\cdot L_0-PF')$$

$$(1-\tan(\phi)\cdot\tan(\theta))\cdot\cos(\theta)/\tan(\phi) =\cos(\theta)/\tan(\phi)-\sin(\theta)\cos(\theta)/\tan(\phi)-\sin(\theta)=OP/(\kappa\cdot L_0-PF')$$

$$\therefore \tan(\phi)=\cos(\theta)/[OP/(\kappa\cdot L_0-PF')+\sin(\theta)] \quad (4).$$

Accordingly, point T on the sensing surface of the CCD 18 is calculated by $OA\cdot\tan(\phi)$.

As described above, in the oblique photographing correction mode, when the release button 14 is pressed halfway, the markers 25, 25' indicating the correction permissible range are displayed in the liquid crystal display portion 19 of the viewfinder. Since the camera operator can confirm before the photographing as to whether or not a portion of the correction image K in the field frame 20 will be missing after the oblique photographing correction, and can also confirm the size of the missing portion of the correction image K in the case that the portion of the correction image K will be missing. Accordingly, a failure in the oblique photographing can securely be prevented.

Although the liquid crystal display portion 19 is provided in the viewfinder and the correction permissible range is indicated by the markers 25, 25' in this embodiment, the correction permissible range may be displayed in a liquid crystal display portion provided at the camera main body. Further, although the liquid crystal display portion 19 is provided outside the field in this embodiment, there may be provided a liquid crystal display portion superimposed on the field. In such a case, the correction permissible range may be indicated by shadowing a portion of the correction image K to be missed from the field after the oblique photographing correction. Such an arrangement enables a more accurate indication of the correction permissible range than the markers 25, 25'.

Figure 13:
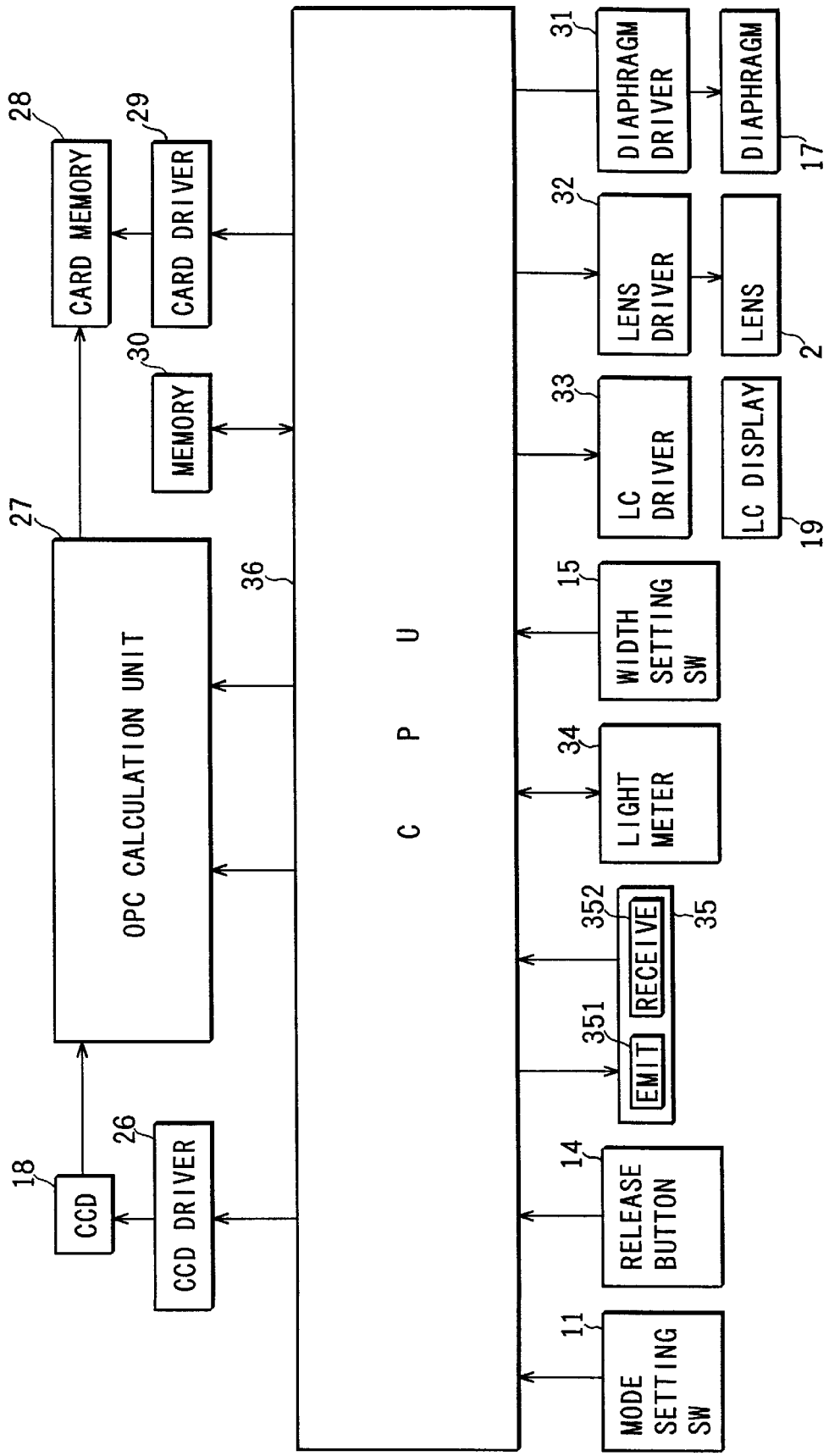
FIG. 13 is a block diagram showing a construction of the first electronic camera.

FIG. 13 is a block diagram showing a construction of the camera 1 according to the invention.

In FIG. 13, the same members as those described above are identified by the same reference numerals. A CCD driver 26 controls the image pickup operation of the CCD 18 based on a shutter speed Tv of the exposure control value input from a CPU 36. The CCD 18 performs the image pickup operation (charge storing operation) in accordance with a control signal input from the CCD driver 26, and outputs the respective pixel data to an oblique photographing correction (OPC) calculation unit 27 after converting it into time series data.

The OPC calculation unit 27 applies correction to the correction image in the oblique photographing correction mode. Specifically, the OPC calculation unit 27 corrects the photographed oblique image into a pseudo front image by applying enlargement and/or reduction processing to the oblique image along the horizontal direction (x-axis direction of FIG. 3) and the vertical direction (y-axis direction of FIG. 3) in accordance with the aforementioned principle of the oblique photographing correction.

In FIG. 12, xy-coordinate systems are orthogonal coordinate systems tentatively provided for an image G picked up by the CCD 18 (image constructed by pixel data), and its origin is set in the center of the image G.

Since the focus adjustment position of the camera 1 is set in the center of the field (origin 0 of the xy-coordinate systems) in this embodiment, a portion of the correction image K on y-axis is accurately in focus. An image K1 on the left side of y-axis is an image inclined toward the camera 1, whereas an image K2 on the right side of y-axis is an image inclined away from the camera 1.

Accordingly, as shown in FIG. 12B, the image G1 of the image G on the left side of y-axis is reduced with respect to both x- and y-axes so as to obtain an image G1'. In this way, the trapezoidal oblique image K1 is corrected into a rectangular reduced image K1'. The image G2 on the right side of y-axis is enlarged with respect to both x- and y-axes to obtain an image G2'. In this way, a trapezoidal oblique image K1 is corrected into a rectangular enlarged image K2'.

Figure 14:
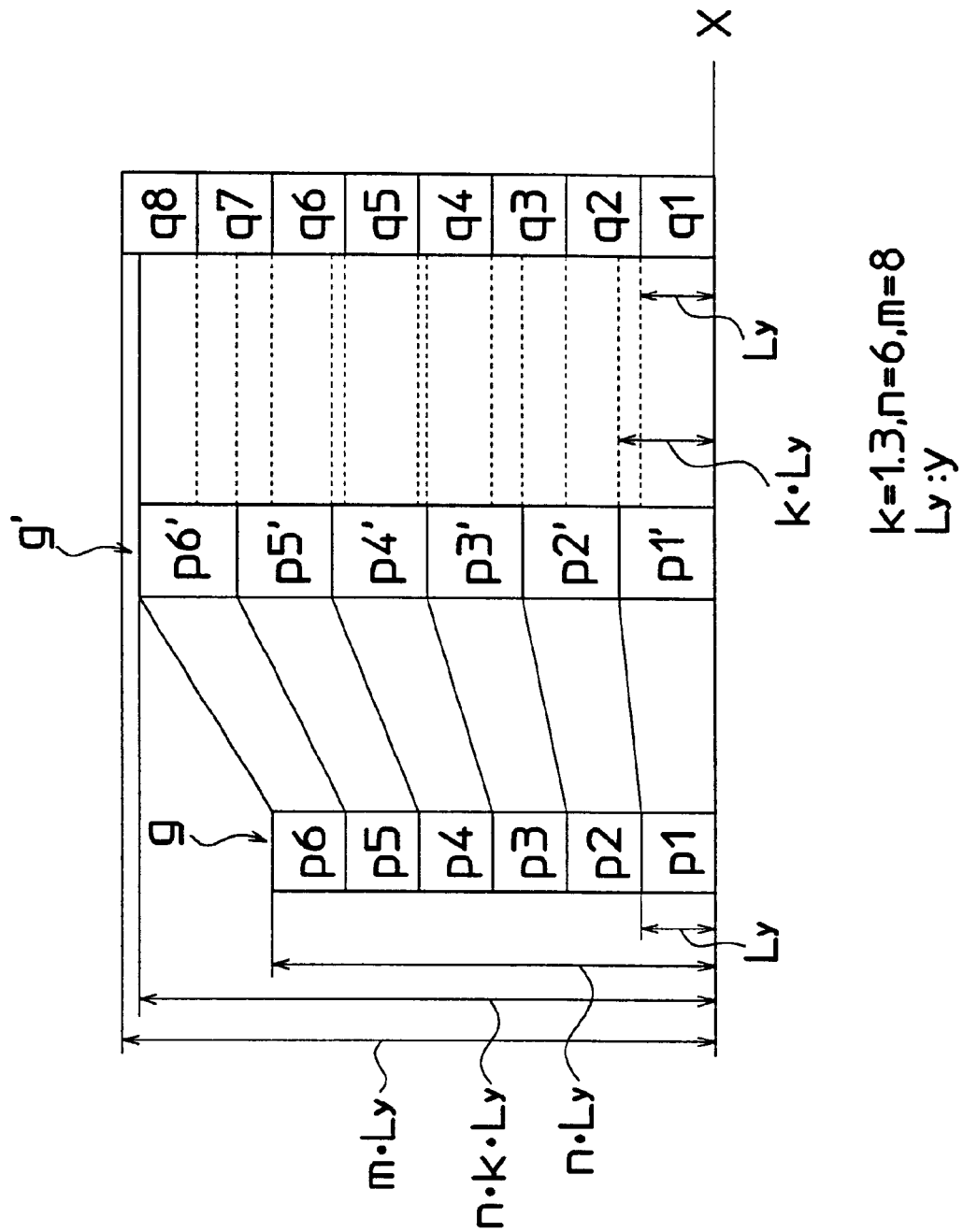
FIG. 14 is a diagram showing an enlargement processing for enlarging an image along y-axis.

FIG. 14 is a diagram showing the image enlargement processing with respect to the y-axis direction.

Since the object surface is not inclined with respect to the sensing surface of the CCD 18 along the y-axis direction, a processing for correcting the picked image into an image enlarged at a magnification k(>1) is a processing for replacing the respective pixel data constituting the picked image (image before the correction) by the respective pixel data constituting the picked image which could be obtained by picking up an image obtained by enlarging the original image at the magnification k. Since the picked image which could be obtained by picking up the image obtained by enlarging the original image at the magnification k is equivalent to an image obtained by uniformly enlarging the pixel data pi (i=1, 2 . . . ) constituting the image before the correction, the respective pixel data qi (i=1, 2 . . . ) constituting the image after the correction are equivalent to the respective pixel data constituting an image which could be obtained by picking up the enlarged image constituted by the enlarged pixel data pi' by the CCD 18.

FIG. 14 shows an example in which an image g before the correction is constituted by data of n (n=6) pixels p1 to p6 and is enlarged at a magnification k (1.0<k<2.0). "□" denotes a pixel data, and p1' to p6' are pixels obtained by uniformly enlarging the pixels p1 to p6 at the magnification k (k=1.3). Further, q1 to q8 denote pixels constituting an image obtained by picking up the enlarged image g' constituted by the data of the pixels p1' to p6' by the CCD 18.

Generally, a pixel number m (integer) required to constitute the enlarged image g' obtained by enlarging the picked image g constituted by the data of n (integer) pixels at the magnification k is calculated as follows. Assuming that $L_y$ denotes the interval of the pixels pi along the y-axis direction, the dimension of the enlarged image g' along the y-axis direction is $n \cdot k \cdot L_y$. Accordingly, if N and R (0≦R<1) denote an integer portion and a decimal portion of $n \cdot k \cdot L_y / L_y = n \cdot k$, m=N if R=0 and m=N+1 if R≠0. In the example of FIG. 14, since k=1.3 and n=6, n·k=7.8. Accordingly, m=7+1=8.

Next, a density level Qi of the pixel qi (i=1, 2, . . . 8) is equal to a density level Pj of a single pixel pj' (j=1, 2, . . . 6) or a density level obtained by combining density levels P(j−1)', Pj' of two neighboring pixels p(j−1)', pj' at a specified ratio η as shown in FIG. 14 since the single pixel pj' (j=1, 2, . . . 8) can overlap over at maximum three pixels q(i−1), qi, q(i+1) at the magnification k of 1.0<k<2.0. Accordingly, the density level Qi of the pixel qi is expressed as follows: Qi=(1−η1)·P(j−1)'+η1·Pj'=(1−η1)·P(j−1)+η1·Pj where 0≦η1<1.

Generally, if the magnification k is: r<k<r+1 (r=2, 3, . . . ), the density level Qi of the pixel qi is expressed as follows: Qi=(1−η1−η2 . . . −ηr)·P(j−r)+η1·P(j−r+1)+ . . . η(r−1)·P(j−1)+ηr·Pj, where 0≦η1+η2 . . . +ηr<1.

A relationship of the ratio η, the density level Qi and the density levels P(j−1)', Pj' is calculated as follows.

(A) Case where the density level Qi is a combination of the density levels P(j−1)', Pj':

Since a condition of the density level Qi to be a combination of the density levels P(j−1)', pj' is that a lower limit (i−1)·$L_y$ of an area of the pixel qi along the y-axis direction is within an area of the pixel p(j−1)' and that an upper limit i·$L_y$ thereof is within an area of the pixel pj', following condition Equations (5), (6) are established:

$$(j-1) \cdot k \cdot L_y < i \cdot L_y < j \cdot k \cdot L_y \quad (5)$$

$$(j-2) \cdot k \cdot L_y < (i-1) \cdot L_y < (j-1) \cdot k \cdot L_y \quad (6).$$

By transforming Equations (5), (6) and put them together, following Equation (7) is obtained:

$$(j-1) < i/k < (j-1)+1/k \text{ where } 0.5 < 1/k < 1 \quad (7).$$

If i/k=M(integer portion)+S(decimal portion), (j−1)<M+S<(j−1)+1/k. If S<1/k, M=j−1.

$$\eta 1 = [i \cdot L_y - (j-1) \cdot k \cdot L_y] / L_y$$
$$= i - (j-1) \cdot k = i - M \cdot k = k \cdot S.$$

Accordingly, if i/k=M(integer portion)+S(decimal portion), in the case that k·S<1, $$Qi = (1 - k \cdot S) \cdot P'_M + k \cdot S \cdot P'_{(M+1)} \quad (8)$$
$$= (1 - k \cdot S) \cdot P_M + k \cdot S \cdot P_{(M+1)}.$$

(B) Case where the density level Qi is equal to the density level Pj':

Since a condition of the density level Qi to be equal to the density level Pj' is that the lower limit (i−1)·$L_y$ and the upper limit i·$L_y$ are within an area of the pixel pj', following condition Equations (9), (10) are established:

$$(j-1) \cdot k \cdot L_y \leq i \cdot L_y \leq j \cdot k \cdot L_y \quad (9)$$

$$(j-1) \cdot k \cdot L_y \leq (i-1) \cdot L_y \leq j \cdot k \cdot L_y \quad (10).$$

If Equations (9), (10) are transformed and put together, Equation (11) can be obtained:

$$(j-1)+1/k \leq i/k \leq (j-1)$$

$$(j-1)+1/k \leq M+S \leq (j-1) \quad (11)$$

If 1≦k·S, M=j−1.
Accordingly, 1<k·S, $$Qi = P_{(M+1)}' = P_{(M+1)} \quad (12)$$

From the above, if Equations (8), (12) are put together, the density level Qi of the pixel qi is expressed as in Equation (13):

$$Qi = (1-\eta 1) \cdot P_{j-1} + \eta 1 \cdot P_j \quad (13).$$

If i/k=M(integer portion)+S(decimal portion), in the case that k·S<1, η1=k·S, j=M+1 and in the case that k·S ≧1, η1=1.0, j=M+1.

The calculation equations of the density levels Qi of the respective pixels qi in the example of FIG. 14 obtained from Equation (13) are as shown in TABLE-1 below.

TABLE-1

| PIXEL | M | S | k · S | CALCULATION EQUATION OF Qi |
|---|---|---|---|---|
| q1 | 1 | 0.77 | 1.00 | Q1 = P1 |
| q2 | 2 | 0.54 | 0.70 | Q2 = 0.3 · P1 + 0.7 · P2 |
| q3 | 3 | 0.31 | 0.40 | Q3 = 0.6 · P2 + 0.4 · P3 |
| q4 | 4 | 0.08 | 0.10 | Q4 = 0.9 · P3 + 0.1 · P4 |
| q5 | 5 | 0.85 | 1.00 | Q5 = P4 |
| q6 | 6 | 0.62 | 0.80 | Q6 = 0.2 · P4 + 0.8 · P5 |
| q7 | 7 | 0.38 | 0.50 | Q7 = 0.5 · P5 + 0.5 · P6 |
| q8 | 8 | 0.15 | 0.20 | Q8 = 0.8 · P6 + 0.2 · P7 |

Note) Since P7 does not exist in FIG. 14, a dummy data is used. In this table, k = 1.3.

Figure 15:
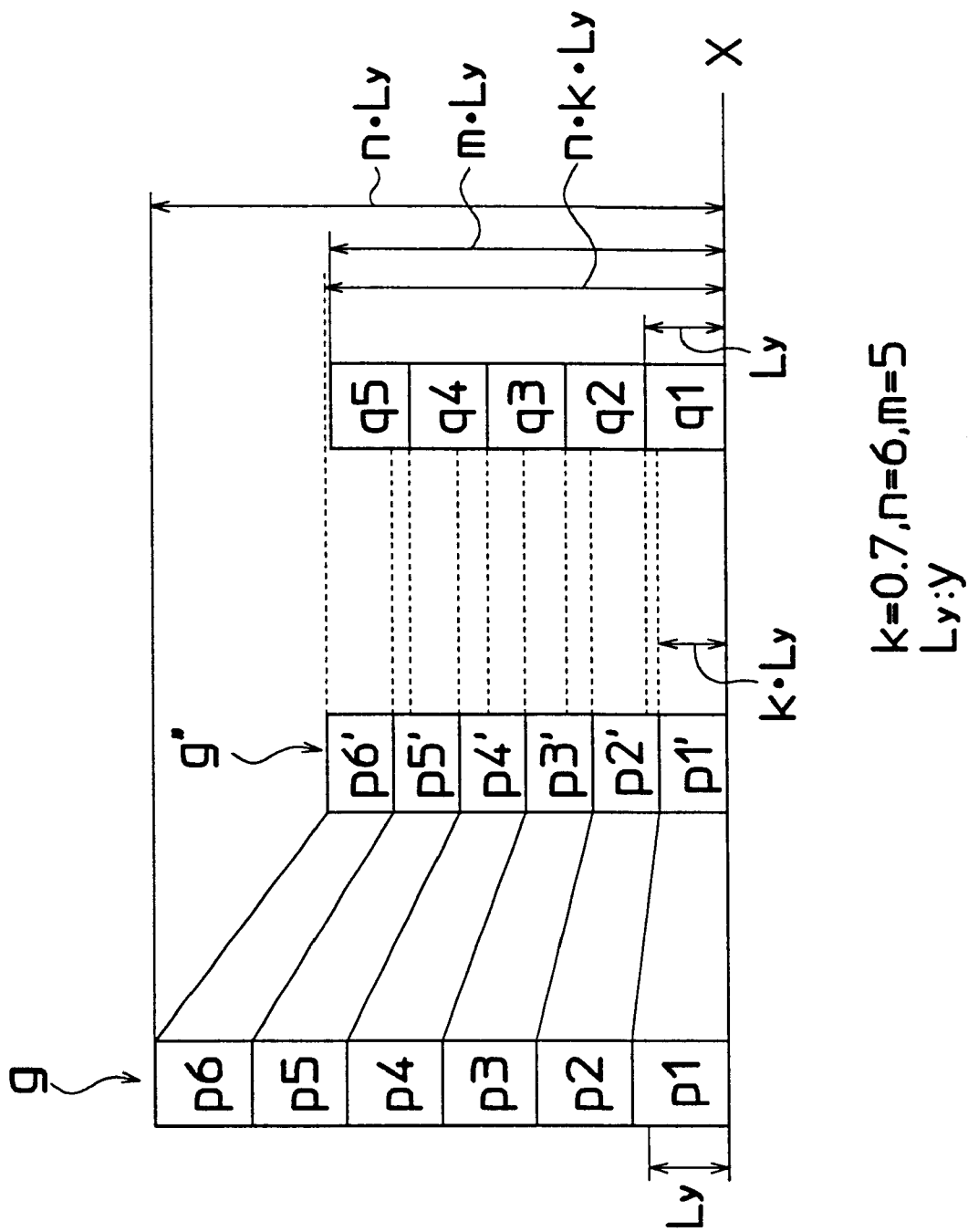
FIG. 15 is a diagram showing a reduction processing for reducing an image along y-axis.

FIG. 15 is a diagram showing an image reduction processing with respect to the y-axis direction.

A processing for correcting the picked image into an image reduced at a magnification k (<1) along the y-axis direction is a processing for replacing the respective pixel data constituting the picked image by the respective pixel data constituting the picked image which could be obtained by picking up an image obtained by reducing the original image at the magnification k. Since the picked image which could be obtained by picking up the image obtained by reducing the original image at the magnification k is equivalent to an image obtained by uniformly reducing the pixel data pi (i=1, 2 . . . ) constituting the image before the correction, the respective pixel data qi (i=1, 2 . . . ) constituting the image after the correction are equivalent to the respective pixel data constituting an image obtained by picking up the reduced image constituted by the reduced pixel data pi' by the CCD 18.

FIG. 15 shows an example in which the image g before the correction is constituted by data of n (n=6) pixels p1 to p6 and is reduced at a magnification k (0.5<k<1.0). "□" denotes a pixel data, and p1' to p6' are pixels obtained by uniformly reducing the pixels p1 to p6 at the magnification k (k=0.7). Further, q1 to q5 denote pixels constituting an image obtained by picking up the reduced image g" constituted by the data of the pixels p1' to p6' by the CCD 18.

A pixel number m required to constitute the reduced image g" obtained by reducing the picked image g constituted by the data of n pixels at the magnification k is calculated in the similar equations as in the case of the enlargement processing. Specifically, in k·n=N(integer portion)+R(decimal portion), m=N if R=0 and m=N+1 if R≠0. In the example of FIG. 15, since K=0.7 and n=6, k·n=4.2 and accordingly m=4+1=5.

Next, a density level Qi of the pixel qi (i=1, 2, . . . 5) is a density level obtained by combining density levels P(j−1)', Pj' of two neighboring pixels p(j−1)', pj' (j=1, 2, . . . 6) at a specified ratio η or a density level obtained by combining density levels P(j−1)', Pj', P(J+1)' of three neighboring pixels p(j−1)', pj', p(i+1)' as shown in FIG. 15 since the single pixel pj' (j=1, 2, . . . 8) can overlap over at maximum three pixels p(j−1)', pj', p(j+1)' at the magnification k of 0.5<k<1.0. Accordingly, the density level Qi of the pixel qi is expressed as follows: Qi=(1−η1−η2)·P(j−1)'+η1·Pj'+η2·P(j+1)'= (1η1−η2)·P(j−1)+η1·Pj+η2·P(j+1) where 0≦η1+η2<1.

A relationship of the ratios η1, η2, the density level Qi and the density levels P(j−1)', Pj', P(j+1)' is calculated as follows.

(C) Case where the density level Qi is a combination of the density levels P(j−1)', Pj', P(j+1)'

Since a condition of the density level Qi to be a combination of the density levels P(j−1)', Pj', P(j+1)' is that the lower and upper limits (i−1)·$L_y$, i·$L_y$ of the area of the pixel qi along the y-axis direction is within the area of the pixel p(j−1)' and within the area of the pixel pj', following condition Equations (14), (15) are established:

$$j \cdot k \cdot L_y < i \cdot L_y < (j+1) \cdot k \cdot L_y \quad (14)$$

$$(j-2) \cdot k \cdot L_y < (i-1) \cdot L_y < (j-1) \cdot k \cdot L_y \quad (15)$$

Since 0.5<1/k<1.0, if Equations (14), (15) are transformed and put them together assuming that k=1/(1+Δr), 0<Δr<1.0, following Equation (16) is obtained:

$$j < i/k < (j+\Delta r) \quad (16)$$

If (1+Δr) i=i/k=M+S, j<M+S<(j+Δr). If S<Δr (=(1−k)/k), M=j.

At this time, the ratio η1 is: η1=k·$L_y$/$L_y$=k, and the ratio η2 is:

$$\eta 2 = [i \cdot L_y - j \cdot k \cdot L_y]/L_y$$

$$= i - j \cdot k = i - M \cdot k = k \cdot S.$$

Accordingly, if i/k=M(integer portion)+S(decimal portion), in the case that S<(1−k)/k, the density level Qi is expressed in following Equation (17):

$$Qi = (1 - k - k \cdot S) \cdot P'_{(M-1)} + k \cdot P'_M + k \cdot S \cdot P'_{(M+1)} \quad (17)$$

$$= (1 - k - k \cdot S) \cdot P_{(M-1)} + k \cdot P_M + k \cdot S \cdot P_{(M+1)}.$$

(D) Case where the density level Qi is a combination of the density levels P(j−1)', Pj'

Since a condition of the density level Qi to be a combination of the density levels P(j−1)', Pj' is that the lower limit (i−1)·$L_y$ is within the area of the pixel p(j−1)' and that the upper limit i·$L_y$ is within the area of the pixel pj', following condition Equations (18), (19)are established:

$$(j-1) \cdot k \cdot L_y < i \cdot L_y < j \cdot k \cdot L_y \quad (18)$$

$$(j-2) \cdot k \cdot L_y < (i-1) \cdot L_y < (j-1) \cdot K \cdot L_y \quad (19).$$

By transforming Equations (18), (19) and put them together, following Equation (20) is obtained:

$$(j-1) + \Delta r < M + S < j \quad (20).$$

From Equation (20), if Δr (=(1−k)/k)≦S<1.0, M=j−1. At this time, the ratio η1 is:

$$\eta 1 = [i \cdot L_y - (j-1) \cdot k \cdot L_y]/L_y$$

$$= i - (j - 1) \cdot k = i - M \cdot k = k \cdot S.$$

Accordingly, if (1−k)/k≦S, the density level Qi is expressed in following Equation (21):

$$Qi = (1 - k \cdot S) \cdot P'_{(M-1)} + k \cdot S \cdot P'_M \quad (21)$$

$$= (1 - k \cdot S) \cdot P_{(M-1)} + k \cdot S \cdot P_M.$$

From the above, if Equations (17), (21) are put together, the density level Qi of the pixel qi is expressed as in Equation (22):

$$Qi = (1-\eta 1-\eta 2) \cdot P_{j-1} + \eta 1 \cdot P_j + \eta 2 \cdot P_{j+1} \quad (22).$$

If i/k=M(integer portion)+S(decimal portion), η1=k·S, η2=0, j=M+1 in the case that 1−k≦k·S and η1=k, η2=k·S, j=M in the case that k·S<1−k.

The calculation equations of the density levels Qi of the respective pixels qi in the example of FIG. 15 obtained from Equation (20) are as shown in TABLE-2 below.

TABLE-2

| PIXEL | M | S | k · S | CALCULATION EQUATION OF Qi |
|---|---|---|---|---|
| q1 | 1 | 0.43 | 0.30 | Q1 = 0.7 · P1 + 0.3 · P2 |
| q2 | 2 | 0.86 | 0.60 | Q2 = 0.4 · P2 + 0.6 · P3 |
| q3 | 3 | 0.29 | 0.20 | Q3 = 0.1 · P3 + 0.7 · P4 + 0.2 · P5 |

TABLE-2-continued

| PIXEL | M | S | k · S | CALCULATION EQUATION OF Qi |
|---|---|---|---|---|
| q4 | 4 | 0.71 | 0.50 | Q4 = 0.5 · P5 + 0.5 · P6 |
| q5 | 5 | 0.14 | 0.10 | Q5 = 0.2 · P6 + 0.7 · P7 + 0.1 · P8 |

Note) Since P7, P8 do not exist in the example of FIG. 15, dummy data are used. In this table, k = 0.7.

The enlargement and reduction of the image with respect to the x-axis direction can be performed based on the same concept of the enlargement and reduction of the image with respect to the z-axis direction. The calculation equations for the density levels Qi of the pixels qi after the correction can be derived in the same method as described in cases (A) to (D). Along the x-axis direction, the enlargement processing is performed based on the photographing magnification mi while the reduction processing is performed based on the photographing magnification mi', and the magnification k differs for each pixel. Accordingly, the calculation equations need to be derived by replacing the fixed magnification k by the magnification ki for each pixel.

In the case of enlargement processing, the magnification ki in an arbitrary pixel position between points A and C in FIG. 6 is expressed as a product of an inverse of a ratio of the photographing magnification mi in this pixel position to the photographing magnification $m_A$ at point A ($m_A$/mi) and a correction coefficient (1/cos(θ)) for correcting an oblique image into a front image, i.e., ki=($m_A$/mi)/cos(θ). On the other hand, since mi/$m_A$=1−tan(βi)·tan(θ)=cos(βi+θ)/(cos(βi)·cos(θ)) from Equation (2), the enlargement magnification ki is calculated by following Equations (23), (24):

$$ki = 1/[(1 - \tan(\beta i) \cdot \tan(\theta)) \cdot \cos(\theta)] \quad (23)$$

$$= \cos(\beta i)/\cos(\beta i + \theta). \quad (24)$$

In the case of reduction processing, the reduction magnification ki' in an arbitrary pixel position between points B and A in FIG. 6 is expressed as a product of an inverse of a ratio of the photographing magnification mi' in a pixel position d to the photographing magnification $m_A$ at point A ($m_A$/mi') and the correction coefficient (1/cos(θ)) for correcting an oblique image into a front image, i.e., ki'=($m_A$/mi')/cos(θ) On the other hand, since mi'/$m_A$=tan(αi). tan(θ)= cos(αi−θ)/(cos(βi) cos(θ)) from Equation (1), the reduction magnification ki' is calculated by Equations (25), (26):

$$ki' = 1/[(1 + \tan(\alpha i) \cdot \tan(\theta))/\cos(\theta)] \quad (25)$$

$$= \cos(\alpha i)/\cos(\alpha i - \theta). \quad (26)$$

Figure 16:
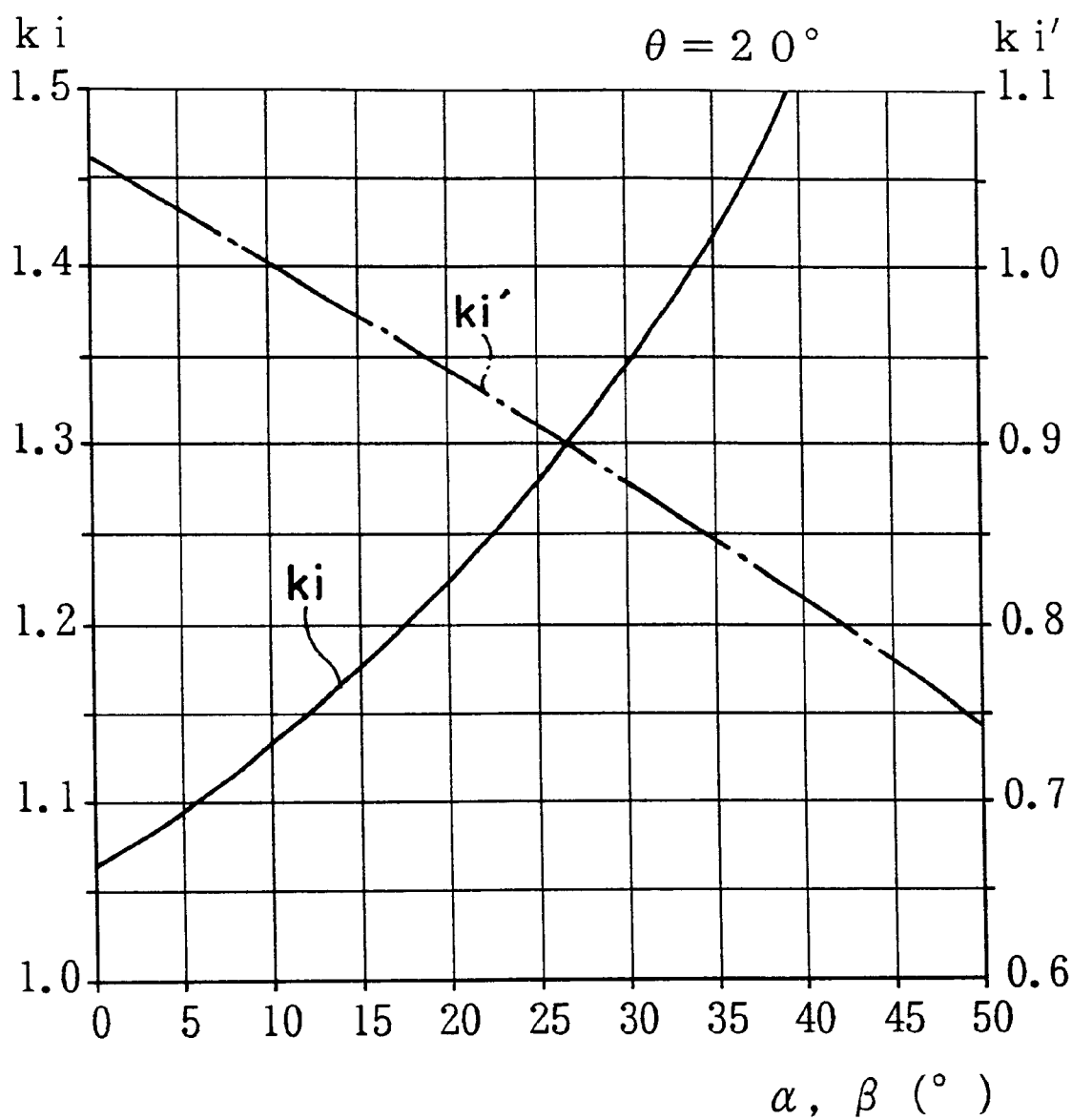
FIG. 16 is a graph showing an enlargement magnification ki and a reduction magnification ki' at an angle of inclination $\theta=20°$.

FIG. 16 is a graph showing the enlargement and reduction magnification ki, ki' calculated at an angle of inclination of 20° in accordance with Equations (24), (26). In FIG. 16, the reduction magnification ki' exceeds 1.0 in a range where the angle of view α is small (center area of the field). This is because the enlargement magnification based on the correction coefficient is larger than the reduction magnification based on the photographing magnification in this range. If α=0° is assumed to be a reference, the reduction processing is performed in a range of α>0°, and the enlargement processing is performed in a range of β>0°. In this respect, the image between points B and A is subjected to the reduction processing, whereas the image between points B and C are subjected to the enlargement processing for the sake of convenience.

As shown in FIG. 16, since the range of the enlargement magnification ki is normally 1.0<ki<2.0 and the range of the reduction magnification ki' is normally 0.5<ki'<1.0, the calculation equations for the density levels Qi of the respective pixels qi along the x-axis direction can be obtained by replacing the fixed magnification k by the magnification ki or ki' for each pixel and applying the cases (A) to (D). Equation (27) below is a calculation equation for the density levels Qi of the respective pixels qi in the enlargement processing:

$$Qi = \xi 1 \cdot P_j + (1 - \xi 1) \cdot P_{j+1} \quad (27)$$

where i: pixel position after the correction,
j: pixel position before the position,
when i=1, ξ1=1.0, j=1
when i>1, if (i−1)·k(i−1)=X(i)=M(i)(integer portion)+R(i)(decimal portion),
j=j+1 if M(i+1)−M(i)=1,
j=j if M(i+1)−M(i)=2,
ξ1=R(i).

Figure 17:
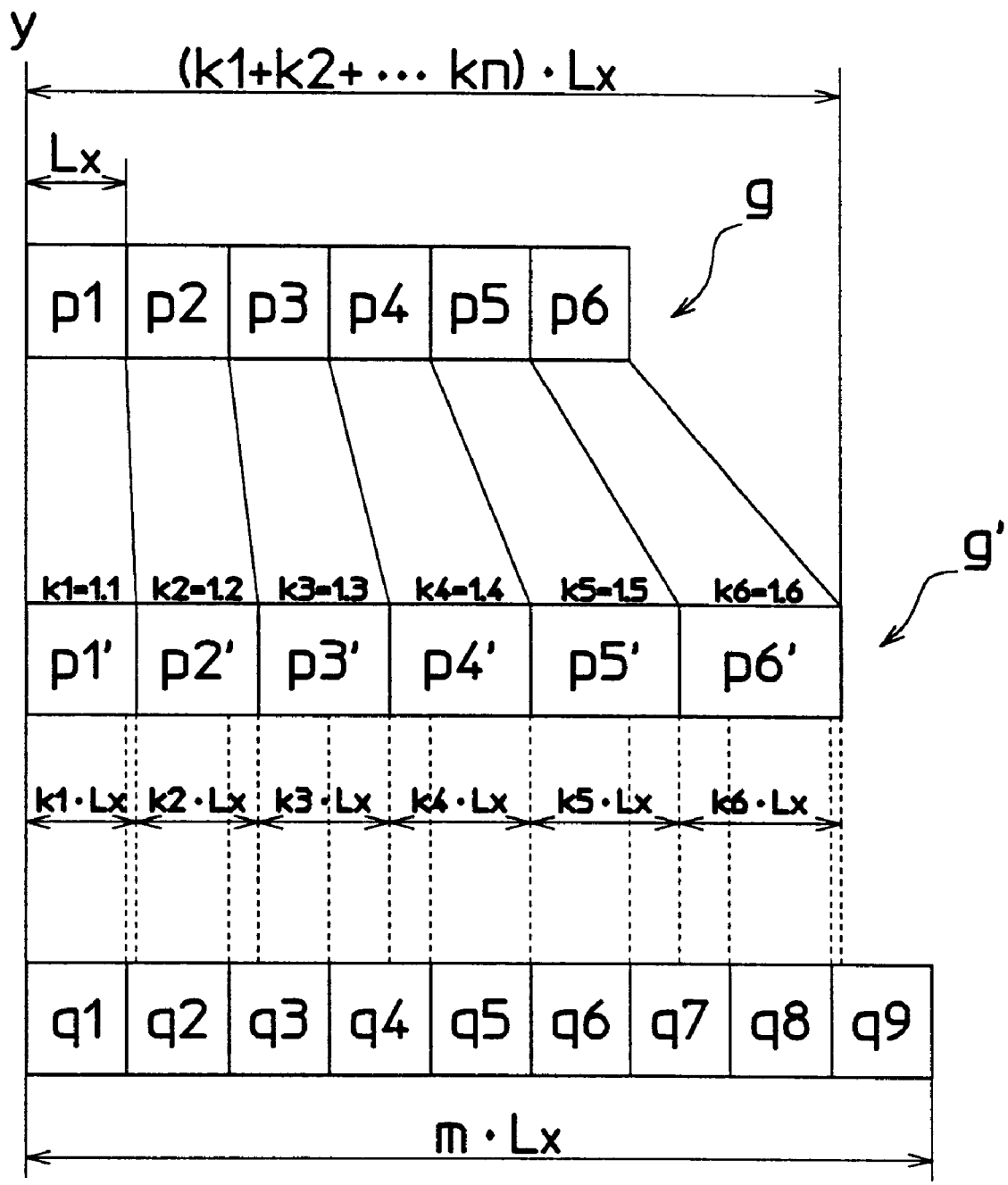
FIG. 17 is a diagram showing an enlargement processing for enlarging an image along x-axis.

FIG. 17 is a diagram showing the image enlargement processing with respect to the x-axis direction and corresponds to FIG. 14. In FIG. 17, the pixels p1 to p6 are pixels constituting the image g before the correction, p1' to p6' are pixels enlarged at magnifications k1, k2, ... k6, respectively, and q1 to q8 are pixels constituting an image which could be obtained by picking up an enlarged image g' constituted by the pixels p1' to p6' by the CCD 18. Further, $L_x$ denotes an interval between pixels along the x-axis direction. In order to facilitate the description, k1, k2, ... k6 shown in FIG. 17 are made larger than the magnifications in the respective pixel positions in an actual case.

In the enlargement processing along the x-axis direction, if N, R denote an integer portion and a decimal portion of (k1+k2+ ... kn)·$L_x$/$L_x$=(k1+k2+ ... +kn), respectively, a number m of the pixels required to constitute an enlarged image is: m=N if R=0, and m=N+1 if R≠0. In the example of FIG. 16, since k1=1.1, ki=k(i−1)+0.1 (i=2, 3, ... 7) and k1+k2+ ... +k6=8.1, m=8+1=9.

The calculation equations for the density levels Qi of the respective pixels qi calculated in accordance with Equation (27) are as shown in TABLE-3.

TABLE-3

| qi | ki | CALCULATION EQUATION OF Qi |
|---|---|---|
| 1 | 1.1 | Q1 = P1 |
| 2 | 1.2 | Q2 = 0.1 · P1 + 0.9 · P2 |
| 3 | 1.3 | Q3 = 0.3 · P2 + 0.7 · P3 |
| 4 | 1.4 | Q4 = 0.6 · P3 + 0.4 · P4 |
| 5 | 1.5 | Q5 = P4 |
| 6 | 1.6 | Q6 = P5 |
| 7 | 1.7 | Q7 = 0.5 · P5 + 0.5 · P6 |
| 8 | 1.8 | Q8 = P6 |
| 9 | 1.9 | Q9 = 0.1 · P6 + 0.9 · P7 |

Note) Since P8 does not exist in FIG. 17, a dummy data is used.

Equation (28) is a calculation equation for the density levels Qi of the respective pixels qi in the reduction processing:

$$Qi = \xi 1 \cdot P_j + \xi 2 \cdot P_{j+1} + (1 - \xi 1 + \xi 2) \cdot P_{j+2} \quad (28)$$

where i: pixel position after the correction,
j: pixel position before the position,
If i·ki=X(i)=M(i)(integer portion)+R(i)(decimal portion),
j=j+2, ξ1=R(i), ξ2=X(i+1)−X(i) in the case that M(i+1)−M(i)=0 or R(i+1)=0, and j=j+1, ξ1=R(i), ξ2=0 in the case that M(i+1)−M(i)=0 and R(i+1)=0.

Figure 18:
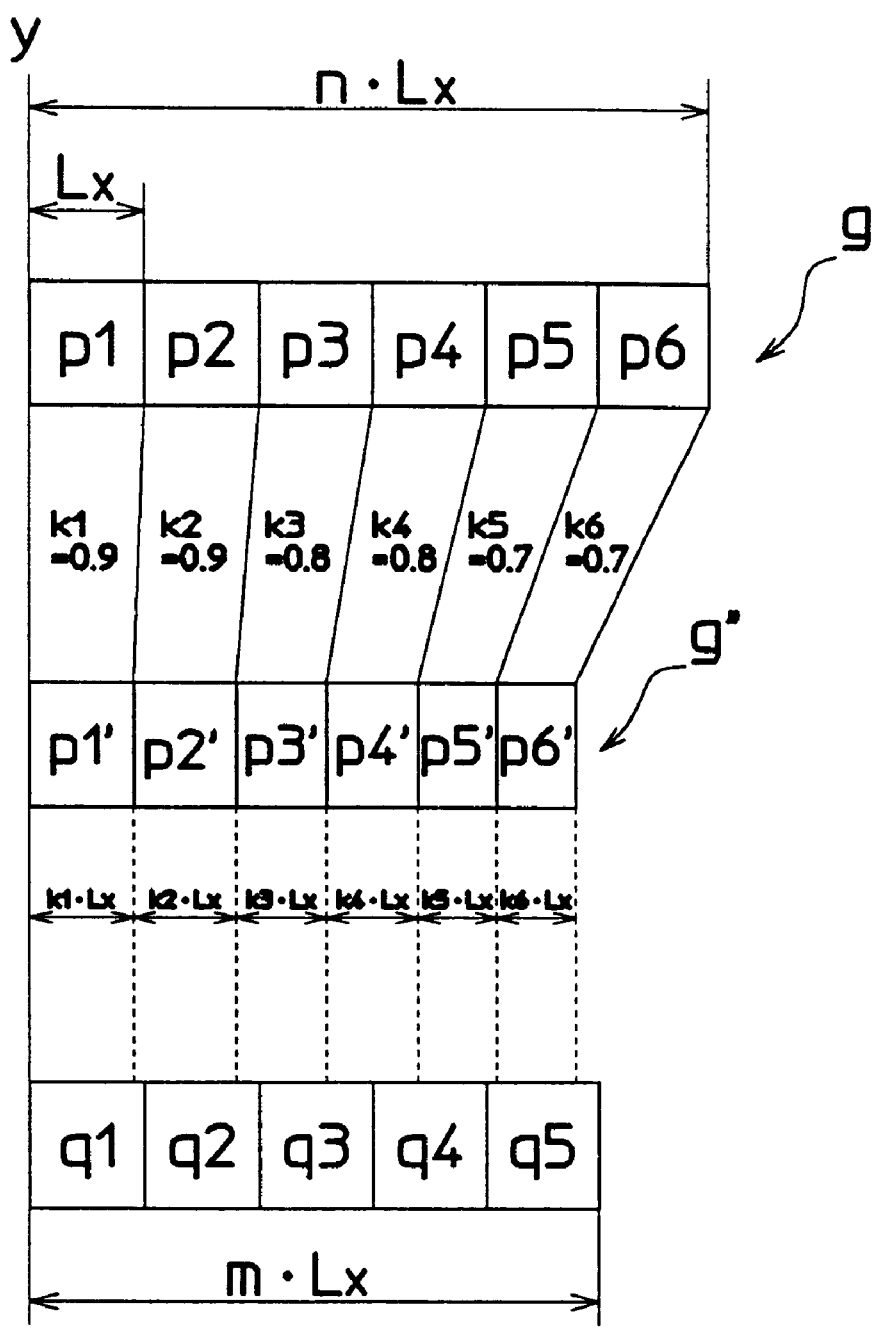
FIG. 18 is a diagram showing a reduction processing for compressing an image along x-axis.
Figure 19:
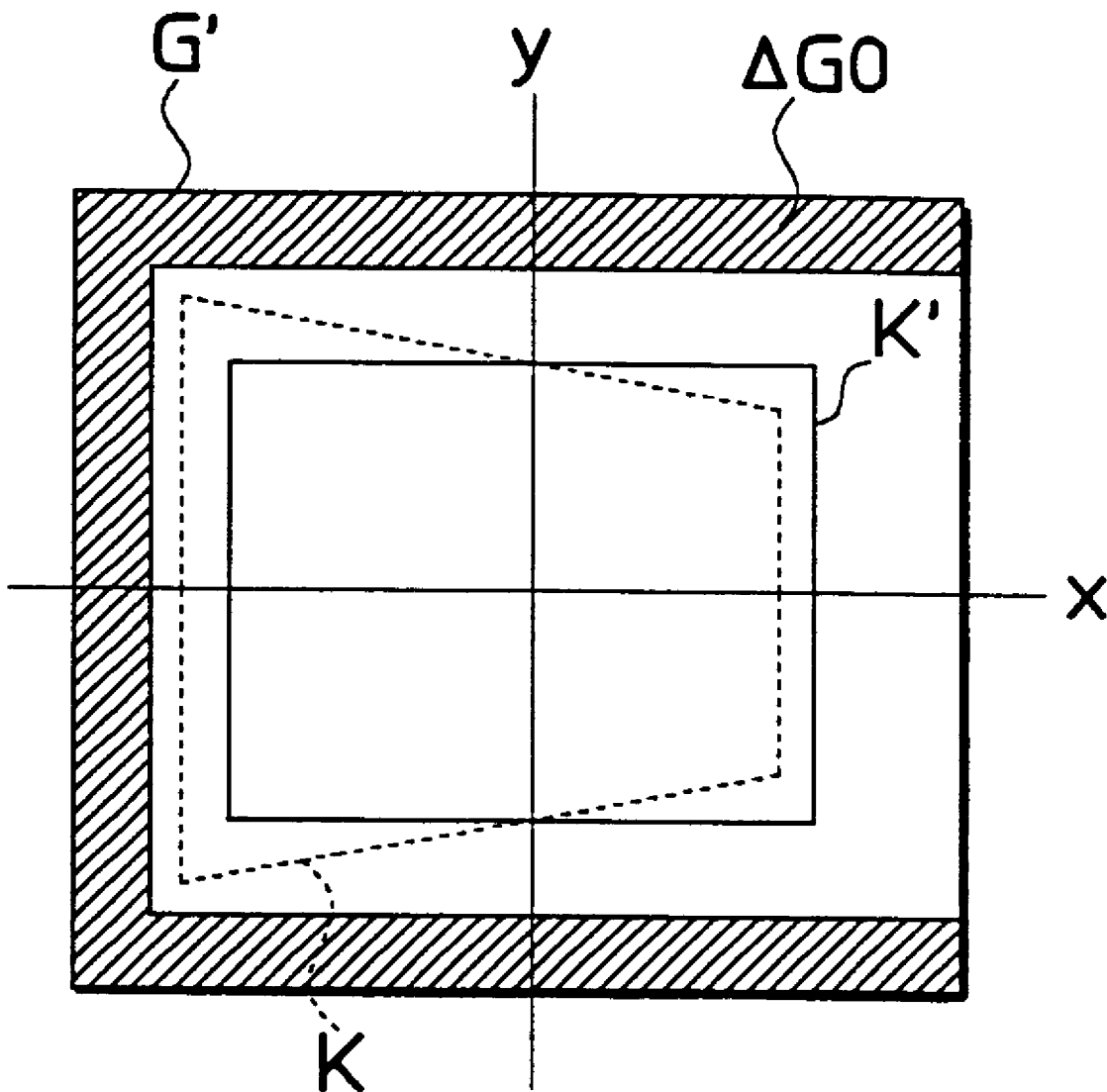
FIG. 19 is a diagram showing an image after the correction of correcting missing pixel data in the reduction processing.

FIG. 18 is a diagram showing an image reduction processing along the x-axis direction and corresponds to FIG. 15. In FIG. 18, p1 to p6 are pixels constituting the image g before the correction, p1' to p6' are pixels obtained by enlarging the pixels p1 to p6 at magnifications k1, k2, . . . k6, respectively, and q1 to q5 are pixels constituting an image which could be obtained by picking up an enlarged image g" constituted by the pixels p1' to p6' by the CCD 18. Further, $L_x$ denotes an interval between pixels along the x-axis direction. In order to facilitate the description, k1, k2, . . . k6 shown in FIG. 18 are different from the magnifications in the respective pixel positions in an actual case.

In the reduction processing along the x-axis direction, a number m of the pixels required to constitute an enlarged image can be calculated by an equation similar to the one used for the enlargement processing. In the example of FIG. 17, since k1 k2=0.9, k3=k4=0.8, k5=k6=0.7, k1+k2+ . . . +k6=4.8, m=4+1=5.

The calculation equations for the density levels Qi of the respective pixels qi calculated in accordance with Equation (28) are as shown in TABLE-4.

TABLE-4

| qi | ki | CALCULATION EQUATION OF Qi |
|---|---|---|
| 1 | 0.9 | Q1 = 0.9 · P1 + 0.1 · P2 |
| 2 | 0.9 | Q2 = 0.8 · P2 + 0.9 · P3 |
| 3 | 0.8 | Q3 = 0.6 · P3 + 0.4 · P4 |
| 4 | 0.8 | Q4 = 0.4 · P4 + 0.6 · P5 |
| 5 | 0.7 | Q5 = 0.1 · P4 + 0.7 · P6 + 0.2 · P7 |

Note) Since P7 does not exist in FIG. 18, a dummy data is used.

If the reduction processing is so performed as to reduce the image G1, the image after the correction has a pixel data missing portion (see a hatched area αG1 of FIG. 12B). The corrected image looks unnatural when being reproduced in a monitor television or by a printer. In the example of FIG. 12B, since the pixel data of noise level are output in the portion of the image corresponding to the area ΔG1, the quality of this portion becomes unstable during the reproduction, with the result that the image as a whole does not look nice. Thus, during the correction, a white dummy data may be set as, e.g., pixel data so that the missing portion white.

Since the area ΔG1 has a wedge shape at its upper and lower portions, thereby looking unnatural, a margin area ΔG0 comprised of strip-like areas capable of covering the area ΔG1 may be provided at a left side portion, an upper side portion and a lower side portion (or a peripheral portion if necessary) of the corrected image G', and a dummy data of a specific color such as white may be set for the margin area ΔG0. Since such an arrangement makes the reproduced image rimmed, a sense of unnaturalness can be reduced.

Figure 20:
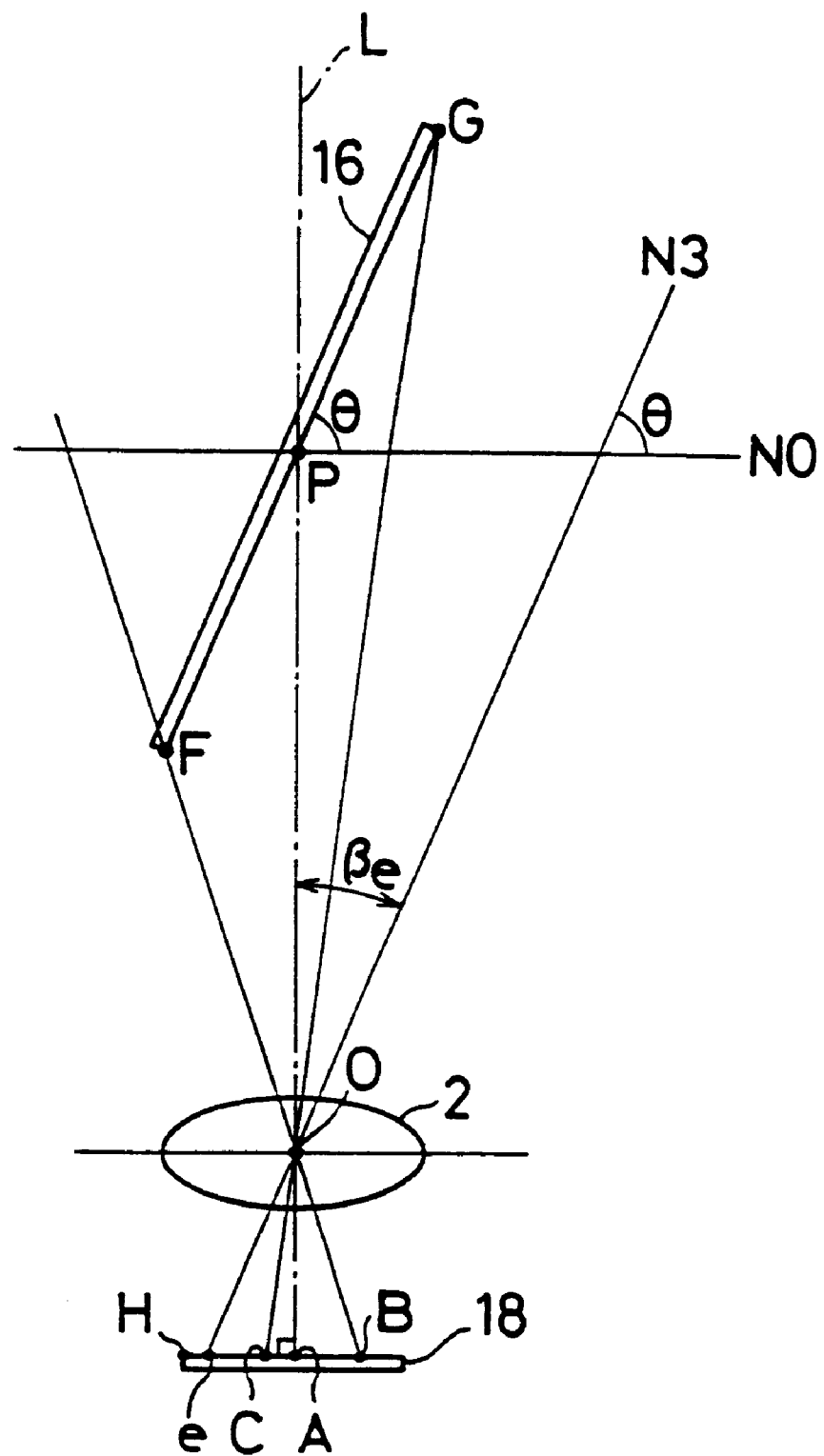
FIG. 20 is a diagram showing the image pickup system viewed from right above during oblique photographing when an angle of inclination is large.

Further, an uncorrectable area may also be created within the obliquely photographed image when the angle of inclination θ is large, thereby creating a pixel data missing portion in the image after the correction. For example, as shown in FIG. 20, in the case that a line segment N0 passing a point e between a left end point H and a center point A of the CCD 18 and point O of the taking lens 2 is parallel to the object surface, a sum of an angle of view βe with respect to point e and the angle of inclination θ is 90°, and the enlargement magnification ke at point e is ∞ according to Equation (24). Since (βi+θ)>90° between points e and H, the enlargement magnification ki<0. Therefore, the enlargement processing cannot be performed.

Figure 21A:
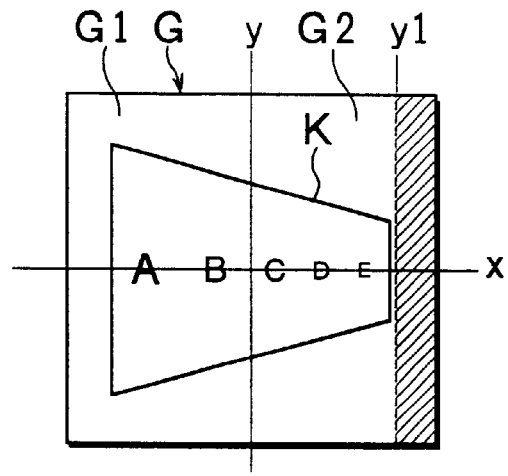
Figure 21B:
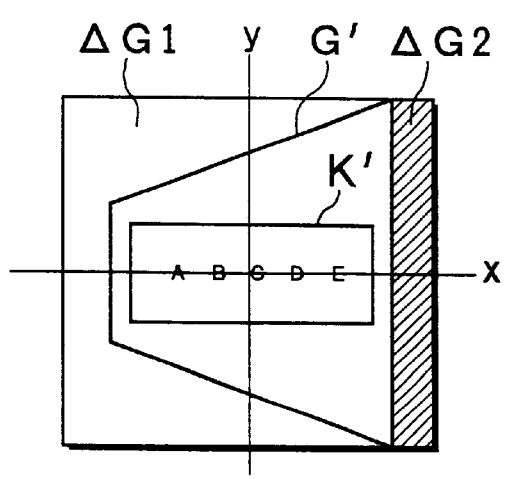

FIGS. 21A and 21B are diagrams showing the correction of the obliquely photographed image including an range of (βi+θ)>90°, wherein FIG. 21A shows an image before the correction and FIG. 21B shows an image after the correction.

Figure 22:
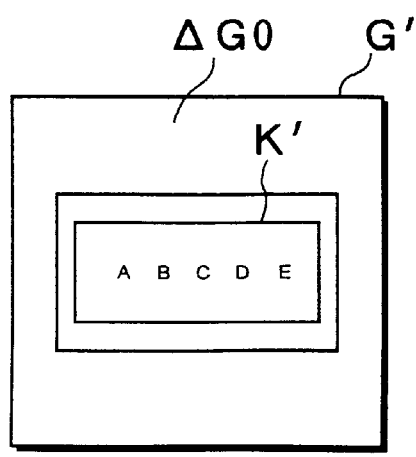
FIG. 22 is a diagram showing an image after a correction of compensating for a missing portion in the case that pixel data were lost when an angle of inclination is large.

In FIGS. 21A and 21B, since an image G2 to be enlarged includes a partial area ΔG2 (an area corresponding to an area between points e and H of FIG. 20) which cannot be enlarged, the obliquely photographed image is corrected into a pseudo front image by reducing the image on the left side of a right end line y1 of the correction permissible range of the image G2 using the line y1 as a reference. Thus, the pixel data for the areas ΔG1, ΔG2 end up being missed. In this case as well, a pixel data of a specified color such as white is allotted to the areas ΔG1, ΔG2 so as to prevent the reduction in image quality during the reproduction. Further, in this case as well, since the shapes of the areas ΔG1, ΔG2 look irregular, a margin area ΔG0 capable of covering the areas ΔG1, ΔG2 may be provided in a peripheral portion of the image G' after the correction as shown in FIG. 22.

Referring back to FIG. 13, a hard disk card 28 corresponds to a hard disk card to be insertably mounted through the card insertion slot 7. A card driver 29 controls the drive of the hard disk card 28 to record the image data.

A memory 30 is adapted to store data calculated in the CPU 36 (object distances Di and photographing magnifications mi in the respective pixel positions of the CCD 18) which are necessary for the oblique photographing correction.

A diaphragm driver 31 controls an opening amount of the diaphragm 17 in accordance with an aperture value Av of the exposure control value input from the CPU 36. A lens driver 32 controls an operation of attaining an in-focus condition of the taking lens 2 in accordance with an AF control value input from the CPU 36.

A light meter 34 including photodetectors such as SPCs provided behind the light meter window 3 measures the brightness of an object. A distance meter 35 detects an object distance and is disposed behind the light projection window 4. The distance meter 35 includes a light emitting element 351 for emitting infrared rays and a light receiving element 352 disposed behind the light receiving window 5 for receiving the infrared rays reflected by the object.

The CPU 36 calculates an object distance $D_A$ at a distance metering point (center position of the sensing surface of the CCD 18) detected by the distance meter 35; a photographing magnification $m_A$ at this distance metering point; and a required depth of field (corresponding to a distance RQ in FIG. 6) based on an information on the opposite end positions (positions of markers 23, 24 or markers 23', 24' in FIG. 9) of the object to be subjected to the oblique photographing correction which is input by the object width setting switch 15 and the angle of inclination θ input by the mode setting switch 11.

The depth of field is calculated as follows. Taking FIG. 6 as an example, if the opposite end positions B, C of the object on the sensing surface are known, since a distance OA between the taking lens 2 and the sensing surface of the CCD 18 is already known, angles of view β, α with respect to the opposite end positions F, G of the object are calculated based on the distance OA and distances AB, AC. Based on the angle of view β, α, the angle of inclination θ and the object distance $D_A$, the depth of field is calculated using the following two equations: $D_B = D_A \cdot \cos(\alpha-\theta)/\cos(\alpha) \cdot \cos(\theta)$, $D_C = D_A \cdot \cos(\beta+\theta)/\cos(\beta) \cdot \cos(\theta)$ (see the above equations ①, ②).

The CPU 36 calculates the exposure control values (aperture value Av and the shutter speed Tv) based on the brightness information of the object detected by the light meter 34 and the depth of field while prioritizing the depth of field, and outputs the calculation result to the diaphragm driver 31 and the CCD driver 26.

The CPU 36 also calculates a lens drive amount to set the taking lens 2 to attain an in-focus condition based on the object distance DA detected by the distance meter 35, and outputs the calculation result to the lens driver 32 as the AF control value.

The CPU 36 is a controller for centrally controlling the photographing operation of the camera 1, and includes a microcomputer. The CPU 36 controls a normal photographing operation, and calculates the object distance Di and photographing magnification mi in each pixel position of the CCD 18 to control a photographing operation in the oblique photographing correction mode based on the calculation result.

Figure 23:
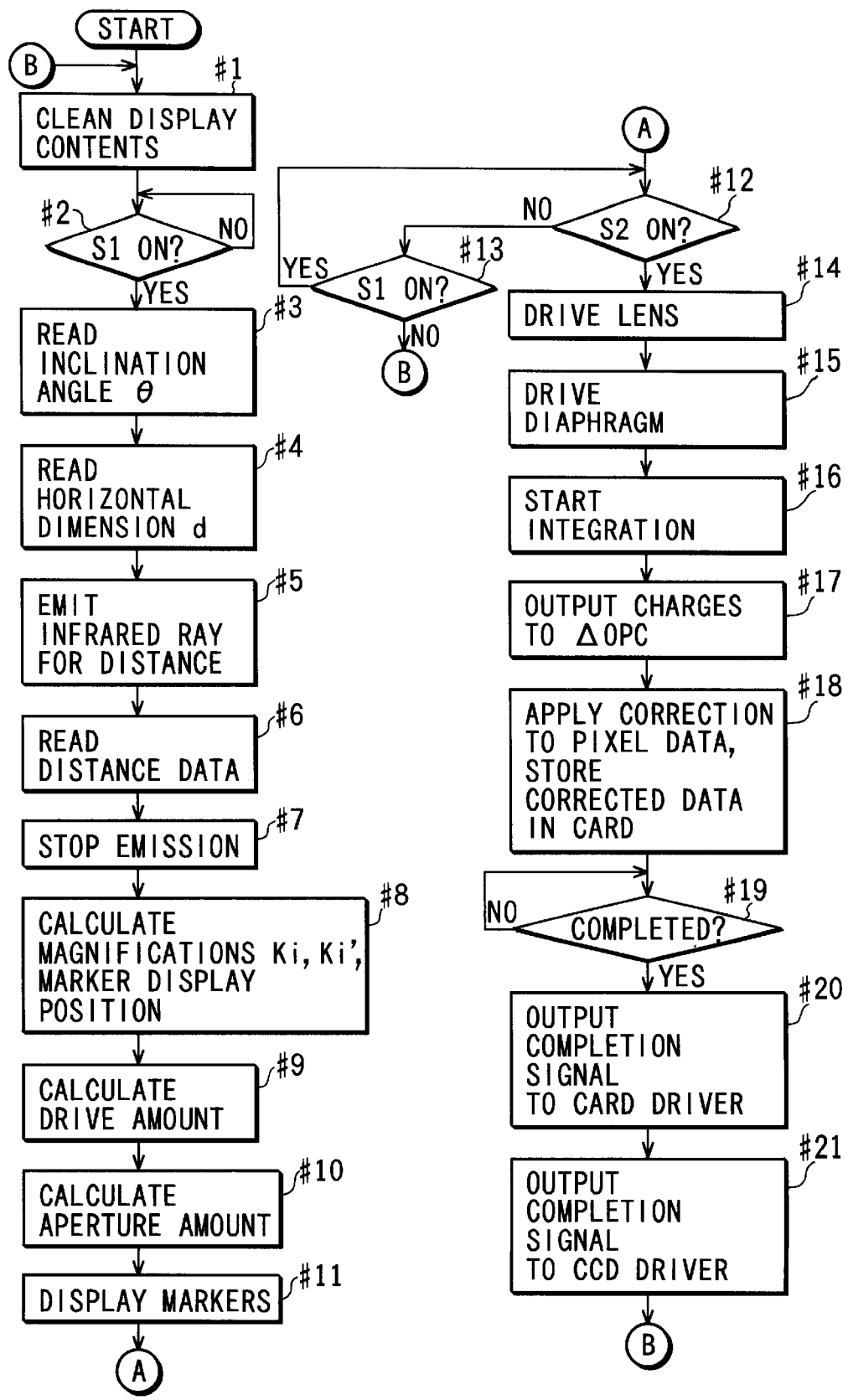
FIG. 23 is a flowchart showing a photographing control in the oblique photographing correction mode.

Next, the photographing control in the oblique photographing correction mode is described with reference to a flowchart of FIG. 23.

When the main switch 9 is turned to activate the camera 1, the display contents of the liquid crystal display portion 19 are cleared (Step #1) and the camera 1 enters a photographing standby state (Step #2). Upon the turn-on of the S1 switch (YES in Step #2) when the release button 14 is pressed halfway, the angle of inclination θ is read based on the set position of the operation button 12 of the mode setting switch 11 (Step #3). When the S1 switch is turned on, the markers 23, 23', 24, 24' are displayed in the field frame 20 and the display positions thereof move according to the operated amount of the object width setting switch 15 by the camera operator.

Subsequently, the horizontal dimension d of the object to be subjected to the oblique photographing correction is read based on a position information of the markers 23, 24 (or of the markers 23', 24') within the field frame 20 (Step #4).

Subsequently, the infrared rays for the distance metering are emitted toward the object from the light emitting element of the distance meter 35 (Step #5), and a distance metering data is read by receiving the infrared rays reflected by the object by the light receiving element of the distance meter 35 (Step #6). Upon the completion of the reading of the data, the emission of the light emitting element 351 is stopped (Step #7).

Further, the angles of views αi, βi with respect to the respective pixel positions of the CCD 18 are calculated, and the object distances Di in the respective pixel positions (i.e., an object distance distribution within the field) are calculated based on the angle of views αi, βi, the object distance $D_A$ and the angle of inclination θ. Further, the photographing magnification $m_A$ at the distance metering point is calculated based a focal length f and the object distance $D_A$, and the photographing magnifications mi in the respective pixel positions (i.e., a photographing magnification distribution within the field) are calculated based on the photographing magnification $m_A$, the object distance $D_A$, the angle of inclination θ and the angles of view αi, βi in accordance with Equation (1) or (2). The data on the object distance distribution and the photographing magnification distribution are stored in the memory 30. Furthermore, the enlargement and reduction magnifications ki, ki' and the display positions of the markers 25, 25' are calculated based on the object distance $D_A$ and the angle of inclination θ, and the calculation results are stored in the memory 30 (Step #8).

Subsequently, a drive amount of the taking lens 2 for the focus adjustment is calculated based on the object distance $D_A$ (Step #9). Further, the brightness of the object is measured by the light meter 34, and the aperture amount of the diaphragm 17 and the shutter speed (integration time of the CCD 18) are calculated based on the light measurement data (Step #10). The aperture value is so set as to make the aperture of the diaphragm 17 as small as possible in a range where no influence of camera shake occurs so as to make the depth of field as large as possible to focus the entire correction image K.

Subsequently, the markers 25, 25' are displayed in specified positions of the liquid crystal display portion 19 (Step #11), and the camera 1 enters the release standby state (Steps #12, #13). If the half pressed state of the release button 14 is released to turn the switch S1 off during the release standby state (NO in Step #13), Step #1 follows and the camera enters the photographing standby state. On the other hand, if the release button 14 is fully pressed to turn the S2 switch on (YES in Step #12), the taking lens 2 is driven based on the lens drive amount calculated in Step #10 to attain an in-focus condition (Step #14), and the diaphragm 17 is driven based on the aperture amount calculated in Step #9 (Step #15). Thereafter, the shutter speed data calculated in Step #10 is output to the CCD driver 26, and the image pickup operation (integration) by the CCD 18 is started (Step #16). The CCD 18 picks up the object image by, after resetting the electric charges in a photosensitive portion based on a drive control signal from the CCD driver 26, storing electric charges (electric charge integration) in the photosensitive portion for a predetermined time.

Upon the completion of the image pickup operation by the CCD 18, the electric charges stored in the respective pixels of the photosensitive portion (pixel data) is output to the OPC calculation unit 27 (Step #17). An oblique photographing correction is applied to the respective pixel data successively read from the CCD 18 by performing specified enlargement and/or reduction processing along the y-axis and x-axis directions in the OPC calculation unit 27 based on the object distance $D_A$, the angle of inclination θ and the magnifications ki, ki', and then the corrected pixel data are written in the hard disk card 28 (Step #18).

When the writing of all pixel data in the hard disk card 28 is completed (YES in Step #19), a control signal representing the completion of the pixel data writing is output to the card driver 29 (Step #20), and a control signal representing the completion of the pixel data reading is output to the CCD driver 26 (Step #21). Since one image pickup operation is completed in this way, this routine returns to Step #1 for the next photographing operation.

The aforementioned oblique photographing correction is relatively complicated in the case that the reduction processing is applied to a part of the original image while the enlargement processing is applied to the other part thereof, i.e., in the case of the light image BC of FIG. 6 for which the reduction processing is applied to a part BA and the enlargement processing is applied to the part AC. The object to be subjected to the oblique photographing correction frequently falls within a range where the depth of field is relatively narrow as the graphics and characters drawn on the white board 16 do. If the photographing is so performed as to focus the entire object image to be corrected by making the aperture of the diaphragm 17, a satisfactory photographing correction can be performed even if the image at the other side is enlarged with respect to a closest position at one end (point B in FIG. 6).

Figure 24A:
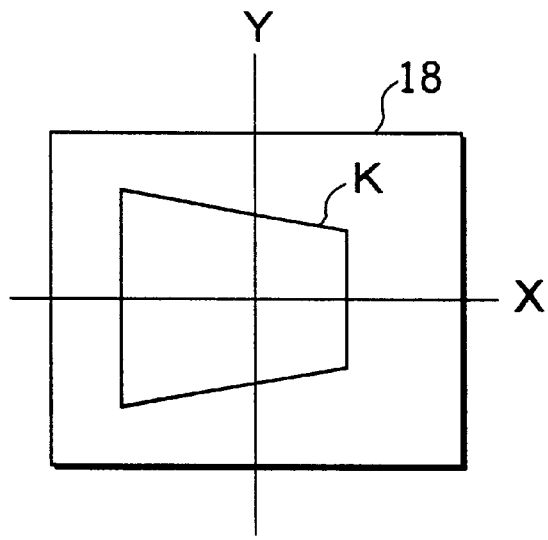
Figure 24B:
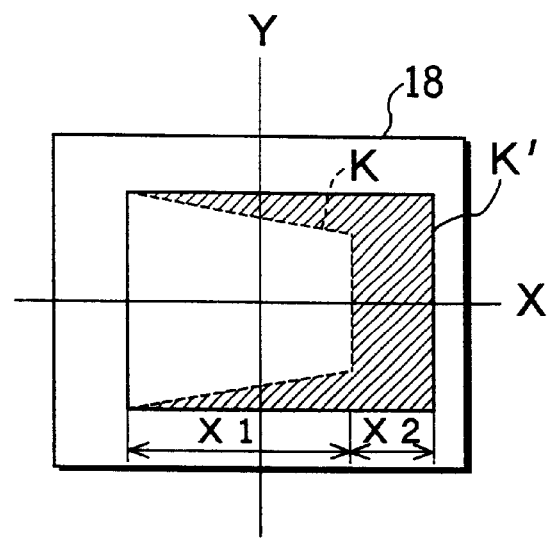

Accordingly, oblique photographing correction may be applied to an oblique image K (an image obtained by obliquely photographing the white board 16 from the left) as shown in FIG. 24A based on the left end which is a closest position by enlarging the image on the right side of the left end as shown in FIG. 24B.

Figure 25A:
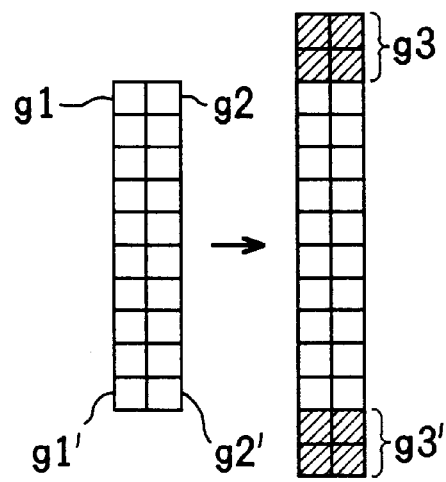
Figure 25B:
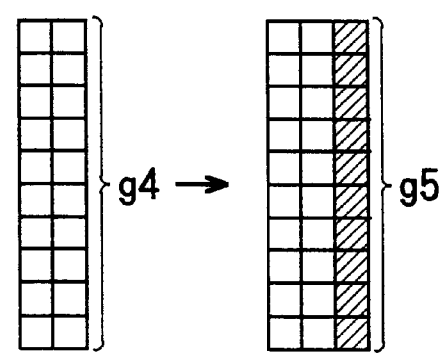

In such a case, out of a pseudo front image K' shown in FIG. 24B, pixel data missing in an area X1 (hatched pixel data in FIG. 24B) may be interpolated by adding pixel data g3, g3' (hatched image data in FIG. 25A) outside pixel data g1, g1', g2, g2' at the upper and lower ends for each line as shown in FIG. 25A, and pixel missing in an area X2 may be interpolated by adding a line of pixel data g5 to the existing lines of entire pixel data g4 as shown in FIG. 25B.

Figure 26:
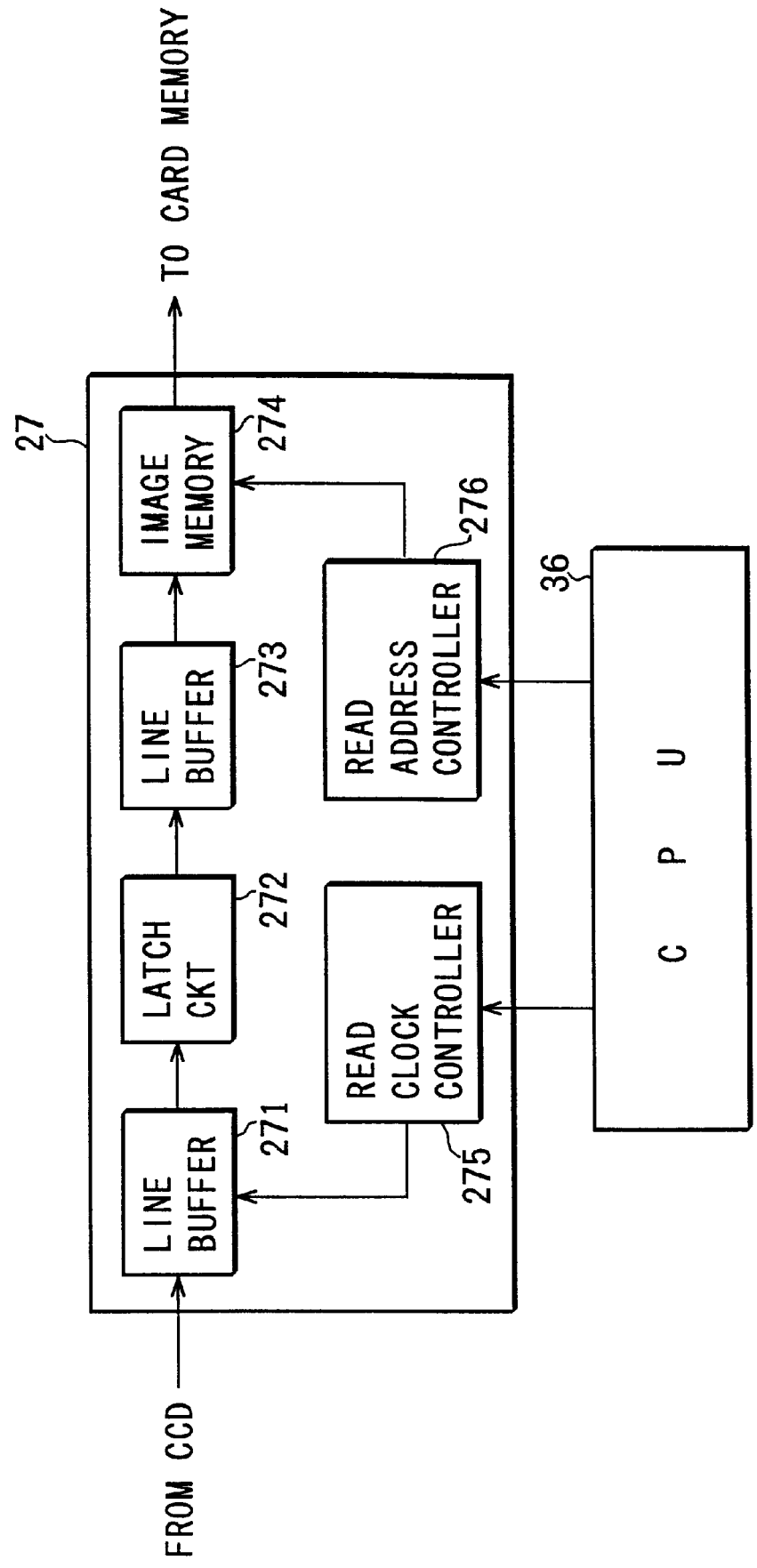
FIG. 26 is a diagram of a circuit block in an oblique photographing correction calculating unit when the oblique photographing correction is performed only by enlargement processing.

FIG. 26 is a block diagram of an exemplary circuitry within the OPC calculation unit 27 when the oblique photographing correction is performed only by the enlargement processing.

In FIG. 26, the OPC calculation unit 27 includes line buffers 271, 273, a latch circuit 272, an image memory 274, a read clock controller 275 and a read address controller 276.

Figure 27:
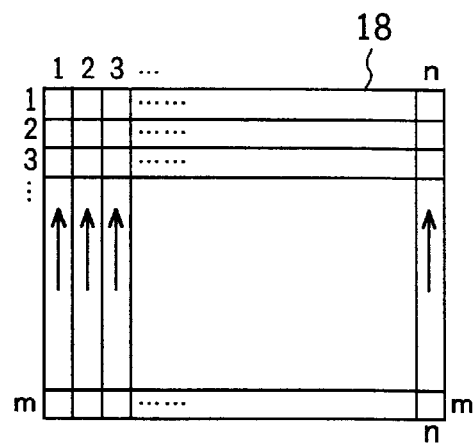
FIG. 27 is a diagram showing a reading direction of pixel data of a CCD.

The line buffer 271 temporarily stores, line by line, the pixel data output from the CCD 18. The respective pixel data of the CCD 18 are input to the OPC calculation unit 27 by being read successively in a direction of arrow along each vertical line as shown in FIG. 27.

The read clock controller 275 generates a read clock for reading the pixel data in the line buffer 271 in accordance with a control signal from the CPU 36, and outputs it to the line buffer 271.

The respective pixel data in the line buffer 271 are transferred to the latch circuit 272 in synchronism with the read clock. At this time, the enlargement processing along the line direction (enlargement processing along the line direction shown in FIG. 25A) is performed if necessary, and the oblique photographing correction is performed line by line. More specifically, in the case that the pixel data are increased along the Y-axis direction, the read clock controller 275 stops the read clock by one clock or several clocks at a timing corresponding to a position where the pixel data are to be increased, and transfers a specified number of the same pixel data as the one read immediately before the stop of the read clock to the latch circuit 272.

The latch circuit 272 latches one line of pixel data to which the oblique photographing correction has been applied and, outputs them successively to the line buffer 273. Further, the line buffer 273 temporarily stores, line by line, the respective pixel data after the oblique photographing correction which are output from the latch circuit 272.

The image memory 274 is an memory for storing an image to which the oblique photographing correction is applied along the Y-axis direction. The image memory 274 is constructed by a RAM (Random Access Memory), and is adapted to store the respective pixel data constituting the respective lines after the oblique photographing correction, which are successively output from the line buffer 273, in specified memory positions. When all pixel data output from the CCD 18 are stored in the image memory 274 via the line buffer 271, the latch circuit 272 and the line buffer 271, the image obtained by enlarging the oblique image along the Y-axis direction is stored in the image memory 274.

The read address controller 276 generates the addresses of the respective pixel data transferred from the image memory 274 to the hard disk card 28, and inputs them to the image memory 274 during the reading of the respective pixel data. The read address controller 276 generates the read address of the image memory 274 in accordance with a control signal from the CPU 36.

The enlargement correction along the X-axis direction of the correction image K, i.e., the interpolation of the missing pixel data (line-by-line addition of the pixel data shown in FIG. 25B) is performed by controlling the read addresses. As a result, the pseudo front image K' obtained by correcting the correction image K along both X- and Y-axis directions is stored in the hard disk card 28. The interpolation of the missing pixel data is performed by repeatedly outputting the addresses of the existing line of pixel data to the image memory 274 for a desired number of lines and by repeatedly reading that line of pixel data as lines of pixel data to be added.

In the first embodiment, since the same data as the existing data are interpolated in the pixel positions where the data need to be added, the variation of the image density after the correction may be unnatural. However, if the technique of density interpolation disclosed in, e.g., Japanese Unexamined Patent Publication No. 5(HEI)-161000 or 5(HEI)-161001 is adopted, the image density after the correction can vary in a natural manner.

Although the mode setting switch 11 is provided on the rear surface of the main body of the camera 1 in the first embodiment, it may be provided in any suitable position provided the angle of inclination θ can sensuously be input while confirming the inclination of the camera main body with respect to the object.

Further, in this embodiment, the distance meter 35 is provided to detect a distance to an object. According to the invention, however, it is not necessary to provide a distance meter or detector. It may be possible to carry out the oblique image correction by picking up an object at a predetermined fixed distance and setting only an oblique angle.

Figure 28:
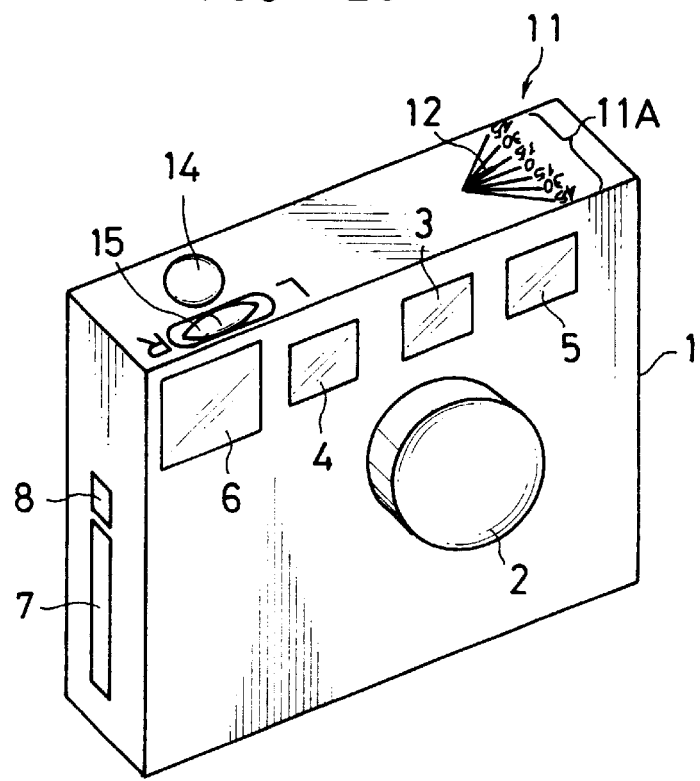
FIG. 28 is a perspective view showing an external configuration of a second electronic camera according to the present invention.
Figure 29:
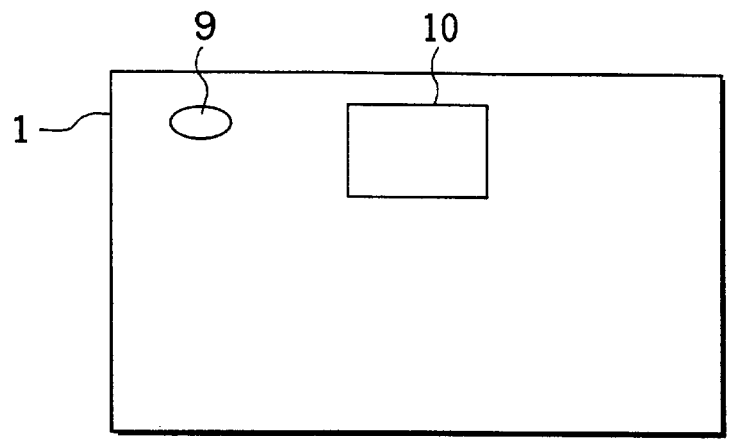
FIG. 29 is a rear view of the second electronic camera.
Figure 30:
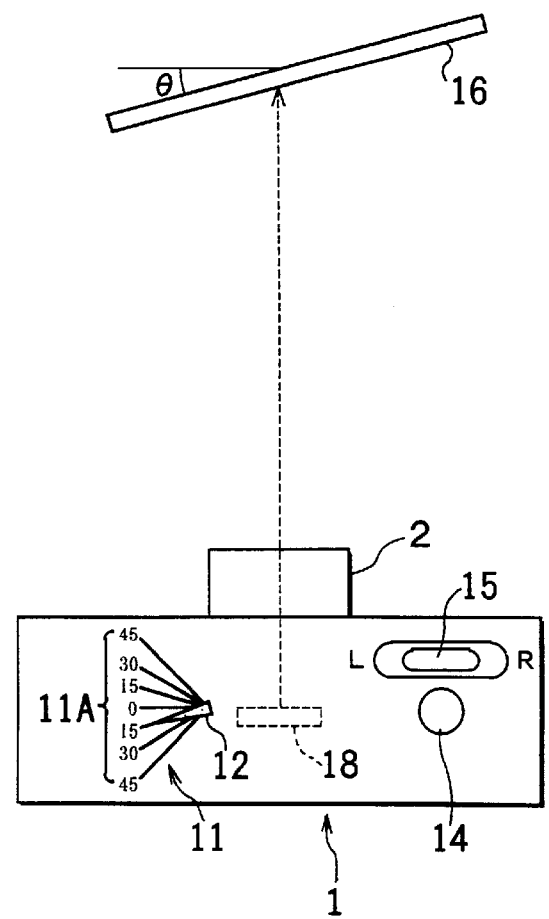
FIG. 30 is a plan view of the second electronic still camera.

FIG. 28 is a perspective view of a second electronic camera according to the invention, wherein an improved mode setting switch 11 is provided; FIGS. 29 and 30 are a rear view and a plan view of the camera.

As shown in FIG. 30, the mode setting switch 11 is provided with direction lines indicative of a reference direction parallel to the sensing surface of the CCD 18 (direction normal to the optic axis L) and directions at ±15°, ±30°, ±45° with respect to the reference direction, an angle scale 11A including angle marks which are so provided as to correspond to the respective direction lines, and an operable member 12 constructed by a direction indicating lever switchable to the positions of the respective direction lines.

There are displayed angles 15°, 30°, 45° above and below angle 0° in the middle. The lower angles are angles of inclination when the left side oblique photographing is performed, whereas the upper angles are angles of inclination when the right side oblique photographing is performed. At an angle of inclination 0°, the camera is located substantially in front of the object. Accordingly, a normal photographing mode is set without performing the oblique photographing correction to the picked image.

In positions below the angle scale 11A inside the camera 1, there are provided a plurality of individual contacts corresponding to the positions of the respective direction lines, and a common contact which rotates together with the operable member 12, thereby switchingly coming into contact with the above contacts. The set position of the operable member 12 is detected based on the connection of the common contact with the individual contacts.

A camera operator is allowed to input the angle of inclination θ by setting the operable member 12 in an angle position where it is substantially parallel to the white board 16 as shown in FIG. 30 after aligning the vertical direction of the camera 1 with the vertical direction of the white board 16.

Although the angle of inclination θ measured by the eye of the camera operator is discretely settable also in the second embodiment, it may be continuously set according to the lever direction of the operable member 12.

Figure 31:
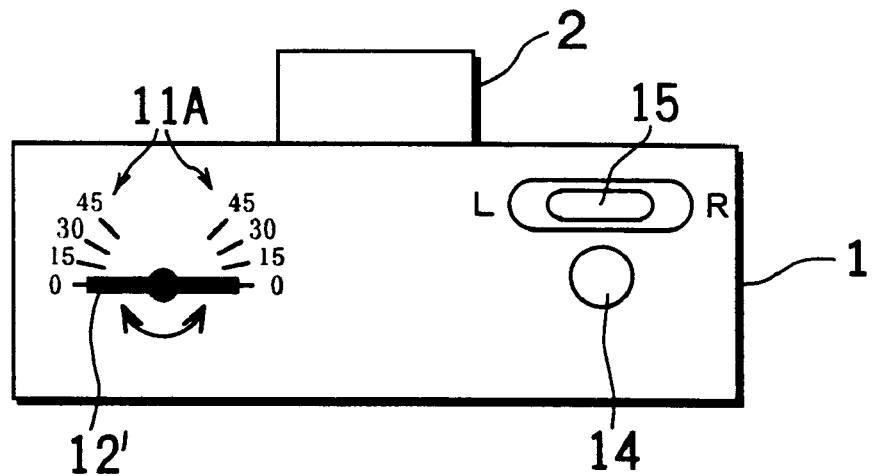
FIG. 31 is a plan view of a third electronic camera according to the present invention.
Figure 32:
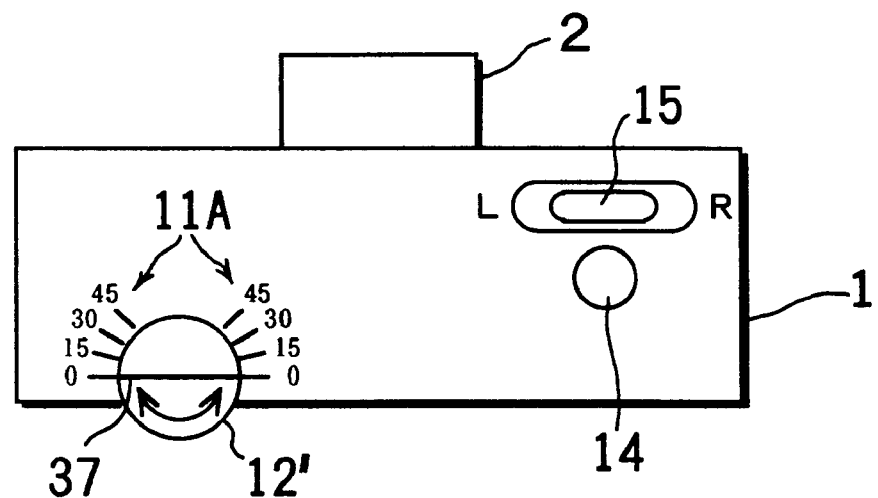
FIG. 32 is a plan view of a fourth electronic camera according to the present invention.

Although the operable member 12 of the mode setting switch 11 is constructed by a lever member rotatably supported at one end in the second embodiment, it may be constructed by a bar member rotatably supported in its center as shown in FIG. 31 or by a dial member formed with an indicator line 37 on its diameter as shown in FIG. 32.

In a third electronic camera of the invention shown in FIG. 31, pairs of angle scales 11A for the angle of inclination θ are provided along a trace of rotation of the opposite ends of the operable member 12. The angle of inclination θ is set by the scale pointed by the right end of the operable member 12 in the left side oblique photographing while being set by the scale pointed by the left end of the operable member 12 in the right side oblique photographing.

On the other hand, in a fourth electronic camera of the invention shown in FIG. 32, pairs of angle scales 11A for the angle of inclination θ which are similar to those of FIG. 31 are provided outside the periphery of the operable member 12. The angle of inclination θ is set by the scale pointed by the right end of the indicator line 37 in the left side oblique photographing while being set by the scale pointed by the left end of the indicator line 37 in the right side oblique photographing.

Since the angle of inclination θ is be set only by aligning the lever direction, bar direction or indicator line direction of the operable member .12 of the mode setting switch 11 substantially parallel with respect to the object surface in the second to fourth cameras, it can relatively accurately and rapidly be set by a simple operation.

Figure 33:
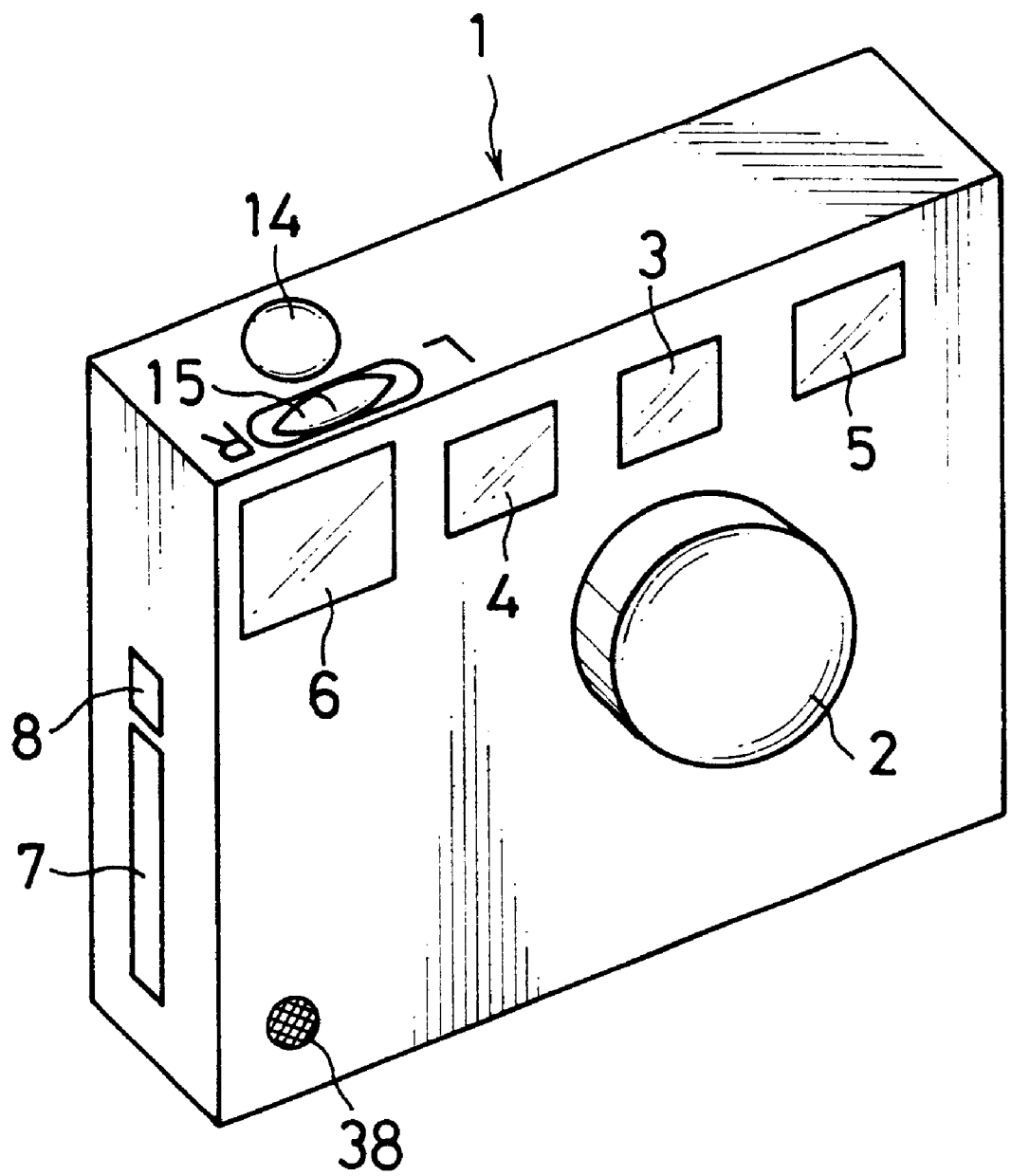
FIG. 33 is a perspective view showing an external configuration of a fifth electronic camera according to the present invention.

FIG. 33 is a perspective view showing an external configuration of a fifth electronic camera according to the invention.

The aperture value of the diaphragm 17 is set, considering that the shutter speed cannot be restricted more than necessary, such that only the object within the field to be subjected to the oblique photographing correction is focused in the foregoing embodiments. However, in the fifth camera, in the case that the angle of inclination θ is set by the mode setting switch 11 (in the case that the oblique photographing is instructed), the aperture value of the diaphragm 17 is set at a maximum value in a range where influence of camera shake does not occur.

The camera 1 shown in FIG. 33 is provided, in a position below the objective window of the viewfinder in the front surface of the camera main body of FIG. 1, with a buzzer 38 for giving a warning sound when an aperture value corresponding to the depth of field set by the object width setting switch 15 exceeds the above maximum aperture value.

Although the photographing operation of the fifth camera 1 in the oblique photographing correction mode is basically identical to that of the first camera 1, the functions of the markers 23, 23', 24, 24' displayed in the liquid crystal display portion 19 are different from those of the first camera.

Figure 34:
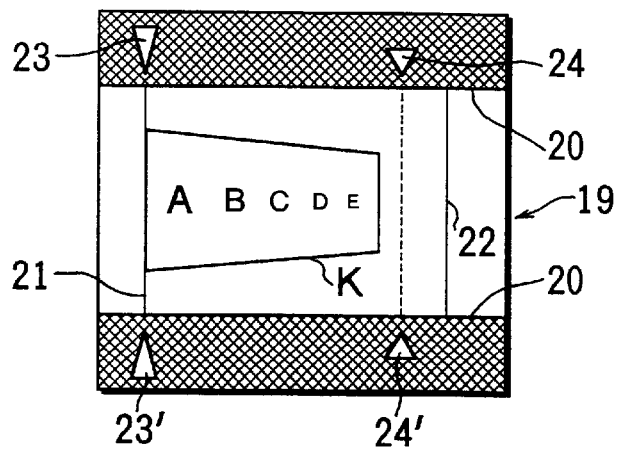
FIG. 34 is a diagram showing display contents of a liquid crystal display portion of the fifth electronic camera.

Specifically, in the case that the oblique photographing correction mode is set by the mode setting switch 11 and the left side oblique photographing is, for example, to be performed, the vertical display lines 21, 22 are displayed at the opposite ends within the field frame 20 and the markers 23, 23', 24, 24' are displayed outside the field frame 20 as shown in FIG. 34. The positions of the markers 24, 24' correspond to a presently set aperture value, and are right end positions of an in-focus range on the basis of the markers 23, 23'. The display positions of the markers 24, 24' are set as follows.

Figure 35:
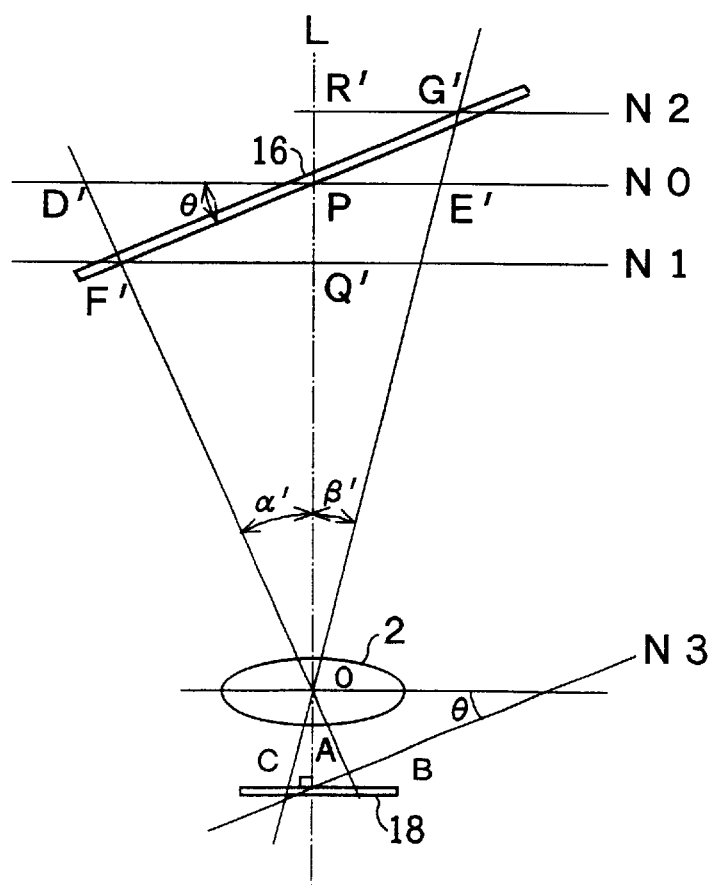
FIG. 35 is a diagram showing a method for calculating a display position of a marker indicating a range of depth of field in the liquid crystal display portion.

In FIG. 35, if the camera 1 is focused to point P of the white board 16 and the aperture value of the diaphragm 17 is set at such a value that the depths of field at closer and distant sides with respect to the focus position are PQ', PR', respectively, and an image formed on the CCD 18 between points B and C is focused. Points B and C on the sensing surface of the CCD 18 are expressed as transverse distances from a center point A of the sensing surface of the CCD 18: AB and AC. Since a distance OA is known, AC=OA·tan(α'), AC =OA·tan(β'). Distance BC is calculated by: BC=OA·{tan(α')+tan(β')}.

Since the display position of the indicator line 21 at the left end is set in advance, the markers 24, 24' are displayed in positions displaced from the indicator line 21 along the horizontal direction by the distance BC.

Since OP=OQ·{1+tan(α)·tan(θ)} in FIG. 6 as described above, OP=OQ'-{1+tan(α')·tan(θ)} in FIG. 35. By transposing this equation, tan(α')=(OP–OQ')/{OQ'·tan(O )}. Further, since OP=OR·(1–tan(β)·tan(θ)), OP=OR'·{1–tan (β')·tan(θ)} in FIG. 35. By transposing this equation, tan (β')=(OR'–OP)/{OR'·tan(θ)}.

Accordingly, OQ' is a focal length $D_B$ for the closer side, OR' is a focal length $D_C$ for the distant side, and OP is a focal length $D_A$ in the focus position, and these values are all known. Thus, tan(α') is calculated by: tan(α')=($D_A$–$D_B$)/ {$D_B$·tan(θ)}, whereas tan(β') is calculated by: tan(β')=($D_C$– $D_A$)/{$D_C$·tan(θ)}.

Figure 36:
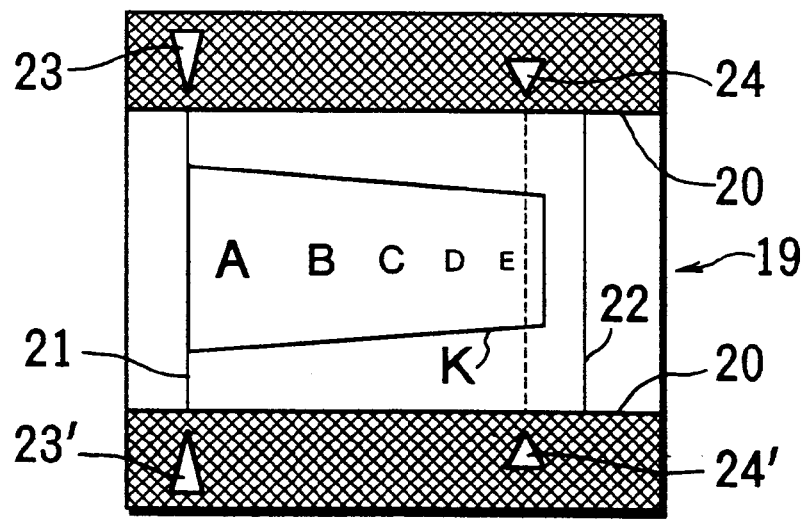
FIG. 36 is a diagram showing a state where an image to be corrected extends beyond a focus range indicated by the marker.

In the case that the correction image K within the field falls between the markers 23, 23' and markers 24, 24' as shown in FIG. 34, the oblique photographing correction can relatively satisfactorily be performed even under a present aperture value condition since the correction image K can entirely be focused. However, in the case that a right end portion of the correction image K within the field bulges beyond the markers 24, 24' as shown in FIG. 36, the oblique photographing correction cannot properly be performed under the present aperture value condition since the portion of the image beyond the markers 24, 24' cannot be focused.

Figure 37:
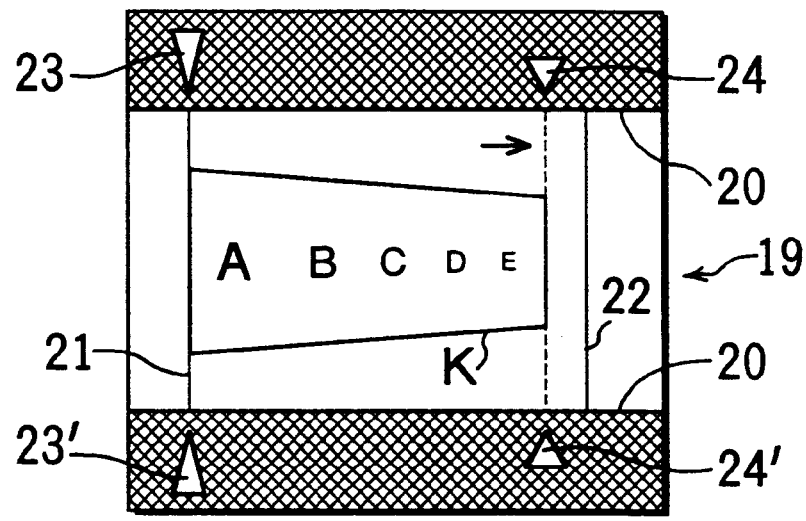
FIG. 37 is a diagram showing a state where the marker is moved such that the image to be correct falls within the focusing range.

In such a case, the depth of field can be changed by moving the object width setting switch 15 to the right until the display position of the markers 24, 24' coincides with the right end of the correction image K as shown in FIG. 37.

When the object width setting switch 15 is moved to the right, the CPU 36 calculates a depth of field in the display position of the markers 24, 24' after the movement which corresponds to the operated amount of the switch 15 and an aperture value corresponding to the calculated depth of field. Further, an exposure control value is calculated based on the object brightness detected by the light meter 34 and the calculated aperture value while prioritizing the aperture value. Then, it is discriminated whether or not the calculated exposure control value may cause an influence of camera shake.

If this exposure control value will not cause an influence of camera shake, the display position of the markers 24, 24' is moved. If there is such a likelihood, the movement of the display position of the markers 24, 24' is prohibited (i.e., the aperture value is fixed at a maximum value within a range free from a likelihood of influence of camera shake); the buzzer 38 gives away a warning sound warning "camera shake"; and a warning message is displayed in a display (not shown) provided on the camera main body.

Likewise, when the object width setting switch 15 is moved to the left, the display position of the markers 23, 23' is controlled. If there is a likelihood of camera shake, the movement of the display position of the markers 23, 23' is prohibited; the buzzer 38 gives away a warning sound warning "camera shake"; and a warning message is displayed in the display provided on the camera main body.

Since it is possible, according to the fifth embodiment, to visually confirm by the liquid crystal display portion 19 whether the entire correction image K is focused, whether the oblique photographing correction is proper can be discriminated in advance. In the case that the correction image K is not entirely focused, the camera operator can adjust the aperture value to at least focus the entire correction image K within the range free from influence of camera shake based on the monitor display in the liquid crystal display portion 19. Thus, the oblique photographing which may cause an improper oblique photographing correction can be prevented.

Figure 38:
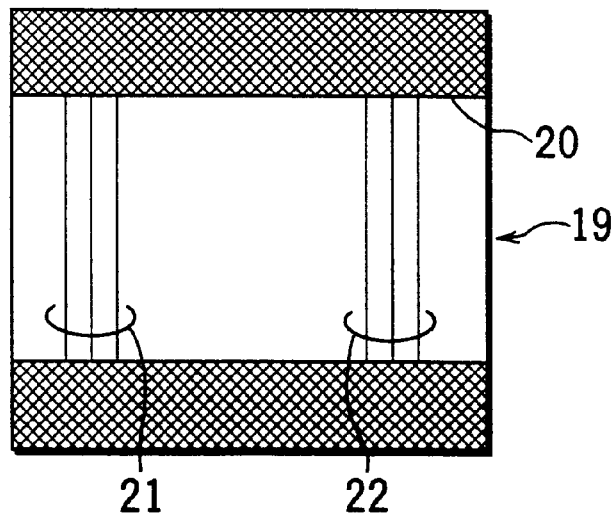
FIG. 38 is a diagram showing another example of display contents of the liquid crystal display portion in the normal photographing mode.
Figure 39:
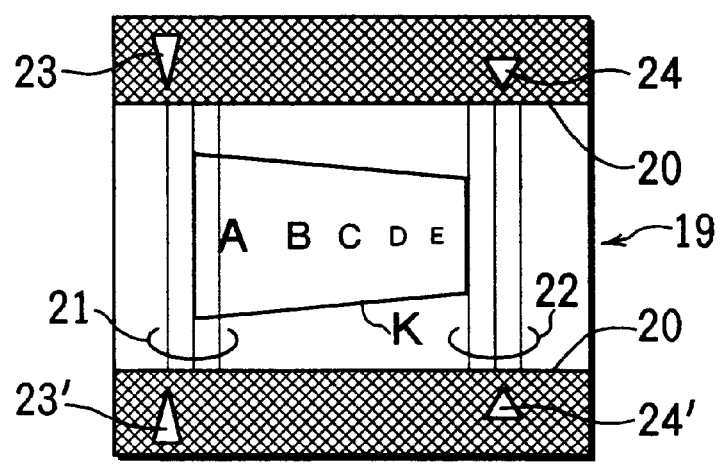
FIG. 39 is a diagram showing another example of display contents of the liquid crystal display portion in the oblique photographing correction mode.

In the fifth camera, one each of the indicator lines 21, 22 is displayed in the liquid crystal display portion 19. For instance, in the case of the left side oblique photographing, the position of the display line 21 of the markers 23, 23' is fixed, and the display position of the markers 24, 24' is moved according to the operated amount of the object width setting switch 15. However, in the case that a plurality of indicator lines 21, 22 (three each) are displayed as shown in FIG. 38 and the angle of inclination θ is set by the mode setting switch 11, the positions of the markers 23, 23' and the markers 24, 24' may integrally be moved according to the operated amount of the object width setting switch 15 as shown in FIG. 39.

With this arrangement, even if the correction image K is small, it can easily be arranged in the middle of the field while having its vertical direction aligned, and an in-focus range for the correction image K is made easily distinguishable by moving the markers 23, 23' and the markers 24, 24'.

There may be provided two separate switches realizing "integral" and "separate" functions of the object width setting switch 15. In an "integral" position, the positions of the markers 23, 23' and the markers 24, 24' may integrally be moved according to the operated amount of the object width setting switch 15. On the other hand, in a "separate" position, the position of the markers 23, 23' and the position of the marker 24, 24' may independently be moved according to the operated amount of the object width setting switch 15. With this arrangement, even if the correction image K is not entirely focused, the in-focus range can be enlarged without causing influence of camera shake.

Although the angle of inclination θ is manually input in the first to fifth electronic cameras, it may automatically be input.

Figure 40:
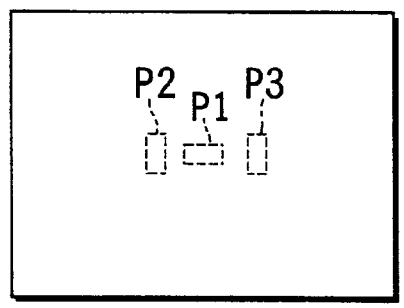
FIG. 40 is a diagram showing meter areas according to a multiple-spot metering method.

For instance, in the case that a multiple-spot metering method using three metering areas P1, P2, P3 within the field as shown in FIG. 40 is adopted, an angle of inclination (tan(θ)) can be calculated based on object distances $D_{P1}$, $D_{P2}$, $D_{P3}$ detected by the respective metering areas P1, P2, P3.

Figure 41:
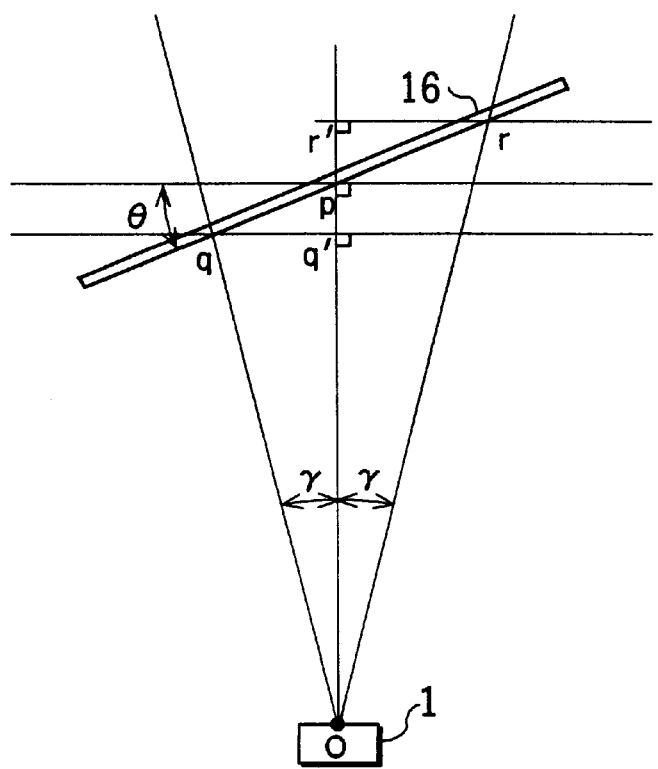
FIG. 41 is a diagram showing a method for automatically calculating an angle of inclination according to a multiple-spot metering method.

Specifically, if, as shown in FIG. 41, a metering reference point of the camera 1 is o; metering points on the white board 16 corresponding to the metering areas P1, P2, P3 are p, q, r; ∠qop=∠rop=γ; an intersection of a line op and a line normal thereto and passing point q is q'; and an intersection of the line op and a line normal thereto and passing point r is r', $D_{P1}=op$, $D_{P2}=oq'$, $D_{P3}=or'$ $rr'=or'\cdot\tan(\gamma)$ $\tan(\theta)=pr'/rr'=(or'-op)/rr'$ or $qq'=oq'\cdot\tan(\gamma)$ $\tan(\theta)=pq'/qq'=(op-oq')/qq'$.

Accordingly, the angle of inclination tan(θ) is calculated in accordance with Equation (29):

$$\tan(\theta) = (D_{P3} - D_{P1})/(D_{P3}\cdot\tan(\gamma)) \qquad (29)$$
$$= (D_{P1} - D_{P2})/(D_{P2}\cdot\tan(\gamma)).$$

Since tan(γ) is a value peculiar to the distance metering sensor of the camera 1, the angle of inclination θ can automatically be input by performing the calculation of Equation (29) using the object distances $D_{P1}$, $D_{P2}$, $D_{P3}$ detected in the respective metering areas P1, P2, P3.

Although the horizontal dimension d of the object is set by manually moving the markers 23, 23' and the markers 24, 24' in the first to fifth embodiments, it may be automatically be input.

Figure 42:
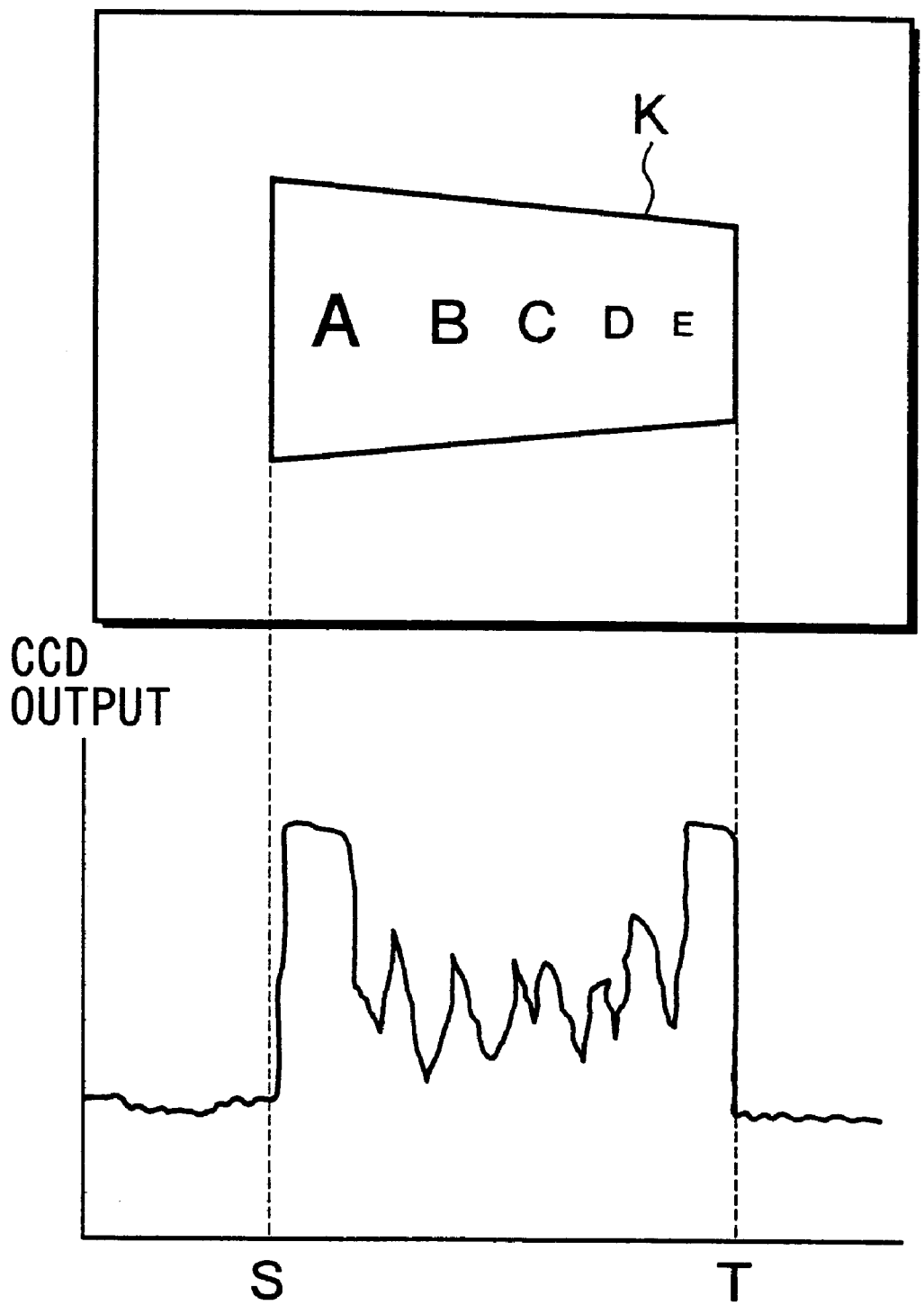
FIG. 42 is a diagram showing a waveform of an output signal of the CCD when the object is obliquely photographed.

For example, in the case that the left side oblique photographing is performed while attaining an in-focus condition only for the white board 16, an output signal of the CCD 18 is such that the output level of a portion corresponding to the white board 16 is high as shown in FIG. 42. Accordingly, by detecting points where the level drastically changes, a right end point S and a left end point T of the white board 16 can be detected.

Since points S, T on the sensing surface of the CCD 18 correspond to the inputs of the opposite end positions of the white board 16 indicated by the markers 23, 23' and 24, 24', the horizontal dimension d can be calculated based on the position information of points S, T.

If the angle of inclination θ or the horizontal dimension d of the object can automatically be input, the construction of the camera 1 can be simplified and the photographing operation can be made easier by simplifying the mode setting switch 11, deleting the object width setting switch 15, etc.

It should be noted that the exposure control in consideration of the depth of field is applicable to not only electronic cameras having an oblique photographing correction function but also electronic cameras not having such a function and ordinary cameras using a photographic film.

If an image after the oblique photographing correction can be monitored before the exposure in the cameras having an oblique photographing correction function, the photographing can be performed in the oblique photographing correction mode with an improved convenience.

Figure 43:
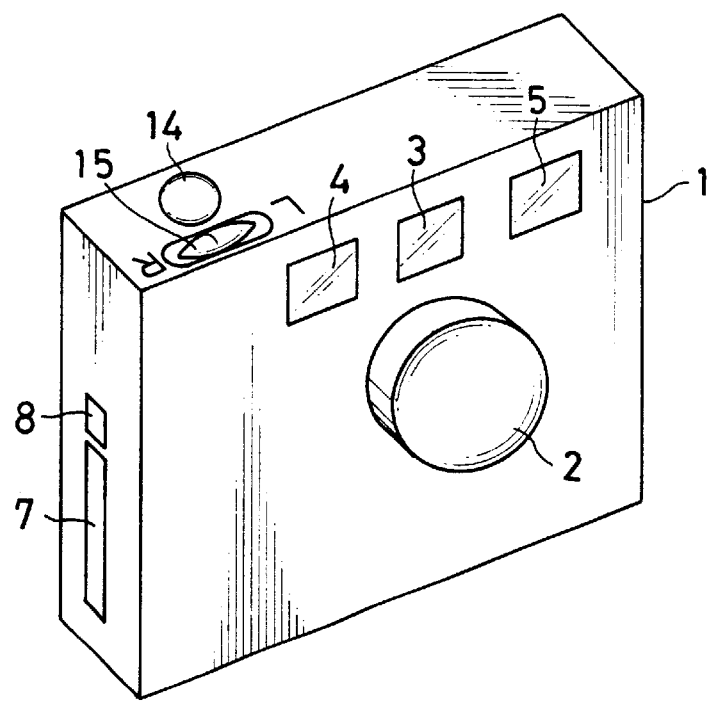
FIG. 43 is a perspective view showing an external configuration of a sixth electronic camera according to the present invention.
Figure 44:
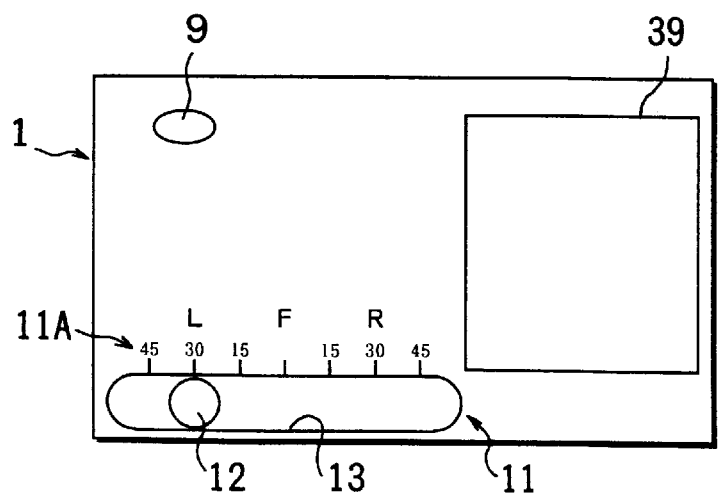
FIG. 44 is a rear view of the sixth electronic camera.

FIG. 43 is a perspective view of a sixth electronic camera according to the invention with which an image after the oblique photographing correction can be monitored, and FIG. 44 is a rear view thereof.

In the sixth camera 1, the optical viewfinder of the first camera 1 is replaced by a liquid crystal viewfinder including an LCD.

Accordingly, FIG. 43 differs from FIG. 1 in that the objective window 6 is deleted, and FIG. 44 differs from FIG. 2 in that the eyepiece window 10 is deleted and a liquid crystal viewfinder 39 is provided at a right end portion of the back surface of the camera 1. The liquid crystal viewfinder 39 is a display portion for allowing a camera operator to visually confirm an image to be photographed. When the oblique photographing correction mode is set by the mode setting switch 11, an image after the oblique photographing correction (pseudo front image) is displayed in the viewfinder 39 in an exposure standby state. Accordingly, the camera operator can confirm before the photographing operation how the image to be obliquely photographed is corrected into a pseudo front image by holding the release button 14 pressed halfway in the oblique photographing correction mode.

When the release button 14 is fully pressed to turn the S2 switch on, the substantive photographing is performed to record an image immediately before the photographing displayed in the liquid crystal viewfinder 39 in the hard disk card 28. Further, in the oblique photographing correction mode, a pseudo front image after the correction and immediately before the photographing which is displayed in the liquid crystal viewfinder 39 is recorded in the hard disk card 28.

Similarly to the first camera, in the liquid crystal viewfinder 39, there are displayed a field frame 20 and, in the oblique photographing correction mode, indicator lines 21, 22 at the opposite ends of the inside of the field frame 20, pairs of triangular markers 23, 23'; 24, 24'; 25, 25' in the upper and lower margins of the field frame 20.

Figure 45:
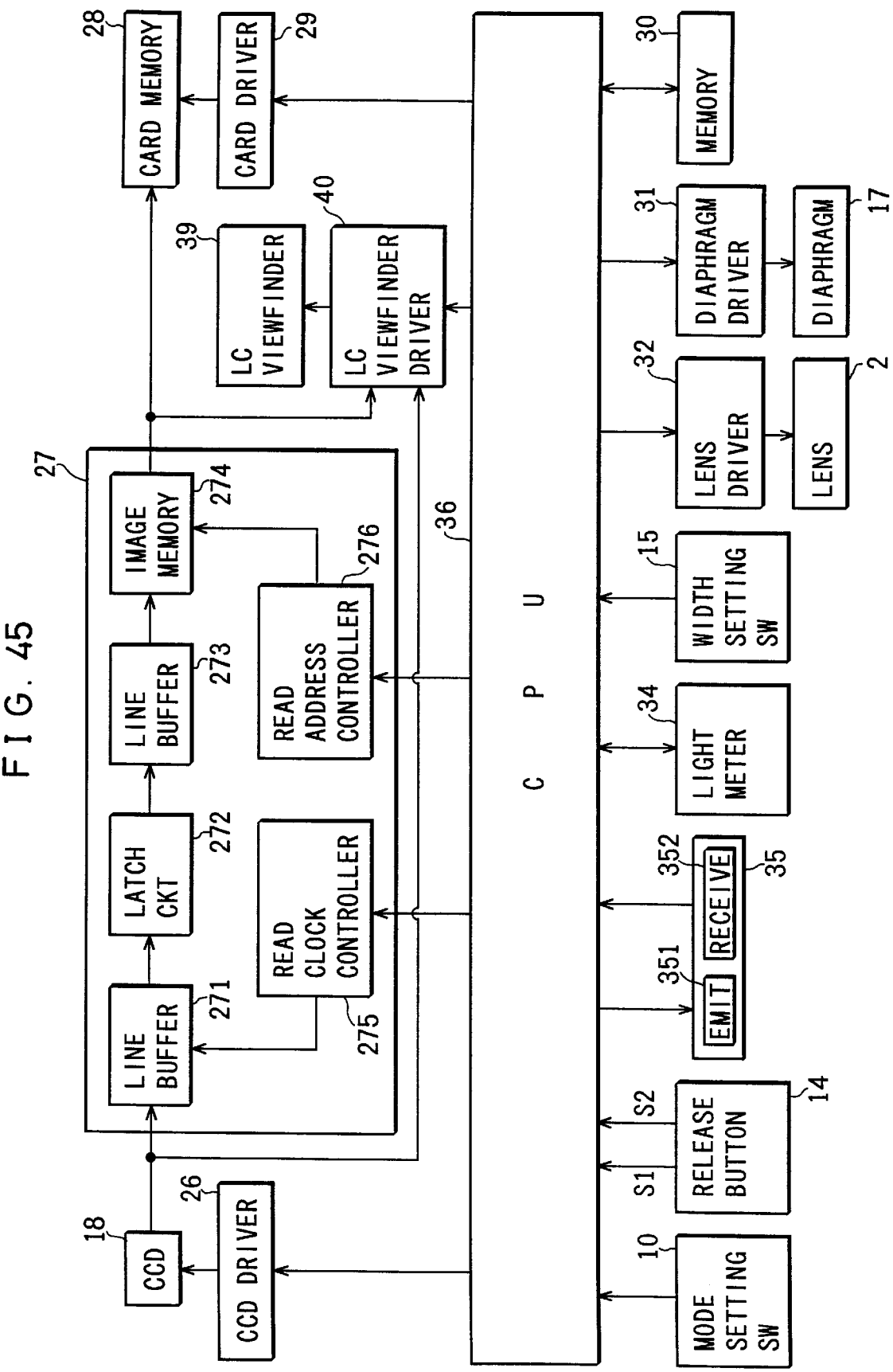
FIG. 45 is a block diagram showing a construction of the electronic camera of the sixth electronic camera.

FIG. 45 is a block construction diagram of the sixth camera 1.

The construction of FIG. 45 is identical to that of FIG. 13 except that the OPC calculation unit 27 is replaced by the block construction of FIG. 26 plus the liquid crystal viewfinder 39 and a viewfinder driver 40.

In FIG. 45, the viewfinder driver 40 controls the drive of the liquid crystal viewfinder 39. Specifically, the viewfinder driver 40 controls the respective pixels constructing a display screen based on the pixel data output from the CCD 18 (image data before the correction) or the pixel data output from the OPC calculation unit 27 (image data after the correction) so that a picked image or corrected image is displayed in the liquid crystal viewfinder 39. The viewfinder driver 40 also switches a display image (image before or after the correction) and controls a display timing in accordance with a control signal from the CPU 36.

Figure 46:
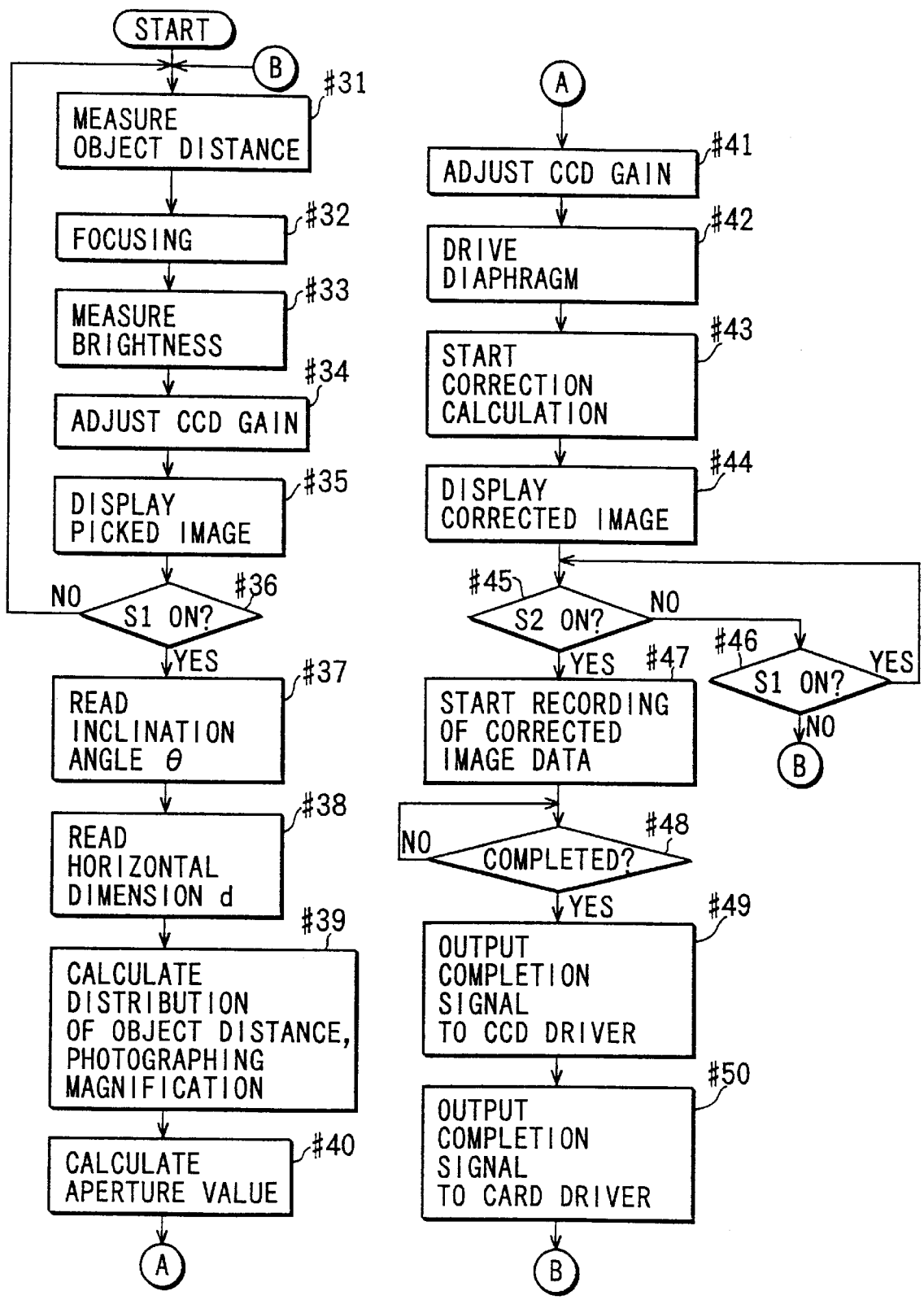
FIG. 46 is a flowchart of a photographing control in the oblique photographing correction mode of the sixth electronic camera.

Next, a photographing control performed by the sixth camera 1 in the oblique photographing correction mode is described with reference to a flowchart of FIG. 46.

Figure 47:
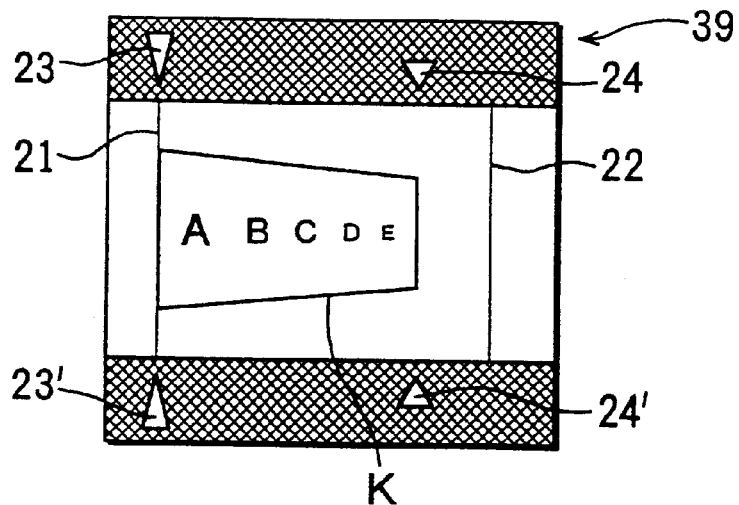
FIG. 47 is a diagram showing an example of display contents of the liquid crystal display portion in the viewfinder.
Figure 48:
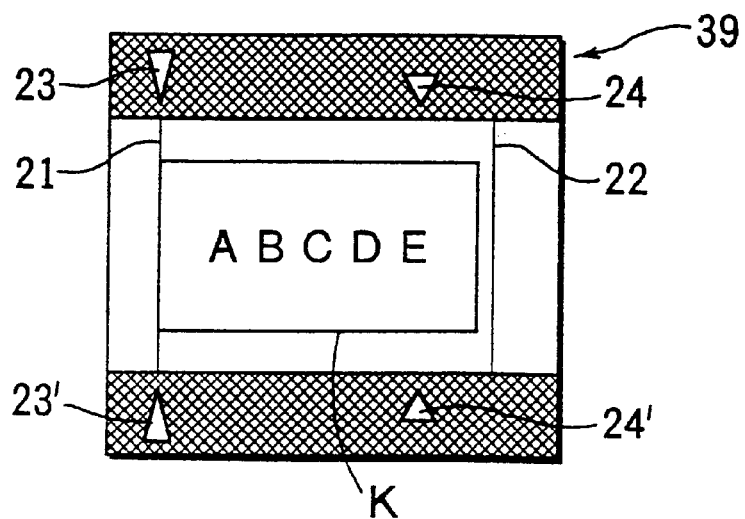
FIG. 48 is a diagram showing an example of display contents of the liquid crystal display portion in a monitor display of the corrected image.

When the main switch 9 is turned on to activate the camera 1, the camera 1 enters a photographing enabling state and an object distance DA is measured by the distance meter 35 (Step #31). Subsequently, a drive amount of the taking lens 2 required to attain an in-focus condition is calculated based on the measured object distance $D_A$ (corresponding to distance OP in FIG. 6), and focusing is performed by driving the taking lens 2 based on the calculated lens drive amount (Step #32). Then, a brightness of the object is measured by the light meter 34 (Step #33), and a gain of the CCD 18 is adjusted to obtain a proper exposure (dynamic range adjustment) based on the measured object brightness (Step #34). Subsequently, electric charges are stored or integrated in the CCD 18; the stored electric charges are read (output of the pixel data); and the picked image is displayed by driving the liquid crystal viewfinder 39 by the viewfinder driver 40 based on the output pixel data (Step #35). In other words, an image K of the object actually sensed by the CCD 18 is reproduced in the liquid crystal viewfinder 39 as shown in FIG. 47.

It is then discriminated whether the S1 switch has been turned on (whether the release button 14 has been pressed halfway) (Step #36). If the S1 switch is off (NO in Step 36), this routine returns to Step #31 to continue the monitoring by the liquid crystal viewfinder 39.

When the S1 switch is turned on (YES in Step #36), the angle of inclination θ is read from the set position of the operation button 12 of the mode setting switch 11 (Step #37), and the horizontal dimension d of the object to be subjected to the oblique photographing correction is read from the position information of the markers 23, 24 (or markers 23', 24') within the field frame 20 (Step #38).

Subsequently, angles of view $\alpha i$, $\beta i$ with respect to the respective pixel positions of the CCD 18 are calculated; object distances di in the respective pixel positions (i.e., a distribution of object distance within the field) are calculated based on the angles of view $\alpha i$, $\beta i$, the object distance $D_A$ and the angle of inclination θ; and the photographing magnification $m_A$ at a distance metering point is calculated based on a focal length f and the object distance $D_A$. Photographing magnifications mi in the respective pixel positions (i.e., a distribution of photographing magnification within the field) are calculated based on the photographing magnification $m_A$, the object distance $D_A$, the angles of views $\alpha i$, $\beta i$ and the angle of inclination θ in accordance with Equation (1) or (2) (Step #39). The data on the object distance distribution and the photographing magnification distribution are stored in the memory 30.

Subsequently, an aperture value of the diaphragm 17 where the entire correction image falls within the depth of field is calculated based on the object distance $D_A$, the photographing magnification $m_A$, the horizontal dimension d of the correction image and the angle of inclination θ (Step #40), and the gain adjustment of the CCD 18 is performed based on this aperture value and the object brightness measured immediately before so as to obtain a proper exposure (Step #41).

After the diaphragm 17 is set at the calculated aperture value (Step #42), an oblique photographing correction calculation for the image picked up by the CCD 18 is started (Step #43). Specifically, the respective pixel data read successively from the CCD 18 are subjected to an oblique photographing correction, i.e., enlarged along the vertical direction for each vertical line within the OPC calculation unit 27 and enlarged along the horizontal direction while being output from the OPC calculation unit 27, and then output to the viewfinder driver 40 and the hard disk card 28.

During the oblique photographing correction, the object distances Di and the photographing magnifications mi corresponding to the respective pixel positions are transferred from the memory 30 to the CPU 36. The CPU 36 calculates pixel positions to be added for the enlargement processing along the vertical direction and outputs the calculation result to the read clock controller 275, and also calculates pixel positions to be added for the enlargement processing along the horizontal direction and outputs the calculation result to the read address controller 276.

The enlargement correction along the vertical direction is performed by controlling the read clock of the pixel data transferred from the line buffer 271 to the latch circuit 272 by the read clock controller 275. On the other hand, the enlargement correction along the horizontal direction is performed by controlling the read addresses of the pixel data output from the image memory 274 to the hard disk card 28 and the viewfinder driver 40 by the read address controller 276.

The CPU 36 also outputs a display switch signal to the viewfinder 40, which drives the liquid crystal viewfinder 39 based on the pixel data output from the OPC calculation unit 27 to display the image K after the correction thereon as shown in FIG. 44 (Step #44). However, since the CPU 36 does not output a record signal to the card driver 29, the data on the image after the correction is not recorded in the hard disk card 28.

Subsequently, it is discriminated whether the S2 switch has been turned on (whether the release button 14 has fully been pressed) (Step #45). If the S2 switch is off (NO in Step #45), it is discriminated whether the S1 switch is still held on (Step #46). If the Si switch is on (YES in Step #45), this routine stays in these steps to continue to display the image K after the correction until the S2 switch is turned on. On the other hand, if the S1 switch is off (NO in Step #46), this routine returns to Step #31.

When the S2 switch is turned on while the image K after the correction is displayed (YES in Step #45), the CPU 36 outputs the record control signal to the card driver 29, thereby starting the recording of the data on the image K after the correction in the hard disk card 28 (Step #47). In other words, upon the output of the record control signal from the CPU 36 to the card driver 29, the pixel data output from the OPC calculation unit 27 are successively written in the hard disk card 28.

Upon the completion of the writing of all pixel data in the hard disk card 28 (YES in Step #48), a control signal instructing the completion of the reading of the pixel data is output to the CCD driver 26 (Step #49) and a control signal instructing the completion of the writing of the pixel data is output to the card driver 29 (Step #50), completing one photographing operation. Thereafter, this routine returns to Step #1 for a next photographing operation.

Although the present invention has been fully described by way of example with reference to the accompanying drawings, it is to be understood that various changes and modifications will be apparent to those skilled in the art. Therefore, unless otherwise such changes and modifications depart from the scope of the present invention, they should be construed as being included therein.

What is claimed is:

1. An electronic camera comprising:
    an image pickup device in the camera which photoelectrically picks up a light image of an object to generate image data, the image pickup device having a sensing surface residing on a first plane;
    an oblique angle information provider in the camera which provides information on an oblique angle between the first plane and a second plane on which a surface of the object resides;
    a distance detector in the camera which detects a distance to the object; and
    a corrector in the camera which corrects, based on the provided oblique angle information and the detected distance, the generated image data to the extent an imaged dimension of a part of the object on a near side having a particular physical dimension is imaged to have the same imaged dimension of a part of the object on a far side having the same particular physical dimension so as to produce a pseudo object image identical to an image which is obtained when the first plane is optically in parallel with the second plane.

2. An electronic camera according to claim 1, wherein the corrector corrects the generated image data by applying a partial enlargement or reduction thereto.

3. An electronic camera according to claim 1, further comprising:
    a size setter which sets a size of the light image on the sensing surface of the image pickup device; and
    an aperture value setter which sets, based on the set light image size, the provided oblique angle information, and the detected object distance, an aperture value to hold the surface of the object in a depth of field of the image pickup device.

4. An electronic camera according to claim 3, wherein the set aperture value is equal to or lower than a reference aperture value for suppressing influence of camera shake.

5. An electronic camera according to claim 3, wherein the size setter includes a manual setting portion.

6. An electronic camera according to claim 3, wherein the size setter includes an automatic setting portion which sets a size based on the generated image data.

7. An electronic camera according to claim 1, further comprising an aperture value setter which is responsive to the oblique angle information provider to set an aperture value in accordance with an oblique angle.

8. An electronic camera according to claim 1, further comprising a calculator which calculates a correction permissible area of the light image.

9. An electronic camera according to claim 8, further comprising a display unit which displays the calculated correction permissible area.

10. An electronic camera according to claim 9, further comprising a recorder which records the corrected image data, wherein the display unit displays the correction permissible area during the time from activation of the image pickup device until activation of the recorder.

11. An electronic camera according to claim 1, further comprising:
    an image display unit in the electronic camera which is operable to selectively display an actually picked up image in accordance with the generated image data and a pseudo image in accordance with the corrected image data; and
    a selector in the electronic camera which provides a camera user with a selection of the actually picked up image display or the pseudo image display on the image display unit.

12. An electronic camera according to claim 11, further comprising a recorder which records the image data, wherein the display unit executes the image display during the time from activation of the image pickup device until activation of the recorder.

13. An electronic camera according to claim 1, wherein the oblique angle information provider includes a manual providing portion for providing predetermined oblique angle information manually.

14. An electronic camera according to claim 1, wherein:
    the distance detector is operable to detect respective distances to a plurality of separate portions of the object;
    the oblique angle information provider includes an automatic providing portion which provides, based on the plurality of detected distances, predetermined oblique angle information automatically.

15. An electronic camera comprising:
    an image pickup device which photoelectrically picks up a light image of an object to generate image data, the image pickup device having a sensing surface residing on a first plane;
    a manual operation member to which a user inputs oblique angle information as a visual estimation of the user on an oblique angle between the first plane and a second plane on which a surface of the object resides; and
    a corrector which corrects, based on the oblique angle information inputted to the manual operation member, the generated image data so as to produce a pseudo object image identical to an image which is obtained when the first plane is optically in parallel with the second plane.

16. An electronic camera according to claim 15, wherein the manual operation member is provided on an outside surface of the camera, the manual operation member being manually changeable at a reference position where a specified portion of the manual operation member is in parallel with the first plane and an oblique position where the specified portion of the manual operation member is in parallel with the second plane.

17. The electronic camera of claim 15, wherein said corrector corrects the generated image data to the extent an imaged dimension of a part of the object on a near side having a particular physical dimension is imaged to have the same imaged dimension of a part of the object on a far side having the same particular physical dimension so as to produce a pseudo object image identical to an image which is obtained when the first plane is optically in parallel with the second plane.

18. An electronic camera comprising:
   an image pickup device which photoelectrically picks up a light image of an object to generate image data, the image pickup device having a sensing surface residing on a first plane;
   a corrector which corrects the generated image data so as to produce a pseudo object image identical to an image which is obtained when a surface of the object is optically in parallel with the first plane when the surface of the object is on a second plane tilted relative to the first plane on a plane perpendicularly intersecting the second plane; and
   an aperture value setter which sets an aperture value in accordance with a varying angle between the first plane and the second plane.

19. An electronic camera according to claim 17, wherein the set aperture value is equal to or lower than a reference aperture value for suppressing influence of camera shake.

20. An electronic camera as claimed in claim 18, further comprising an area setter which sets a target correction area, wherein the aperture value setter sets an aperture value for the target area set by the area setter.

21. An electronic camera according to claim 20, wherein the area setter includes a manual setting portion.

22. An electronic camera according to claim 20, wherein the area setter includes an automatic setting portion which sets said target correction area based on the generated image data.

23. The electronic camera of claim 18, wherein said corrector corrects the generated image data to the extent an imaged dimension of a part of the object on a near side having a particular physical dimension is imaged to have the same imaged dimension of a part of the object on a far side having the same particular physical dimension.

24. An electronic camera comprising:
   an image pickup device which picks up an optical image of an object at an angle to generate image data;
   a processor which produces using the image data corresponding to a correction permissible area of the images, front view image data of the object; and
   a display unit which displays an area of the picked up image with information for distinguishing a non-permissible area of the image from the correction permissible area of the picked up image.

25. An electronic camera according to claim 24, further comprising a recorder which records the corrected image data, wherein the display unit displays the correction permissible area during the time from activation of the image pickup device until activation of the recorder.

26. An electronic camera as claimed in claim 24, further comprising an area setter which sets a correction area, wherein the display unit displays the correction area set by the area setter.

27. The electronic camera of claim 24, further comprising a corrector which corrects the image data to the extent an imaged dimension of a part of the object on a near side having a particular physical dimension is imaged to have the same imaged dimension of a part of the object on a far side having the same particular physical dimension.

28. An electronic camera comprising:
   an image pickup device which photoelectrically picks up a light image of an object to generate image data, the image pickup device having a sensing surface residing on a first plane;
   a corrector which corrects the generated image data so as to produce a pseudo object image identical to an image which is obtained when a surface of the object is in parallel with the first plane when the surface of the object is on a second plane intersecting the first plane;
   a first memory which temporarily stores the corrected image data produced by the corrector for a pseudo image display;
   a second memory which stores the corrected image data subsequent to the pseudo image display;
   an image display unit which is operable to selectively display an actually picked up image in accordance with the generated image data and a pseudo image in accordance with the corrected image data; and
   a selector which provides a camera user with a selection of the actually picked up image display or the pseudo image display on the image display unit.

29. An electronic camera according to claim 28, further comprising a recorder which records the image data, wherein the display unit executes the image display during the time from activation of the image pickup device until activation of the recorder.

30. The electronic camera of claim 28, wherein said corrector is in the camera and corrects the generated image data to the extent an imaged dimension of a part of the object on a near side having a particular physical dimension is imaged to have the same imaged dimension of a part of the object on a far side having the same particular physical dimension.

31. An image corrector comprising:
   an image data inputting portion for inputting image data which is generated by photoelectrically picking up a light image of an object with an image pickup device having a sensing surface;
   an oblique angle information providing portion for providing predetermined oblique angle information on an oblique angle between the sensing surface of the image pickup device and a surface of the object;
   a distance information providing portion for providing information on a distance to the object; and
   a data correcting portion for correcting the inputted image data based on the provided predetermined oblique angle information and distance information to the extent an imaged dimension of a part of the object on a near side having a particular physical dimension is imaged to have the same imaged dimension of a part of the object on a far side having the same particular physical dimension so as to produce a pseudo object image identical to an image which is obtained when the surface of the object is in parallel with the sensing surface of the image pickup device.

32. A method for producing image data representing a pseudo object image whose surface resides on a plane parallel with an image picking up plane, the method comprising:

picking up photoelectrically a light image of an object with an image pickup device in the electronic camera having a sensing surface residing on a first plane;

providing predetermined oblique angle information on an oblique angle between the first plane and a second plane on which a surface of the object resides;

detecting a distance to the object from said electronic camera; and correcting, based on the provided predetermined oblique angle information and the detected distance, the generated image data to the extent an imaged dimension of a part of the object on a near side having a particular physical dimension is imaged to have the same imaged dimension of a part of the object on a far side having the same particular physical dimension so as to produce a pseudo object image identical to an image which is obtained when the first plane is in parallel with the second plane.

33. A method for producing image data representing a pseudo object image whose surface resides on a plane parallel with an image picking up plane, the method comprising:

picking up photoelectrically a light image of an object with an image pickup device having a sensing surface residing on a first plane;

providing information on an oblique angle between the first plane and a second plane on which a surface of the object resides by manually changing the oblique angle; and correcting in the electronic camera, based on the provided oblique angle information, the generated image to the extent an imaged dimension of a part of the object on a near side having a particular physical dimension is imaged to have the same imaged dimension of a part of the object on a far side having the same particular physical dimension data so as to produce a pseudo object image identical to an image which is obtained when the first plane is optically in parallel with the second plane.

34. A method for producing image data representing a pseudo object image whose surface resides on a plane parallel with an image picking up plane, the method comprising:

setting an aperture value in accordance with a varying oblique angle between a first plane on which a sensing surface of an image pickup device resides and a second plane on which a surface of an object resides;

picking up photoelectrically a light image of the object with the image pickup device at the set aperture value to generate image data; and correcting the generated image data so as to produce a pseudo object image identical to an image which is obtained when the first plane is in parallel with the second plane tilted relative to the first plane on a plane perpendicularly intersecting the second plane.

35. The method of claim 34, wherein said correcting step includes correcting the generated image data to the extent an imaged dimension of a part of the object on a near side having a particular physical dimension is imaged to have the same imaged dimension of a part of the object on a far side having the same particular physical dimension.

36. A method for producing image data representing a pseudo object image whose surface resides on a plane parallel with an image picking up plane, the method comprising:

setting a size of a light image of an object on a sensing surface of an image pickup device, the sensing surface residing on a first plane, a surface of the object residing on a second plane intersecting the first plane;

setting, based on the set light image size, an aperture value to hold the surface of the object in a depth of field of the image pickup device;

picking up photoelectrically a light image of the object with the image pickup device at the set aperture value to generate image data; and correcting the generated image data so as to produce a pseudo object image identical to an image which is obtained when the first plane is in parallel with the second plane tilted relative to the first plane on a plane perpendicularly intersecting the second plane.

37. The method of claim 36, wherein said correcting step includes correcting the generated imaged data to the extent an imaged dimension of a part of the object on a near side having a particular physical dimension is imaged to have the same imaged dimension of a part of the object on a far side having the same particular physical dimension.

38. A method for producing image data representing a pseudo object image whose surface resides on a plane parallel with an image picking up plane, the method comprising:

picking up photoelectrically a light image of an object with an image pickup device having a sensing surface residing on a first plane, a surface of the object residing on a second plane intersecting the first plane;

calculating a correction permissible area of the light image;

displaying information on the calculated correction permissible area with the light image; and correcting the generated image data so as to produce a pseudo object image identical to an image which is obtained when the first plane is in parallel with the second plane.

39. The method of claim 38, wherein said correcting step includes correcting the generated image data to the extent an imaged dimension of a part of the object an a near side having a particular physical dimension is imaged to have the same imaged dimension of a part of the object on a far side having the same particular physical dimension.

40. A method for producing image data representing a pseudo object image whose surface resides on a plane parallel with an image picking up plane, the method comprising:

picking up photoelectrically a light image of an object with an image pickup device having a sensing surface residing on a first plane, a surface of the object residing on a second plane intersecting the first plane;

receiving a selection of display of an actually picked up image and display of the pseudo image data; and displaying, according to the selection, the actually picked up image in accordance with the generated image data or the pseudo object image in accordance with the corrected image data selectively.

41. The method of claim 40, further comprising correcting the generated image data to the extent an imaged dimension of a part of the object on a near side having a particular physical dimension is imaged to have the same imaged dimension of a part of the object on a far side having the same particular physical dimension so as to produce a pseudo object image identical to an image which is obtained when the first plane is optically in parallel with the second plane.

42. An electronic camera comprising:

an image pickup device which photoelectrically picks up a light image of an object to generate image data, the image pickup device having a sensing surface residing on a first plane;

an oblique angle information provider which provides information on an oblique angle between the first plane and a second plane on which a surface of the object resides and includes a manual operation member which manually changes the oblique angle; and a corrector which calculates a magnification ratio for respective portions of the object image with respect to a predetermined reference position of the object image to enlarge and reduce their respective portions based on the calculated magnification ratio so as to produce a pseudo object image identical to an image which is obtained when the first plane is optically in parallel with the second plane.

43. The electronic camera of claim 42, wherein said corrector calculates the magnification ratio to the extent an imaged dimension of a part of the object on a near side having a particular physical dimension is imaged to have the same imaged dimension of a part of the object on a far side having the same particular physical dimension.

44. An electronic camera comprising:

an image pickup device which photoelectrically picks up a light image of an object to generate image data, the image pickup device having a sensing surface residing on a first plane;

a corrector which corrects the generated image data so as to produce a pseudo object image identical to an image which is obtained when a surface of the object is in parallel with the first plane when the surface of the object is on a second plane intersecting the first plane;

an image display unit which is operable to display the pseudo object image in accordance with the corrected image data;

a first memory which temporarily stores the corrected image data produced by the corrector for the pseudo image display; and a second memory which stores the corrected image data subsequent to the pseudo image display.

45. The electronic camera of claim 44, wherein said corrector corrects the generated image data to the extent an imaged dimension of a part of the object on a near side having a particular physical dimension is imaged to have the same imaged dimension of a part of the object on a far side having the same particular physical dimension.

46. An electronic camera comprising:

an image pickup device which picks up an optical image of an object to generate image data;

a corrector which corrects a deformation of the image data obtained by the image pickup device; and a selector which selects as to whether the corrected image data is recorded on a recording medium or not, wherein said corrector corrects the deformation of the image data to the extent an imaged dimension of a part of the object on a near side having a particular physical dimension is imaged to have the same imaged dimension of a part of the object on a far side having the same particular physical dimension.

47. An electronic camera comprising:

an image pickup device which picks up an optical image of an object at an angle to generate image data;

a corrector which corrects the image data so as to produce an image data which corresponds to a front view image data of the object; and an aperture value setter which sets a largest aperture value, wherein said corrector corrects the image data to the extent an imaged dimension of a part of the object on a near side having a particular physical dimension is imaged to have the same imaged dimension of a part of the object on a far side having the same particular physical dimension.

* * * * *